(12) United States Patent
Sanchez et al.

(10) Patent No.: US 11,323,363 B1
(45) Date of Patent: May 3, 2022

(54) SCALABLE AND SEAMLESS WIDE-AREA NETWORK (WAN) CONNECTIVITY FOR DATA DISTRIBUTION SERVICE (DDS) APPLICATIONS USING REAL-TIME PUBLISH-SUBSCRIBE (RTPS) WIRE PROTOCOL

(71) Applicant: Real-Time Innovations, Inc., Sunnyvale, CA (US)

(72) Inventors: Fernando Crespo Sanchez, San Jose, CA (US); Gerardo Pardo-Castellote, Santa Cruz, CA (US); Jose Maria Lopez Vega, Granada (ES); Antonio Sanchez Navarro, Los Gatos, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 0 days.

(21) Appl. No.: 17/159,537

(22) Filed: Jan. 27, 2021

Related U.S. Application Data

(60) Provisional application No. 63/092,599, filed on Oct. 16, 2020, provisional application No. 62/966,361, filed on Jan. 27, 2020.

(51) Int. Cl.
| | |
|---|---|
| *H04L 12/717* | (2013.01) |
| *H04L 29/06* | (2006.01) |
| *H04L 29/08* | (2006.01) |
| *H04L 12/721* | (2013.01) |
| *H04L 45/42* | (2022.01) |
| *H04L 69/165* | (2022.01) |
| *H04L 69/321* | (2022.01) |
| *H04L 45/00* | (2022.01) |

(52) U.S. Cl.
CPC ............ *H04L 45/42* (2013.01); *H04L 45/566* (2013.01); *H04L 69/165* (2013.01); *H04L 69/321* (2013.01)

(58) Field of Classification Search
CPC ..... H04L 45/42; H04L 45/566; H04L 69/165; H04L 69/321
See application file for complete search history.

(56) References Cited

U.S. PATENT DOCUMENTS

2012/0113867 A1* 5/2012 Georgel ................. H04L 45/26
370/255

* cited by examiner

*Primary Examiner* — Brian Whipple
(74) *Attorney, Agent, or Firm* — Lumen Patent Firm

(57) ABSTRACT

Object Management Group (OMG) Data Distribution Service (DDS) DomainParticipants communication methods and system are provided using the Real-Time Publish Subscribe (RTPS) wire protocol over one or more wide area networks (WAN). Three main issues are addressed: Network Address Translation traversal, Changes in IP addresses, and Efficient bandwidth utilization. Embodiments lead to a scalable solution for WAN Connectivity of DDS Applications using RTPS Wire Protocol. This is a connectionless solution that works on top of UDP as the IP transport. The key benefits of this solution are: Low latency communication with reliable and best-effort data delivery, Minimal data loss when moving across networks, including firewalls/NATs, Minimal migration impact for existing applications. No changes to the API, and Scalability using UDP versus legacy TCP solution. A new UDP WAN transport avoids connection-based overhead inherent in TCP, which becomes increasingly problematic as the number of communication endpoints increases.

30 Claims, 30 Drawing Sheets

Per-Hop Behaviors (PHB)

Expedited Forwarding

| EF |
|----|

Assured Forwarding

| | Low Drop Pref | Med Drop Pref | High Drop Pref |
|---|---|---|---|
| Class 1 | AF11 | AF12 | AF13 |
| Class 2 | AF21 | AF22 | AF23 |
| Class 3 | AF31 | AF32 | AF33 |
| Class 4 | AF41 | AF42 | AF43 |

Best Effort

| BE |
|----|

DiffServ Code Points (DSCP)

46
101110

| 10 | 12 | 14 |
|---|---|---|
| 001010 | 001100 | 001110 |
| 18 | 20 | 22 |
| 010010 | 010100 | 010110 |
| 26 | 28 | 30 |
| 011010 | 011100 | 011110 |
| 34 | 36 | 38 |
| 100010 | 100100 | 100110 |

SCALABLE AND SEAMLESS WIDE-AREA NETWORK (WAN) CONNECTIVITY FOR DATA DISTRIBUTION SERVICE (DDS) APPLICATIONS USING REAL-TIME PUBLISH-SUBSCRIBE (RTPS) WIRE PROTOCOL

CROSS-REFERENCE TO RELATED APPLICATIONS

This application claims priority from U.S. Provisional Patent Application 62/966,361 filed is Jan. 27, 2020, which is incorporated herein by reference. This application claims priority from U.S. Provisional Patent Application 63/092,599 filed Oct. 16, 2020, which is incorporated herein by reference.

FIELD OF THE INVENTION

This invention relates to wide-area network connectivity for data distribution service applications using the Real-Time Publish Subscribe wire protocol.

BACKGROUND OF THE INVENTION

Being able to provide connectivity across WAN is becoming a relevant use case for many of our customers across different market segments but especially for customers in the autonomous vehicle market. Cloud connectivity is one example that requires being able to go across WAN. A typical architecture for cloud connectivity is shown in FIG. 1.

The connection between the different DDS applications running outside the cloud and the DDS applications running inside the cloud goes over WAN. This usually involves NAT (Network Address Translation) routers, firewalls, IP address changes, and other elements that our users do not control.

To go across NAT routers, Connext DDS only offers two solutions that are not satisfactory for all the use cases:
  Peer-to-Peer WAN Transport based on UDP using hole punching, and
  TCP Transport in asymmetric mode.

Connext DDS is the first connectivity framework designed for the demanding requirements of smart machines and real-world systems. It delivers the low-latency, high-reliability, scalability and security essential for distributed systems.

Peer-to-Peer WAN Transport

In WAN networks or public connections, the DDS Participants operate behind NATs and/or security firewalls, which prevent direct communications with the Connext DDS built-in UDP transport.

The Peer-to-Peer WAN transport (aka Secure WAN transport) plugin allows Connext DDS applications running on private networks to communicate securely over a WAN, such as the Internet. To allow traversing the NATs, the WAN Transport enables peer-to-peer communication between peers that are in separate LAN networks, using a UDP hole-punching mechanism based on the STUN protocol (IETF RFC 3489) for NAT traversal. This requires the use of an additional rendezvous server application, the RTI WAN Server.

The existing WAN Transport solution has several issues:
  STUN protocol, that enables peer-to-peer communications using UDP, only works with asymmetric NATs. This means that communication may not be established in some cases where there are symmetric NATs involved.
  The WAN Transport does implement a STUN-like solution. It is not exactly STUN and therefore the transport cannot interoperate with existing and public STUN rendezvous servers.
  The exchange of STUN control messages cannot be secured.
  The transport is not friendly to IP address changes.

TCP Transport in Asymmetric Mode

An alternative to the WAN Transport is to use the Connext TCP Transport in asymmetric mode.

The idea behind the TCP transport running in asymmetric mode is that TCP connections are only established from an unreachable peer (for example, a Routing Service's Participant running behind a NAT) to a reachable peer (for example, Routing Service's Participant running on the cloud with a known public address and port). Even for the DDS traffic flowing from the reachable peer to the unreachable peer, the TCP connection(s) has to be initiated from the unreachable peer. The TCP transport implements a control protocol to make this possible.

Using the TCP transport in asymmetric mode resolves the main problem of the WAN transport: the inability to work with symmetric NATs.

However, this transport is not free of problems:
  Complex Configuration:
    TCP is a connection-oriented transport that provides Layer 4 reliable communication between two endpoints. The transport is not easy to configure at the OS level and, when used at scale, communication starts falling apart. There are too many configuration parameters and they are not consistent across different OSs. For example, in Linux there are over 30 parameters including keep alive parameters, retries parameters, window size parameters and others.
    The Connext TCP transport itself is not easy to configure either, with over 60 configuration parameters.
  TCP is not a suitable transport for use cases that do not require reliable data delivery. For example, Teleoperations require low-latency communications. Even for expert drivers, an increase in video latency from 360 msec (green) to 1300 msec (red) doubles driving time, halves average speed and produces a system declared "impossible" to drive. Achieving this kind of latency with a reliable transport like TCP is out of the picture.

The present invention provides new technology and advances the art to address at least some of these problems.

SUMMARY OF THE INVENTION

The present invention is a method to communicate Object Management Group (OMG) Data Distribution Service (DDS) DomainParticipants using the Real-Time Publish Subscribe (RTPS) wire protocol over one or more wide area networks (WAN). The method addresses three main issues:
  Network Address Translation (NAT) traversal
  Changes in IP addresses
  Efficient bandwidth utilization

Definitions

Wide Area Network (WAN): A wide area network (WAN) is a collection of local area networks (LANs) or other networks that communicate with one another. A WAN is essentially a network of networks, with the Internet being the world's largest WAN.

Network Address Translation (NAT): Network address translation is a method of remapping an IP address space into another by modifying network address information in the IP header of packets while they are in transit across a traffic routing device.

Router-NAT: A network router doing network address translation.

Cone NAT: A cone NAT is one where all requests from the same internal IP address and port are mapped to the same external IP address and port.

Symmetric NAT: A symmetric NAT is one where all requests from the same internal IP address and port, to a specific destination IP address and port, are mapped to the same external IP address and port. If the same host sends a packet with the same source address and port, but to a different destination, a different mapping is used.

NAT binding: A mapping between a private (iAddr:iPort) and an external address (eAddr:ePort). In symmetric NATs this mapping is different depending on the external address to which an application sends a message.

Locator: An address in which an RTPS endpoint is reachable. It consists of a Transport Class ID, an RTPS transport address (made up of a network address and a node address, which together total 128 bits), and a logical port called RTPS port.

UDP Port: An input/output UDP endpoint within a node and associated with a socket. Represented by an integer value. There are two kinds of ports:
Send port: UDP endpoint used to send UDP datagrams.
Receive port: UDP endpoint used to receive UDP datagrams.
A port can be used simultaneously for both receiving and sending data.

RTPS port: An input/output RTPS resource within an application that is used by RTPS endpoints to send and/or receive data. Represented by an integer value.

External DomainParticipant: A Participant with a public IP address. Having a public IP address does not mean that the Participant is not behind a NAT. It is possible that an external Participant is behind a NAT if the network administrator has configured port forwarding in the NAT device to provide a public address reachable from outside the NAT.

Internal DomainParticipant: A Participant behind a NAT with a private internal address which is not statically mapped to an external address. This implies that an external Participant cannot directly communicate with an internal Participant in the absence of a NAT traversal mechanism.

Participant announcement: A discovery RTPS packet sent by a Participant to announce the Participant's presence on the network.

Participant GUID: A unique Global Unique Identifier (GUID) for a DDS Participant.

IP address event: An IP address event can be the change from one IP address to another, the addition of a new IP address, or the removal of an IP address.

The present invention provides a method for communicating one or more Object Management Group (OMG) Data Distribution Service (DDS) Participants. The OMG-DDS Participants are behind router-NAT devices with an External OMG-DDS Participant across one or more WANs using the Real-Time Publish Subscribe (RTPS) protocol. The method distinguishes having a first router-NAT device, a first OMG-DDS Participant among the OMG-DDS Participants behind the first router-NAT device, a second router-NAT device with port forwarding rules configured, and a second External OMG-DDS Participant behind the second router-NAT device reachable in one or more public addresses based on the port forwarding rules. The first OMG-DDS Participant sends and receives RTPS packets to and from the External OMG-DDS second Participant. The second External OMG-DDS Participant sends and receives RTPS packets to and from the first OMG-DDS Participant.

This embodiment could be varied with the following concepts either in combination or by themselves.

A Participant selected from the first OMG-DDS Participant or the second External OMG-DDS Participant could send and receive RTPS packets using one or more private IP address, private UDP port addresses and wherein each sending address is also a receiving address.

A mapping from an RTPS port to a private UDP port, public UDP port pair could be automatic or provided for a Participant selected from the first OMG-DDS Participant or the second External OMG-DDS Participant.

The first OMG-DDS Participant could be provided with one public IP address, public UDP port address in which the second External OMG-DDS Participant can receive RTPS discovery packets and send a Participant announcement periodically containing UUID locators to the second External OMG-DDS Participant address.

An UUID locator could contain an RTPS port and a universal unique identifier (UUID) that maps to a receiving Participant GUID, private IP address pair of the first OMG-DDS Participant.

The first OMG-DDS Participant could send a BINDING_PING message periodically containing a pair UUID, RTPS port from a receiving private IP address, private UDP port address associated with the UUID in the pair to each one of a sending public IP address, public UDP port addresses of the second External OMG-DDS Participant to establish and maintain NAT bindings in the first OMG-DDS Participant's router-NAT device between the receiving private IP address, private UDP port address and the sending public IP address, public UDP port address.

The second External OMG-DDS Participant could map an UUID locator contained in a first OMG-DDS Participant's Participant announcement into a public IP address, public UDP port address by looking at a socket address where a BINDING_PING message for the UUID locator is received.

The second External OMG-DDS Participant could use the mapped public IP address, public UDP port address for a discovery UUID locator of the first OMG-DDS Participant to send a Participant announcement containing PUBLIC_UUID locators for the second External OMG-DDS Participant to the first OMG-DDS Participant.

A PUBLIC_UUID locator could contain a RTPS port, the UUID of the UUID locator, a receiving public IP address, public UDP address associated with the UUID of the UUID locator, a flag indicating if a receiving address is also a sending address, or a combination thereof.

The first OMG-DDS Participant could use a public IP address, public UDP port address contained in a PUBLIC_UUID locator of the second External OMG-DDS Participant to send RTPS packets to the second External OMG-DDS Participant on the PUBLIC_UUID locator and to send BINDING_PINGS if the PUBLIC_UUID locator is bidirectional.

A Participant selected from the first OMG-DDS Participant or the second External OMG-DDS Participant could select a subset of available public IP address, public UDP port addresses to send RTPS packets to the other Participant selected from the first OMG-DDS Participant or the second External OMG-DDS Participant.

An IP address event in the first OMG-DDS Participant could trigger the sending of a Participant announcement to the second External OMG-DDS Participant with a new set of UUID locators and the sending of periodic BINDING_PINGS from a private UDP port, public UDP port address associated with the new set of UUID locators.

The present invention also provides a method for communicating one or more Object Management Group (OMG) Data Distribution Service (DDS) Participants. The OMG-DDS Participants are behind router-NAT devices across one or more WANs using the Real-Time Publish Subscribe (RTPS) protocol. The method distinguishes having a first router-NAT device, a first OMG-DDS Participant among the OMG-DDS Participants behind the first router-NAT device, a second router-NAT device, a second OMG-DDS Participant among the OMG-DDS Participants behind the second router-NAT, a Locator Resolution Service application, and a Relay Service application. The first OMG-DDS Participant sends and receives first RTPS packets to and from the second OMG-DDS Participant using public addresses provided by the Locator Resolution Service application. The second OMG-DDS Participant sends and receives second RTPS packets to and from the first OMG-DDS Participant using the public addresses provided by the Locator Resolution Service application. The first OMG-DDS Participant sends and receives relayed first RTPS packets to and from the second OMG-DDS Participant using the Relay Service application to forward the first RTPS packets. The second OMG-DDS Participant sends and receives relayed second RTPS packets to and from the first OMG-DDS Participant using the Relay Service application to forward the second RTPS packets.

This embodiment could be varied with the following concepts either in combination or by themselves.

A Participant selected from the first OMG-DDS Participant or the second External OMG-DDS Participant could send and receive RTPS packets using one or more private IP address, private UDP port addresses and wherein each sending address is also a receiving address.

A mapping from a RTPS port to a private UDP port, public UDP port pair could be automatic or provided for a Participant selected from the first OMG-DDS Participant or the second OMG-DDS Participant.

A Participant selected from the first OMG-DDS Participant or the second OMG-DDS Participant could be provided a public IP address, public IP port address of the Locator Resolution Service application and sends a Participant announcement periodically containing UUID locators to the Locator Resolution Service application address.

An UUID locator could contain a RTPS port, and an universal unique identifier (UUID) that maps to one of a receiving Participant GUID, private IP address pairs of the Participant selected from the first OMG-DDS Participant or the second OMG-DDS Participant.

A Participant selected from the first OMG-DDS Participant or the second OMG-DDS Participant could send a BINDING_PING message periodically containing a pair UUID, RTPS port from a receiving private IP address, private UDP port address associated with the UUID in the pair to a Locator Resolution Service application public IP address, public UDP port address to establish and maintain a NAT binding in the respectively the first or second router-NAT device from a private IP address, private UDP port to a public IP address, public UDP port.

The Locator Resolution Service application could map an UUID locator contained in a Participant announcement into a public IP address, public UDP port address by looking at a socket address where a BINDING_PING message for the UUID locator is received.

The Locator Resolution Service application could replace an UUID locator in a Participant announcement with a PUBLIC_UUID locator.

A PUBLIC_UUID locator could contain a RTPS port, the UUID of the UUID locator, a receiving public IP address, public UDP address associated with the UUID of the UUID locator, a flag indicating if a receiving address is also a sending address, or a combination thereof.

The Relay Service application could be provided a public address of the Locator Resolution Service application and the Relay Service application registers a relay public IP address, relay public UDP port address in which it can receive and send RTPS packets with the Locator Resolution Service application.

The Locator Resolution Service application could replace an UUID locator in a Participant announcement with a RELAY locator.

A RELAY locator could contain a RTPS port, a UUID of the UUID locator, and a registered receiving public IP address, public UDP address for the Relay Service application, a flag always set indicating that the receiving address is also a sending address, or a combination thereof.

The Locator Resolution Service application could send an updated Participant announcement associated with one Participant selected from the first OMG-DDS Participant or the second OMG-DDS Participant to the other Participant selected from the first OMG-DDS Participant or the second OMG-DDS Participant containing PUBLIC+UUID locators and RELAY locators instead of UUID locators.

A Participant selected from the first OMG-DDS Participant or the second OMG-DDS Participant could send a Participant announcement containing UUID locators to another Participant selected from the first OMG-DDS Participant or the second OMG-DDS Participant using the public IP address, public UDP port addresses contained in PUBLIC_UUID and RELAY locators received from the Locator Resolution Service application for the other Participant selected from the first OMG-DDS Participant or the second OMG-DDS Participant.

A Participant selected from the first OMG-DDS Participant or the second OMG-DDS Participant could send a BINDING_PING message periodically containing a pair UUID, RTPS port from a receiving private IP address, private UDP port address associated with the UUID of the pair to all public IP address, public UDP port addresses contained in bidirectional PUBLIC_UUID and RELAY locators received from the Locator Resolution Service application for the other Participant selected from the first OMG-DDS Participant or the second OMG-DDS Participant.

A Participant selected from the first OMG-DDS Participant or the second OMG-DDS Participant could map a UUID locator coming from another Participant selected from the first OMG-DDS Participant or the second OMG-DDS Participant into one public IP address, public UDP port address where to send RTPS packets to the other Participant selected from the first OMG-DDS Participant or the second OMG-DDS Participant by looking at a socket address where a BINDING_PING message for the UUID locator is received.

A Participant selected from the first OMG-DDS Participant or the second OMG-DDS Participant could select a subset of available public IP address, public UDP port addresses to send RTPS packets to the other Participant selected from the first OMG-DDS Participant or the second OMG-DDS Participant.

An IP address event in a Participant selected from the first OMG-DDS Participant or the second OMG-DDS Participant could trigger the sending of a Participant announcement with a new set of UUID locators and the sending of periodic BINDING_PINGS from the new UUID locators to the other Participant selected from the first OMG-DDS Participant or the second OMG-DDS Participant and to the Locator Resolution Service application.

The embodiments of this invention lead to a scalable solution for WAN Connectivity of Data Distribution Service (DDS) Applications using Real-Time Publish-Subscribe (RTPS) Wire Protocol. This is a connectionless solution that works on top of UDP as the IP transport. The key benefits of this solution are:

- Low latency communication with reliable and best-effort data delivery.
- Minimal data loss when moving across networks, including firewalls/NATs.
- Minimal migration impact for existing applications. No changes to the API.
- Scalability using UDP vs. legacy TCP solution. A new UDP WAN transport avoids connection-based overhead inherent in TCP, which becomes increasingly to problematic as the number of communication endpoints increases.

BRIEF DESCRIPTION OF THE DRAWINGS

FIG. 23 shows according to an exemplary embodiment of the invention the concept of Forwarding Classes.

DETAILED DESCRIPTION

Figure 1:
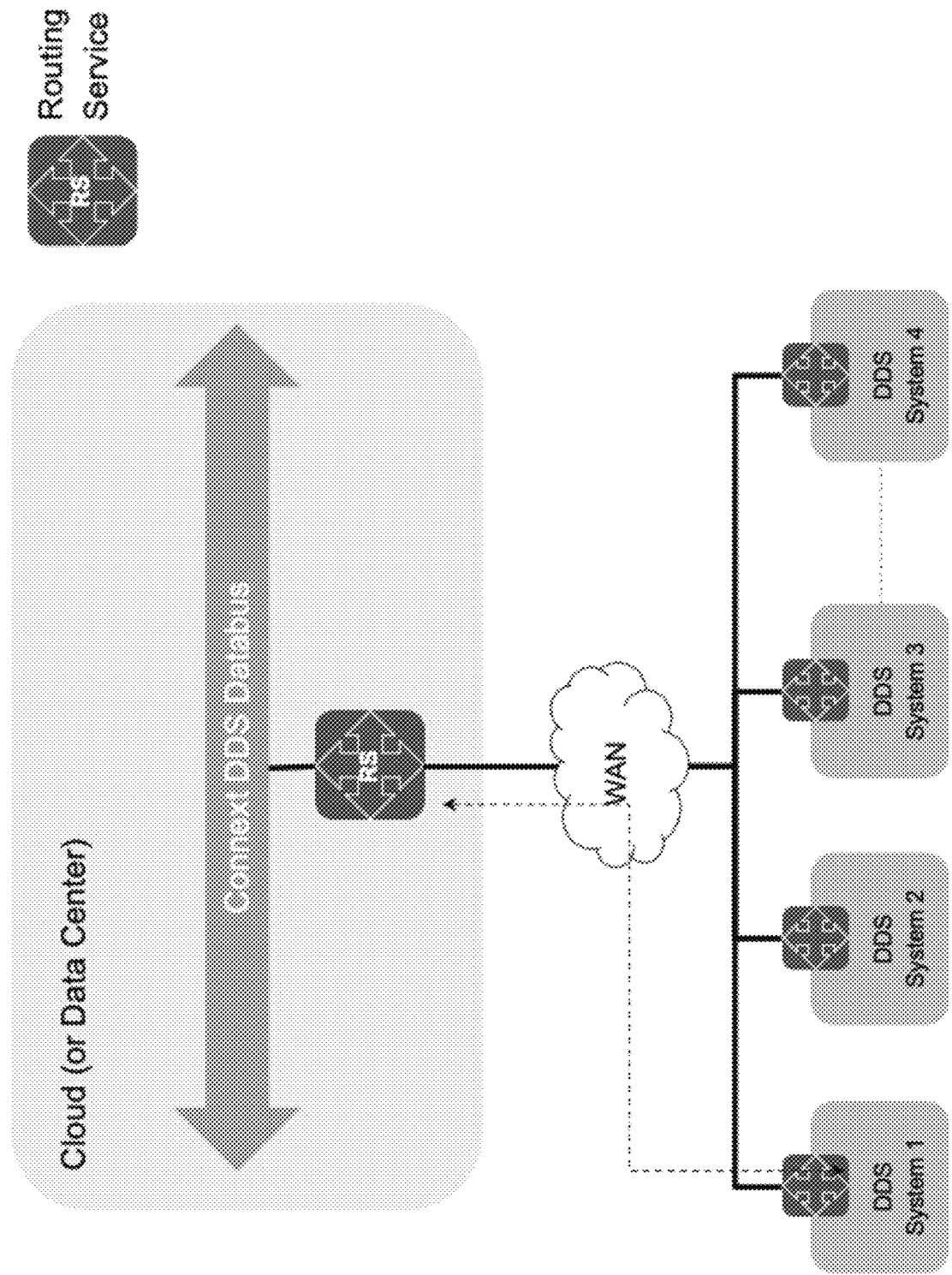
FIG. 1 shows according to an exemplary embodiment of the invention the concept of Cloud Connectivity Over WAN.

The following concepts are used in the description:

UDP Port: An input/output UDP endpoint within a node and associated with a socket. Represented by an integer value. There are two kinds of ports:
  Send port: UDP endpoint used to send UDP datagrams.
  Receive port: UDP endpoint used to receive UDP datagrams.
A port can be used simultaneously for both receiving and sending data.

RTPS port: An input/output RTPS resource within an application that is used by RTPS endpoints to send and/or receive data. Represented by an integer value.

Transport locator (or Locator): An address in which an RTPS endpoint is reachable. It has a Transport Class ID, an RTPS transport address (made up of a network address and a node address, which together total 128 bits), and a logical port called RTPS port.

UDP/IP Transport address (or Transport address): In the context of this invention a transport address refers to the combination of an IPv4 address and an UDP port.

Send Resource (SR): Transport object that is used to send RTPS packets to one or more transport locators.

Receive Resource (RR): Transport object that is used to receive RTPS packets in one or more transport locators.

Opening a port: Opening a port will be used in this document to indicate that a private UDP port is forwarded to a public UDP port to allow external communications through a NAT.

Transport Ping: An existing lightweight transport-level mechanism to trigger ARP resolution for a destination ahead of DDS sending to that destination. The goal of this mechanism is to prevent losing initial RTPS messages to that destination. Currently implemented as a 16-byte message.

NAT binding: A mapping between a private (iAddr:iPort) and an external address (eAddr:ePort). In symmetric NATs this mapping is different depending on the external address to which an application sends a message.

Locator Reachability: An existing mediumweight DDS-level mechanism to check if the locators from a remote participant are reachable. It has two different topics: locator ping and locator reachability. Locator ping is a stateless builtin topic where small, periodic messages are sent to all of the locators from discovered remote participants. Locator reachability is a reliable builtin topic where medium-size updates are sent from a remote participant that received (local participant) locator pings with a status update on the reachability of those locators.

Locator Selection: A new DDS-level mechanism to assign a weight to the locators from a remote participant. A non-reachable locator will receive the lowest weight, while the reachable locators will receive different weights depending on a selection algorithm. From all the locators from a remote participant, data will be sent only to the highest rated locator.

External DomainParticipant or Application: An Application or DomainParticipant with a public IP address. Having a public IP address does not mean that the Application is not behind a NAT. It is possible that an external Application is behind a NAT if the network administrator has configured port forwarding in the NAT device to provide a public address reachable from outside the NAT.

Internal DomainParticipant or Application: An Application or DomainParticipant behind a NAT with a private internal address which is not statically mapped to an external address. This implies that an external Application cannot directly communicate with an internal Application in the absence of a NAT traversal mechanism.

Reflexive Transport Address: The combination of source hardware address and port associated to an UDP/IP packet received from a remote DomainParticipant or Service.

Participant Reflexive Locator (PRL): The locator obtained from an UDP/IP packet received from a remote DomainParticipant. A Participant Reflexive Locator encapsulates a Participant Reflexive Transport Address.

Locator Resolution Service (LRS): A publicly accessible service that provides PRLs to participants.

Service Reflexive Locator (SRL): A locator an internal participant receives as a response from the LRS. It represents the PRL for that participant that the LRS extracted upon request from the internal participant. A Service Reflexive Locator encapsulates a Service Reflexive Transport Address.

Relay Service (RelS): A publicly accessible service that relays data among participants.

Multihomed Host: A multihomed host is physically connected to multiple data links that can be on the same or different networks.

Conventions

The usage of the word UDP (User Datagram Protocol) throughout this invention always refers to UDPv4.

The usage of the word "port" throughout this invention always refers to UDP port.

When we use the expression "being behind a NAT", we do not refer to a single NAT physical device but to one or more.

Throughout the invention we use the term UDP connection which it seems to contradict the fact that UDP is a connectionless protocol. When we use connection in the context of UDP we refer to a higher-level connection and not a transport connection like the connections that we have in TCP. Having a connection between (Addr1:Port1) and (Addr2:Port2) means that two applications agree on sending to each other packets from (Addr1:Port1) to (Addr2:Port2). If the connection is bidirectional, packets will flow in both directions.

The NAT Traversal Challenge

What is NAT?

Figure 2:
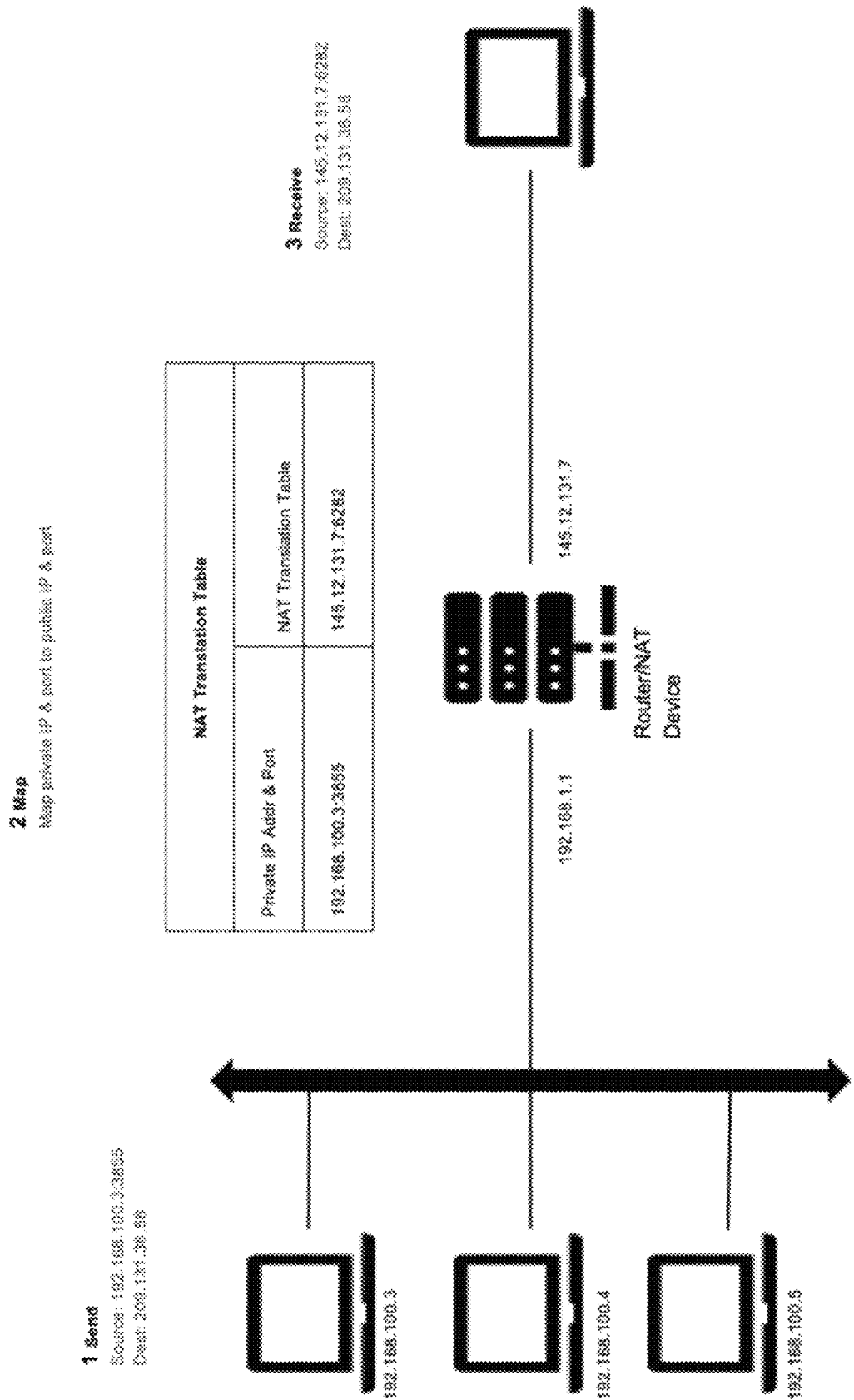
FIG. 2 shows according to an exemplary embodiment of the invention the concept of NAT (Network Address Translation).

In WAN communications, applications typically run behind a Network Address Translator (NAT, FIG. 2). NAT is a method of remapping one IP address & port space into another by modifying network address & port information in the IP header of packets while they are in transit across a traffic routing device. The technique has become a popular and essential tool in conserving global address space in the face of IPv4 address exhaustion. One Internet-routable IP address of a NAT gateway can be used for an entire private network.

NAT Kinds

Figure 3:
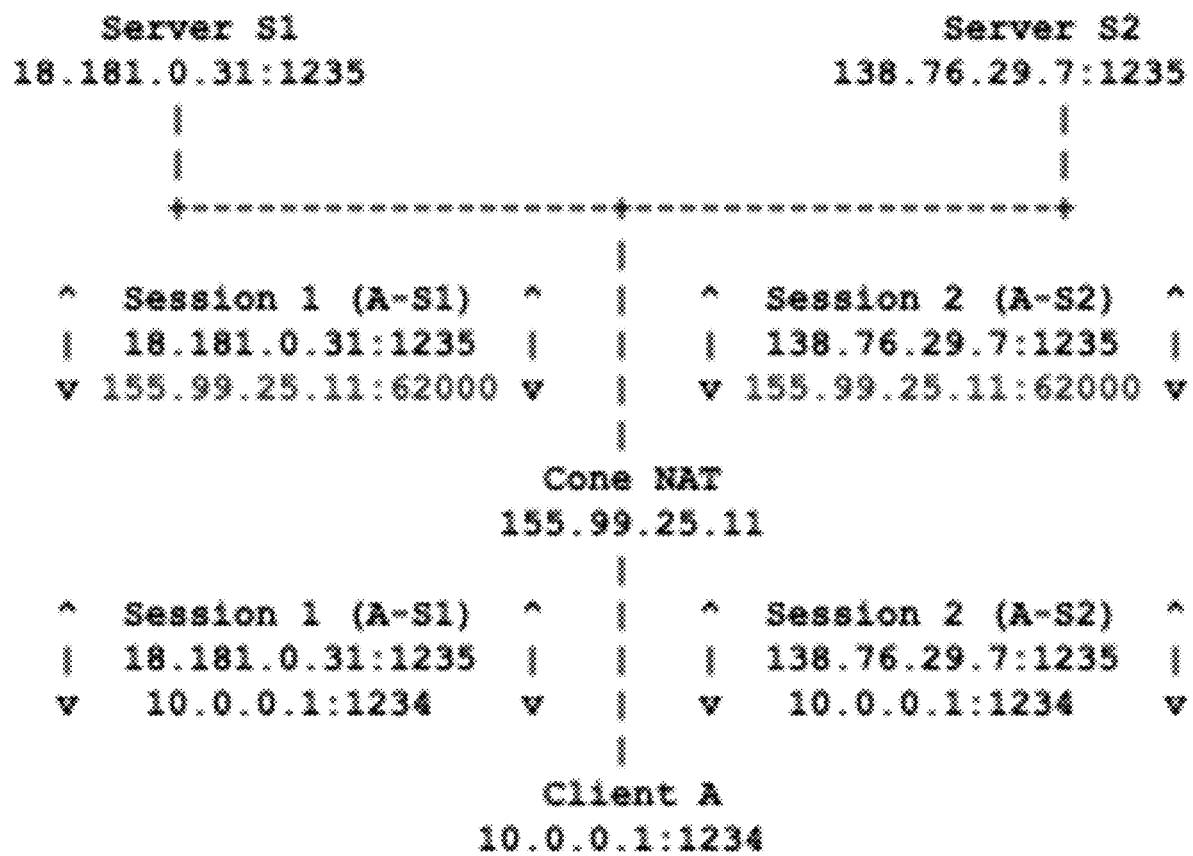
FIG. 3 shows according to an exemplary embodiment of the invention the concept of Full-cone NAT.

There are four kinds of NATs:

Full-cone NAT (also known as one-to-one NAT, FIG. 3)

Once an internal address (iAddr:iPort) is mapped to an external address (eAddr:ePort), any packets from iAddr:iPort are sent through eAddr:ePort.

Any external host can send packets to iAddr:iPort by sending packets to eAddr:ePort, regardless of the external host address/port (hAddr:hPort) used to send the packets.

(Address)-Restricted-Cone NAT

Once an internal address (iAddr:iPort) is mapped to an external address (eAddr:ePort), any packets from iAddr:iPort are sent through eAddr:ePort.

An external host (hAddr:any) can send packets to iAddr:iPort by sending packets to eAddr:ePort only if iAddr:iPort has previously sent a packet to hAddr:any. "Any" means the port number doesn't matter.

Port-Restricted Cone NAT

Like an address restricted cone NAT, but the restriction includes port numbers.

Once an internal address (iAddr:iPort) is mapped to an external address (eAddr:ePort), any packets from iAddr:iPort are sent through eAddr:ePort.

An external host (hAddr:hPort) can send packets to iAddr:iPort by sending packets to eAddr:ePort only if iAddr:iPort has previously sent a packet to hAddr:hPort.

Symmetric NAT

Each request from the same internal IP address and port (iAddr:iPort) to a specific destination IP address and port (dAddr:dPort) is mapped to a unique external source IP address and port (eAddr:ePort); if the same internal host sends a packet even with the same source address and port but to a different destination, a different mapping is used.

Only an external host that receives a packet from an internal host can send a packet back.

Figure 4:
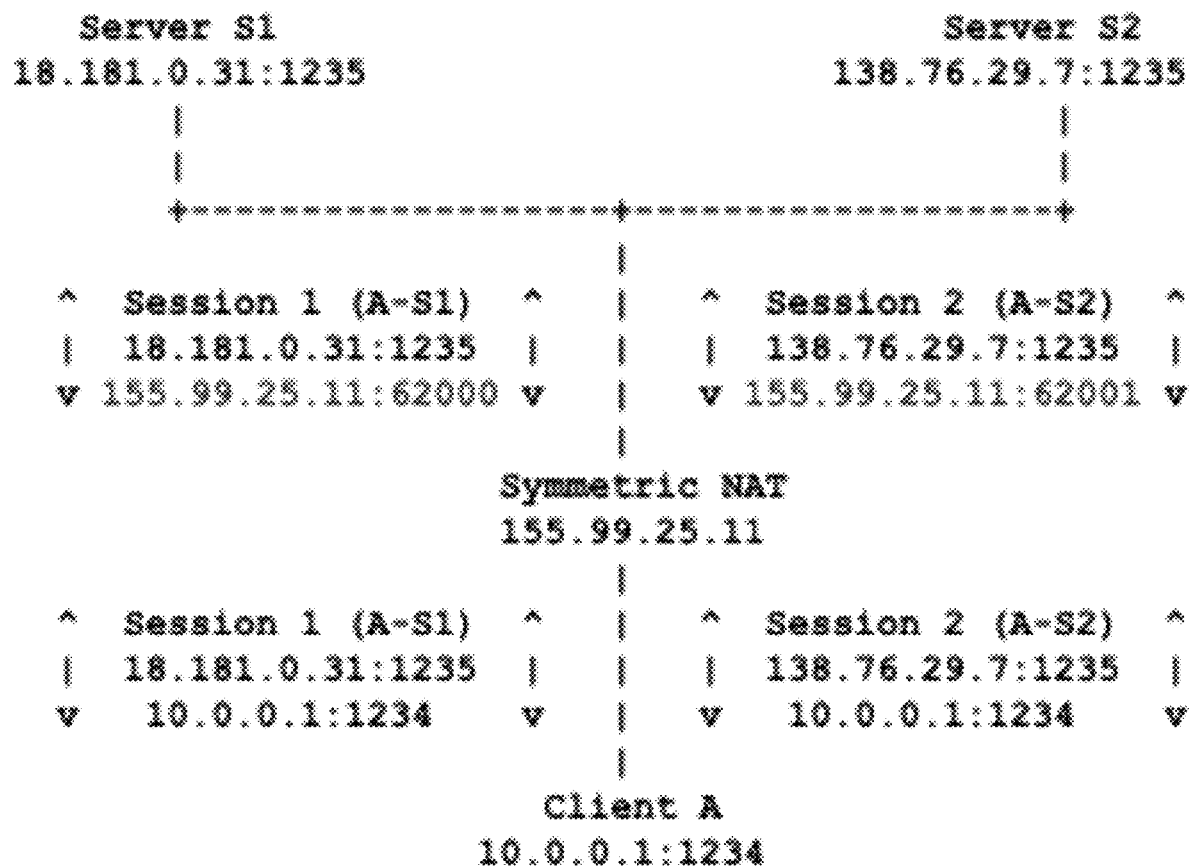
FIG. 4 shows according to an exemplary embodiment of the invention the concept of Symmetric NAT.

FIG. 4 shows how a Symmetric NAT works.

Nat Mapping Expiration

For security purposes, in the absence of outbound traffic, the UDP mapping from an internal address to an external address usually expires after short periods of time in the range of tens of seconds to a few minutes and the external UDP port is closed in the process.

Hairpinning NAT

In network computing, hairpinning (or NAT loopback) describes a communication between two hosts behind the same NAT device using their mapped endpoint. Because not all NAT devices support this communication configuration, applications must be aware of it.

Hairpinning is where a machine on the LAN is able to access another machine on the LAN via the external IP address of the LAN/router (with port forwarding set up on the router to direct requests to the appropriate machine on the LAN).

The First NAT Traversal Challenge with Connext DDS

As described NAT devices translate private IP addresses and ports into public IP addresses and ports. A DomainParticipant '1' running behind a NAT cannot be reached from a DomainParticipant '2' running outside the NAT using 1's private IP address and port.

The first NAT traversal challenge is that the RTPS locators sent as part of the Participant and Endpoint discovery packets from '1' to '2' contain the private address of '1'. '2' will not be able to reach '1' using this private address.

Figure 5:
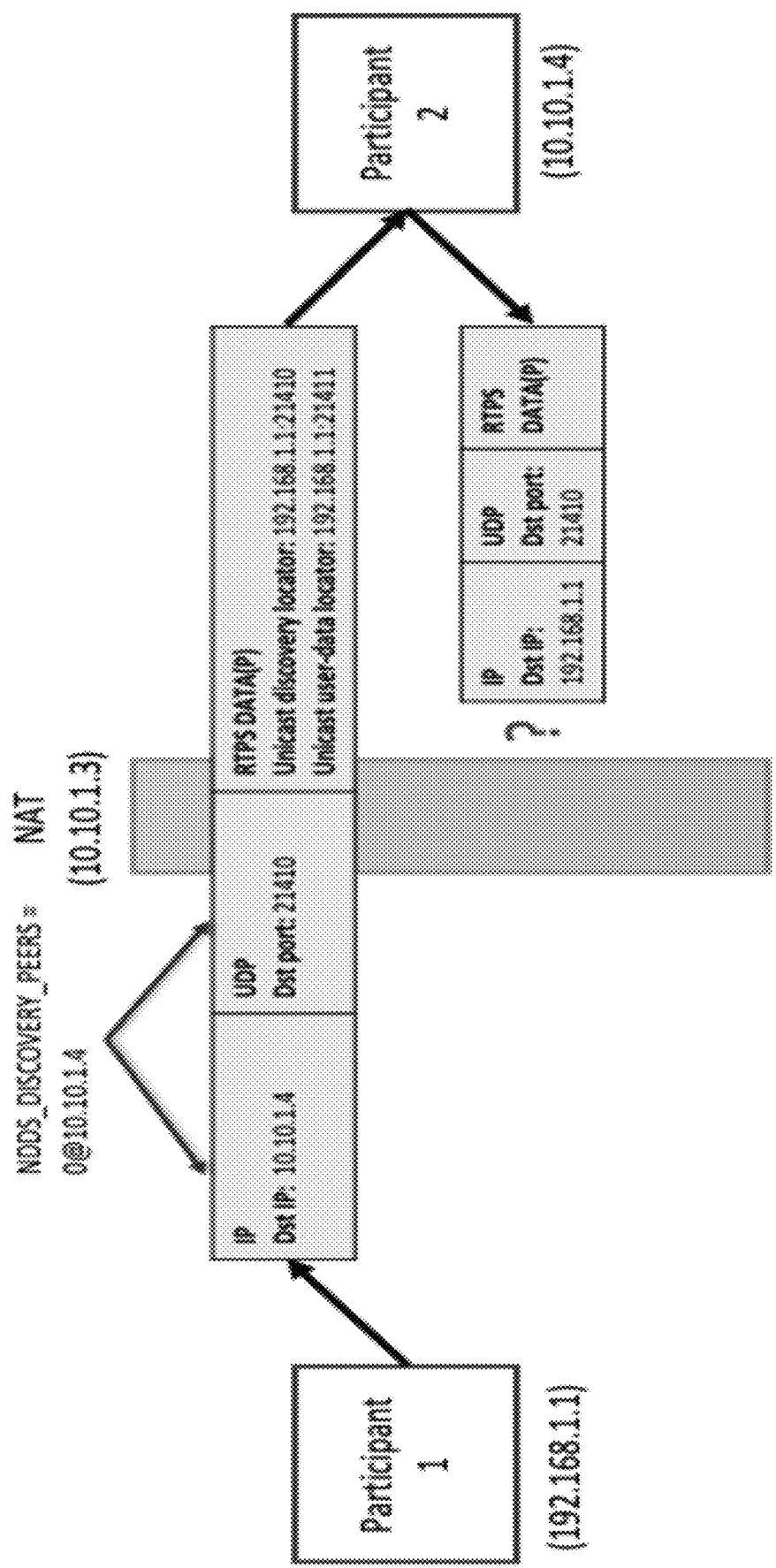
FIG. 5 shows according to an exemplary embodiment of the invention the concept of First NAT Traversal Challenge with DDS.

FIG. 5. describes the first NAT Traversal Challenge by showing how the locators in an RTPS DATA(P) message correspond to private IP addresses.

To mitigate this problem, starting with Connext DDS 5.3.1, the UDPv4 built-in transport provides a property called dds.transport.UDPv4.builtin.public_address that allows overwriting the IP address in the announced RTPS locators.

However, this solution is far from being ideal because:

It requires that private and public IP ports are the same. Therefore, the system administrator will have to change the router configuration to enforce this rule.

It only supports a single DomainParticipant running behind the NAT. If multiple DomainParticipants are required, the traffic will have to go across a single gateway DomainParticipant.

The Second NAT Traversal Challenge with Connext DDS

Before discussing the second NAT traversal challenge using Connext DDS, it is important to understand how the built-in UDPv4 transport works. The existing built-in UDP transport has the following communication model.

A transport instance (there is one per DomainParticipant) opens a send UDP socket after being created. This socket is used to send RTPS traffic from the Send Resources (SR) created in the transport instance to the Receive Resources (RR) created by the remote transport instance. A RR is associated with a locator. The send socket is associated with an ephemeral port because the remote transport instance will never send data to the send UDP socket.

Out-of-the-box, and assuming no multicast, there are four UDP 'channels' for bidirectional communication between 2 Participants (2 Transport instances, one per Participant).

For Port-restricted cone NATs and Symmetric NATs, an application opening a UDP socket on (iAddr:iPort) and mapped to the external address (eAddr:ePort) cannot receive traffic from an remote application opening a socket on (hAddr:hPort) unless (iAddr:iPort) sends a message to (hAddr:hPort) first.

Figure 6:
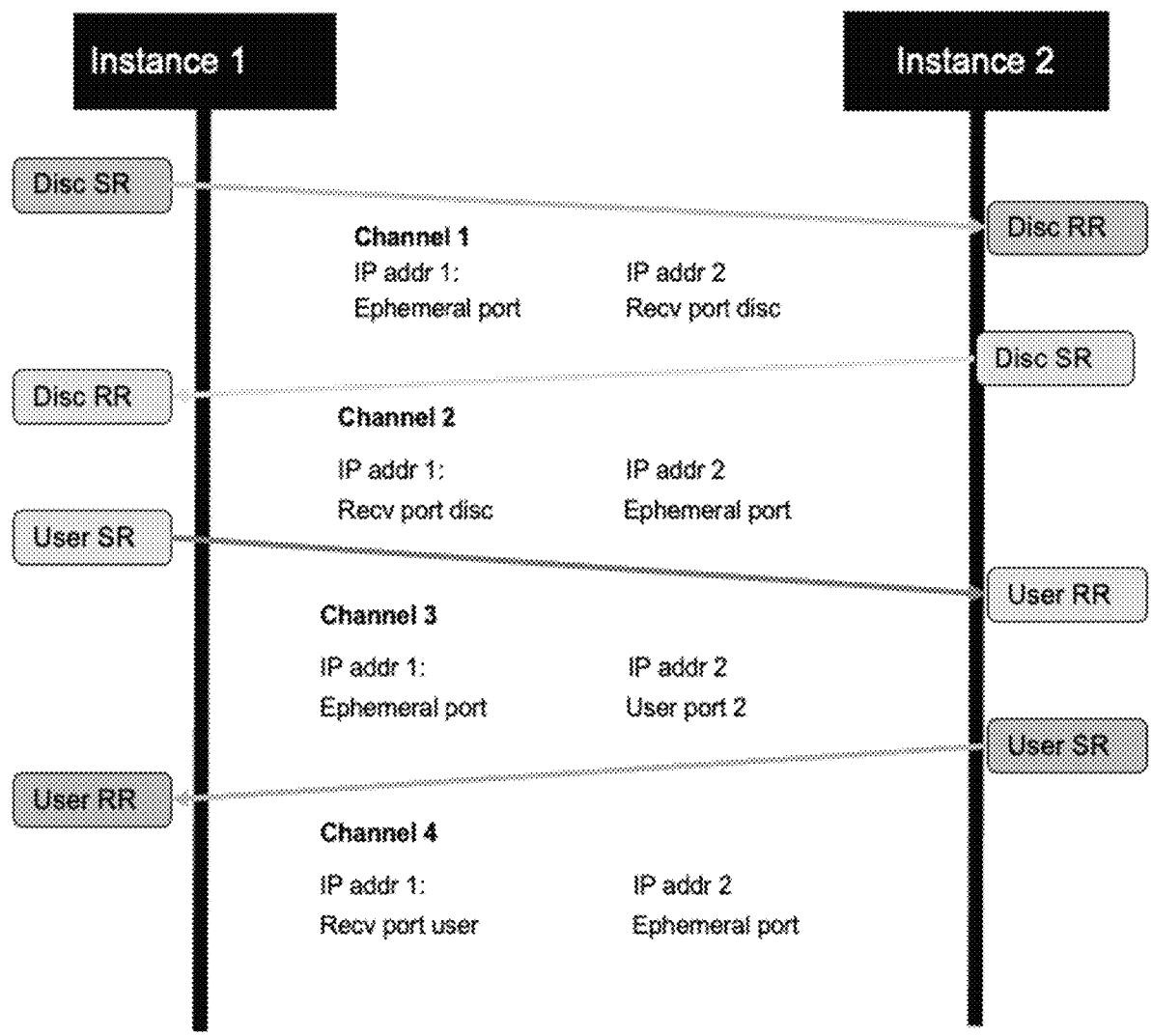
FIG. 6 shows according to an exemplary embodiment of the invention the concept of Built-in UDPv4 Transport Communication Model.

Because of this reason, in FIG. 6, if the application with Transport Instance 1 runs behind the NAT without any port forwarding, it will not be able to receive RTPS packets from the application with Transport Instance 2 running on the public network over channels 2 and 4. This constitutes the second NAT traversal challenge with Connext DDS.

UDP NAT Traversal Across WAN

Being able to provide connectivity across the WAN using UDP is a MUST and the emergence of new standards such as ICE, and WebRTC as well as vertical solutions such as LiveU are proof of that.

A general purpose solution that is able to provide peer-to-peer UDP connectivity across the WAN between Connext DDS applications that are behind NATs, and whose IP addresses may change, requires the usage of the following techniques:

UDP Hole Punching: UDP hole punching relies on the properties of cone NATs to allow peer-to-peer applications to "punch holes" through the NAT device(s), enroute, and establish direct connectivity with each other, even when both communicating applications lie behind NAT devices.

Connection Reversal: This technique only works when one of the applications is behind a NAT and the other is not. Connections are only established from the application behind the NAT to the external application.

Relaying: The most reliable, but least efficient, method of implementing peer-to-peer communication in the presence of a NAT device is to make the peer-to-peer communication look to the network like client/server communication through relaying.

Hole Punching

Connext DDS 6.0.0 and below offer a peer-to-peer WAN Transport that implements UDP hole punching.

The UDP hole punching mechanism uses a rendezvous server, which provides the ability to discover public addresses, and to register and lookup peer addresses based on a unique ID. The interaction with this rendezvous server has been standardized and it is described in the IETF standard RFC 5389—STUN (Session Traversal Utilities for NAT).

The inventors provide its own rendezvous server that is based on a STUN-like protocol.

Connection Reversal

Connection reversal is a technique to provide peer-to-peer connectivity when one of the applications is behind a NAT and the other is not. Like UDP Hole Punching, the connection reversal technique uses a well-known rendezvous server.

Figure 7:
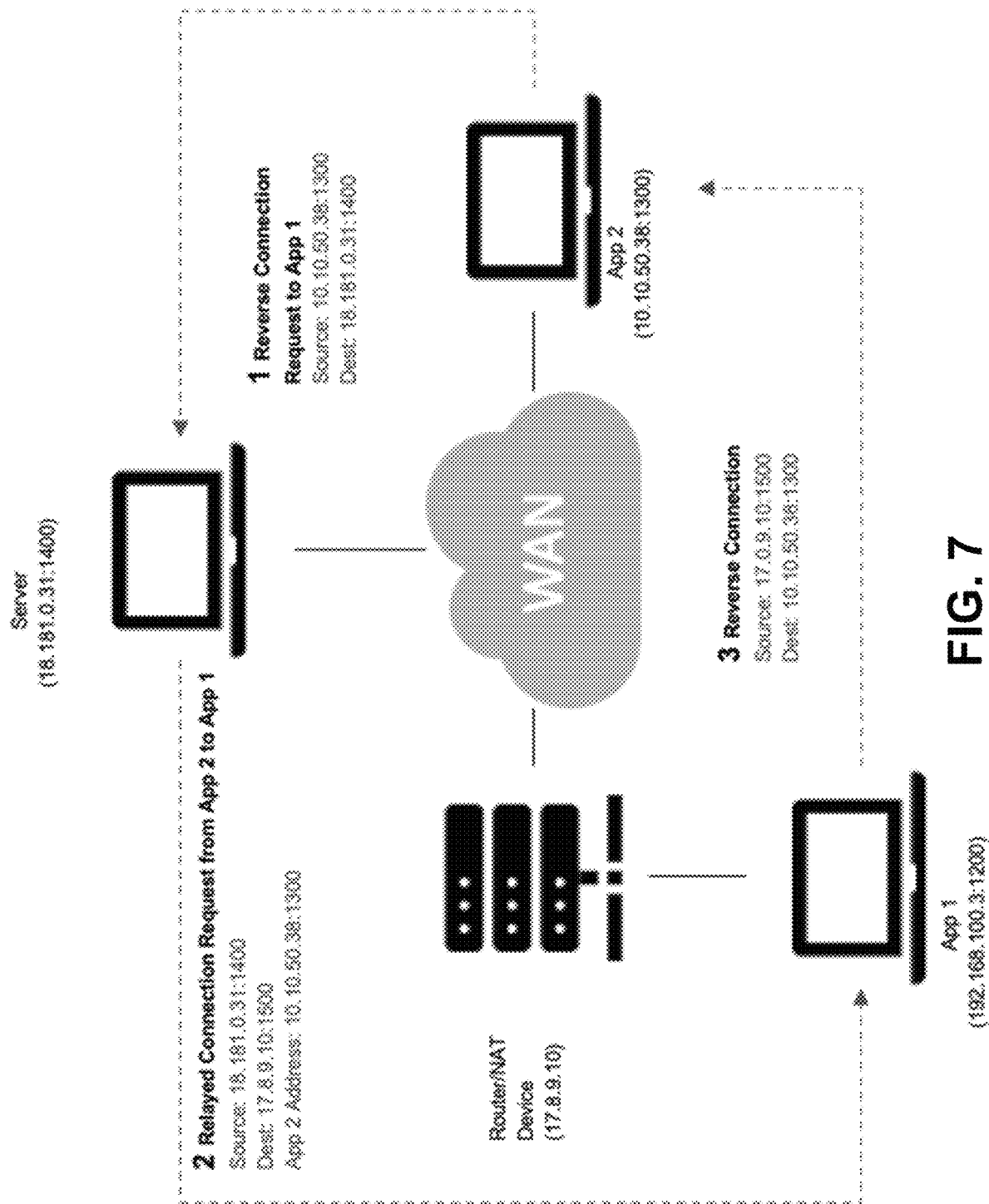
FIG. 7 shows according to an exemplary embodiment of the invention the concept of Connection Reversal.

FIG. 7 shows how connection reversal works. As shown in FIG. 7, each application has a single UDP port that will be used to send/receive data to/from the other application.

Both applications register their IDs (App 1 and App 2) with the Server. The connection reversal process starts with App 2 sending a message to the server saying that it wants to connect with App 1. The server will relay this request to App 1 by sending a message containing the public address of App 2. Note that App 1 can receive messages from the server because it previously registered with that server opening a UDP hole in the NAT device.

Once App 1 receives the connection request, it sends a message to the public address of App 2 to initiate the bidirectional connection.

Relaying

Relaying is the most reliable, but least efficient, method of implementing peer-to-peer communication when both applications are behind a NAT. All the communication between the two applications is relayed by an external server that has a well-known public address. Relaying is normally used as the last resort when applications cannot talk directly.

TURN (Traversal Using Relays around NAT) is an IETF standard protocol (RFC 5766) to facilitate NAT traversal when one or both endpoints are behind NAT. With TURN, media traffic for the session will have to go to a relay server.

Figure 8:
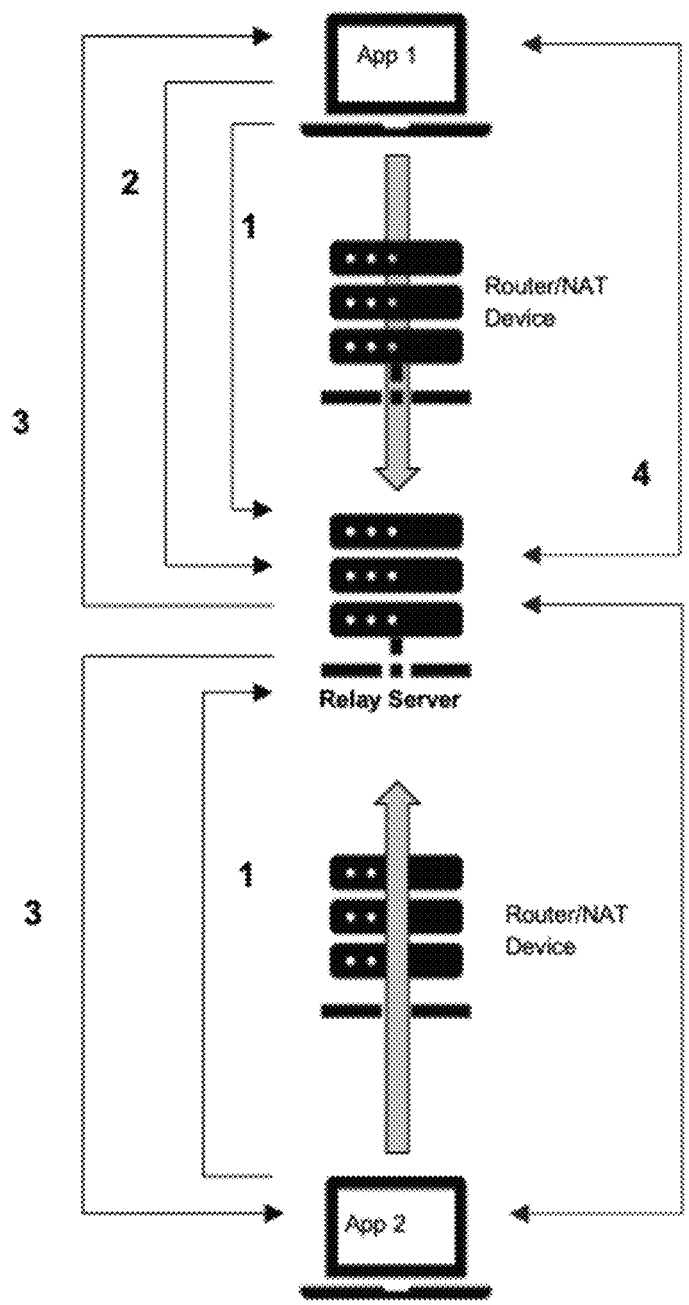
FIG. 8 shows according to an exemplary embodiment of the invention the concept of Relaying.

FIG. 8 shows how relaying works.

As shown in FIG. 8, each application has a single UDP port that will be used to send/receive information to/from the other application.

Both applications register their IDs (App 1 and App 2) with the Relay Server. When App 1 wants to connect with App 2, it will issue a request to the relay server requesting the connection. The relay server will return a relay address (r_ip:r_port) to App 1 and it will indicate to App 2 that App 1 wants to connect using (r_ip:r_port). Each application will start sending data to (r_ip:r_port). This data will be received by the relay server and sent to the other application.

ICE (Interactive Connectivity Establishment)

As described in previous sections there are multiple ways to communicate applications running behind a NAT. Some of the methods, such as UDP hole punching, provide peer-to-peer connectivity but they don't work with any kind of NAT. Other methods, such as Relay, work with any kind of NAT but they do not provide the best latency. A general solution to traverse NATs will require combining these methods to provide the best performance.

Figure 9:
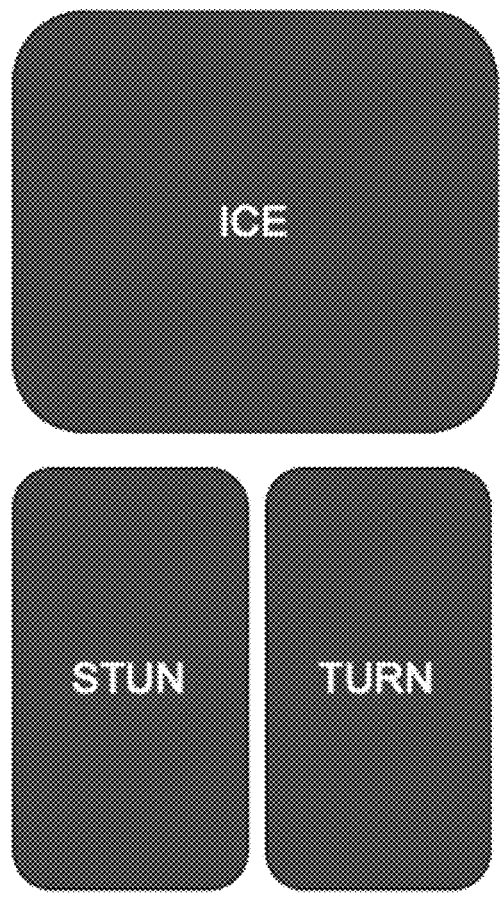
FIG. 9 shows according to an exemplary embodiment of the invention the concept of ICE (Interactive Connectivity Establishment).

ICE (RFC 5245) is a protocol used for NAT traversal. ICE uses a combination of methods including Session Traversal Utility for NAT (STUN) and Traversal Using Relay NAT (TURN) to traverse NATs. If peer-to-peer communication is not possible (STUN), ICE fallbacks into a relay method (TURN) to enable endpoint communication. FIG. 9 shows the building blocks of the ICE standard.

WAN Bonding

Connections in a WAN can be unreliable. For example, a carrier's signal degrades as a function of time and users, reducing the available bandwidth.

Bonding refers to the process whereby two or more network connections are combined in an intelligent way that allows the end user to utilize the combined bandwidth.

Figure 10:
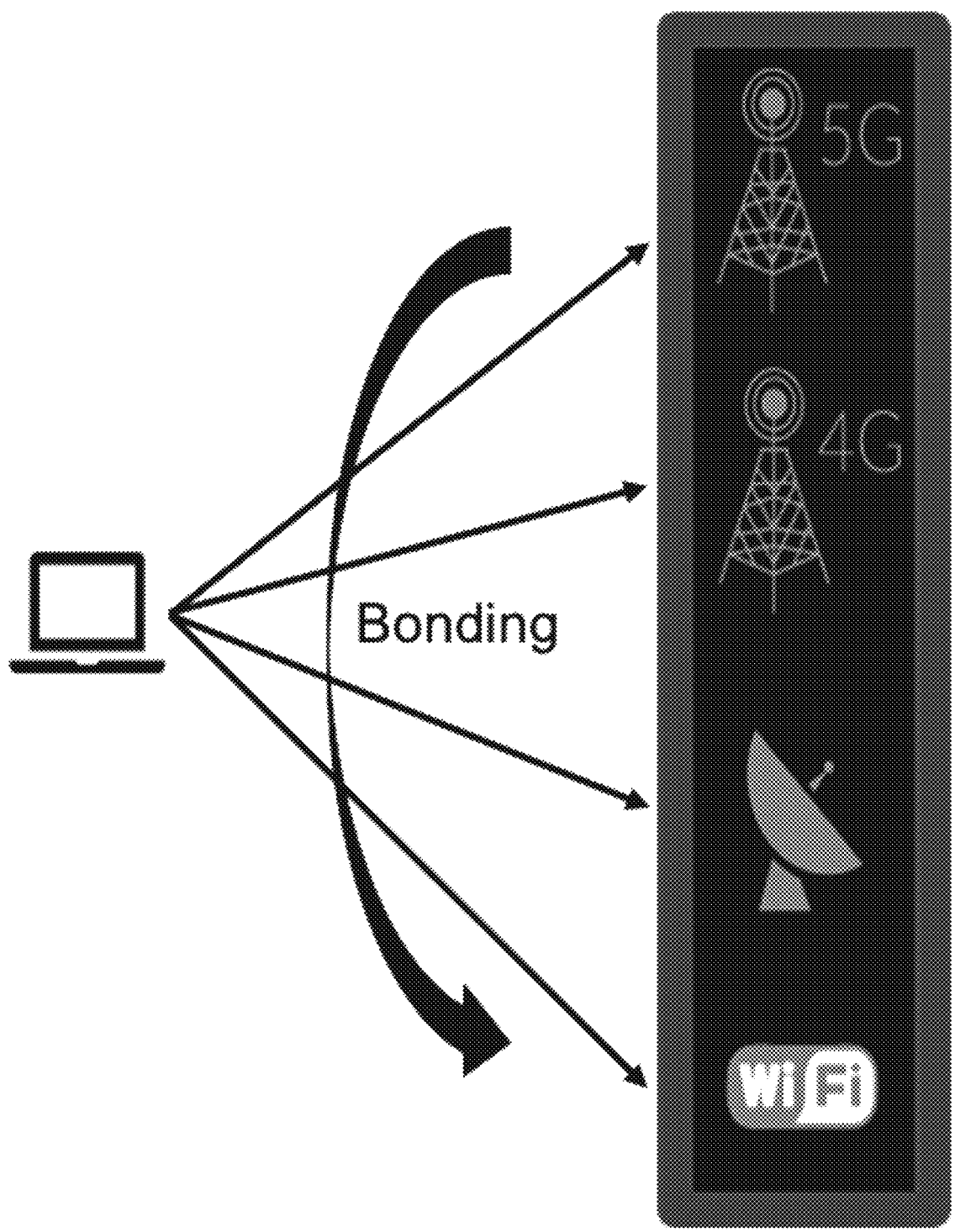
FIG. 10 shows according to an exemplary embodiment of the invention the concept of Bonding.

For example, for cellular bonding, the user could be using modems from several different carriers (AT&T, Sprint, Verizon, or any international carriers). As one carrier's signal degrades, bandwidth demand on that carrier can be shifted to a different carrier to optimize utilization and application performance. In fact, real-time monitoring of each channel's vital statistics (latency, jitter, packet-loss) and forward error correction ensures that the best signal path is always utilized, on a packet-by-packet basis. FIG. 10 shows the concept of bonding.

Connext DDS WAN Traversal Requirements

R1. The solution shall provide communication between two DomainParticipants that are behind different NATs.

The communication shall be established without requiring changes to the NAT devices, such as port forwarding.

R2. The solution shall provide communication between two DDS DomainParticipants that are behind the same NAT.

The communication shall be established without requiring changes to the NAT devices, such as enabling hairpinning.

R3. The solution shall provide Communication between one DomainParticipant that is behind a NAT and one external DomainParticipant with a public IP address.

The external DomainParticipant with a public IP address may itself be running behind a NAT. In that case, the network administrator will have to configure port forwarding appropriately.

R4. The solution shall support changes to the IP address of a DomainParticipant.

The IP address changes can occur in both a DomainParticipant running behind a NAT and an external DomainParticipant R5. Communication between two DomainParticipants shall be supported using a single UDP port used to send and receive RTPS packets.

This will make the solution friendly to products such as Kubernetes. Notice that the solution will still support different RTPS ports. RTPS ports will be mapped to the same UDP port.

R6. Communication between two DomainParticipants shall be supported using multiple UDP ports to receive RTPS traffic and a single port used to send RTPS traffic.

This corresponds to the current port model in the existing UDPv4 built-in transport.

R7. The UDP port number(s) shall be configurable on an external DomainParticipant. The receive and send UDP ports used by the DomainParticipant's transport shall be configurable. This is needed to allow the system administrator on the external DomainParticipant to do the corresponding port forwarding when needed.

R8. The solution shall support setting the DSCP field in the IP packets based on transport_priority Setting.

This must be supported in both, single port, and multi-port configurations.

R9. The solution shall be robust to NAT devices dropping a connection after a timeout.

When this occurs connectivity shall be recovered.

R10. The solution shall work in Multihomed Hosts.

The solution shall work with hosts that are connected to different subnets and have multiple NICs.

R11. The solution shall provide a way to secure communications between two DomainParticipants.

R12. The solution shall allow communicating with DomainParticipants from previous Connext DDS versions.

A DomainParticipant using the new solution shall be able to communicate with a DomainParticipant from previous Connext DDS versions.

R13. The solution shall allow the selection of the best suited destination locator to communicate with a DomainParticipant.

When multiple locators are available to communicate with a remote DomainParticipant, the solution shall allow the selection of one of these locators based on criterias such as latency and losses.

Connext DDS WAN Traversal Design

Connext DDS and the underlying standards, DDS and RTPS, already provide most of the mechanisms that are required to resolve the problem of WAN traversal. For example:

Connext DDS provides a built-in discovery service that can be used to exchange endpoints capabilities and candidate locators.

The built-in discovery service can be used as a peer discovery mechanism.

Connext DDS provides a rich set of QoS that allow to configure the data transmission process. For example, the user can choose between reliable and best-effort transmission. This set of QoSs is richer than the ones offered by any other solution out there.

Connext DDS offers a locator reachability service that determines what locators to use to communicate with an endpoint. Currently, a locator is selected as long as communication can be established over that locator. However, this service could be enhanced to select a locator from the list of candidates based on a priority. This is the way ICE operates. In the design presented in the next sections this priority will be determined by performance metrics such as latency, jitter and sample losses.

Connext DDS already provides a security model.

Because of this, we have taken the decision of not using third-party components to resolve the problem of WAN traversal. We will provide a fully-integrated solution without third-party dependencies.

The following sections describe the design of the Next Generation of Wide-Area Network Traversal for Connext DDS. We will cover the solutions for specific use cases traversing NATs that span from lower to higher complexity.

For the sake of simplicity, the following use cases assume that each Participant uses a single UDP port to send and receive RTPS traffic. The detailed design in sections ahead will explain how to communicate using different UDP ports (for example, one for discovery and one for user data).

Internal Participant with External Participant

This scenario represents the simplest case of communication, in which a participant behind a NAT is communicating with an external participant. This is the same problem described in section 'The First NAT Traversal Challenge with Connext DDS'.

The traditional communication model of the client-server architecture represents an instance of this scenario. Multiple applications behave as clients and are behind a NAT, communicate with a single application that behaves as a publicly reachable server. For example, this is the common architecture of client applications accessing a cloud-based data center to send and collect information.

Figure 11:
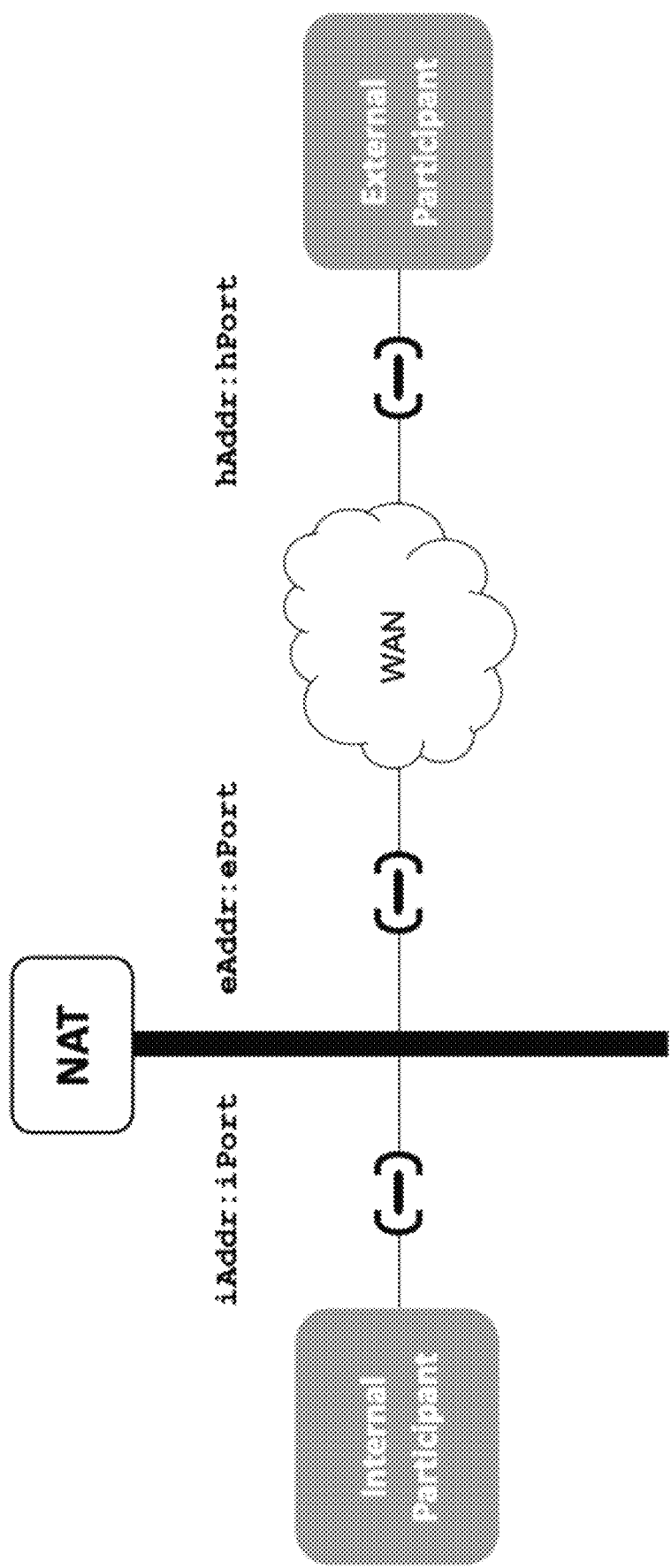
FIG. 11 shows according to an exemplary embodiment of the invention the concept of Communication between Internal and External Participants.

FIG. 11 represents this architecture where a client application has an Internal Participant, and the server application has an External Participant. It's assumed that the internal application knows—or can obtain—the public transport address of the external application. Communication from the Internal Participant to the External Participant—we'll refer to this as uplink direction—can occur at any time since hAddr:hPort is a reachable public destination known to the Internal Participant through its initial peers. The reverse—we'll refer to this as downlink direction—is not true. Downlink communication is not possible until, at least, the External Participant has received a packet from the Internal Participant. Only when this happens, the External Participant can have a chance to send information to the Internal Participant.

The current RTPS UDP transport standard can't operate in this situation because it assumes all the participants are considered "external" from a reachability point of view. Therefore, the UDP transport needs to be enhanced to handle the inconveniences of the presence of NATs.

We'll refer to the enhanced UDP transport as the UDP WAN transport (UWT). Section 'NAT Traversal Transport Design' describes in detail the design of the UDP WAN transport.

In order to properly work in the client-server architecture described above, the new functionality shall:

Obtain Participant Reflexive Locators (PRL) from incoming packets from the Internal Participant Perform UDP hole punching and maintain the "holes" open as long as communication is active.

Identify a remote peer by an universally unique identifier (UUID) (e.g. this could be exactly the Participant GUID), and correlate UUIDs with public IP addresses and ports (public transport address). It is important to decouple the identity of a participant with its transport address, since the latter can change over time (e.g., the application runs under a cellular network).

Figure 12:
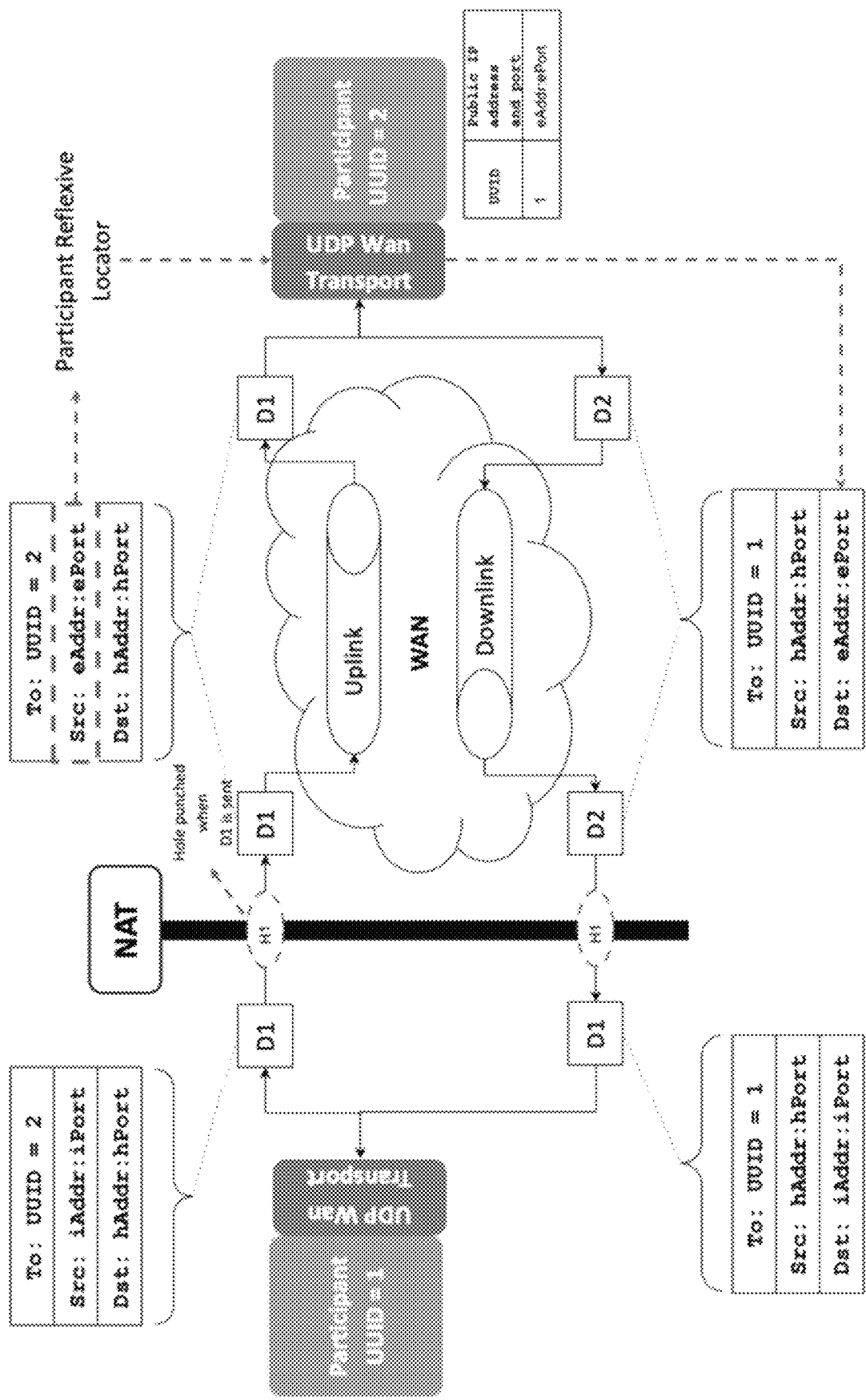
FIG. 12 shows according to an exemplary embodiment of the invention the concept of UWT communication between Internal and External Participants.

FIG. 12 shows the high-level behavior of the UWT. The Internal Participant 1 (UUID=1) initiates the communication by sending a packet to the External Participant 2 (UUID=2) and opening a hole in the NAT so that Participant 2 can send packets back. The NAT modifies the packet so that the source transport address is now an external one. The new external transport address represents the Participant Reflexive Locator Address from the point of view of the Participant 2, which will use it to associate it with Participant 1 and send packets back.

When the downlink packet reaches the NAT, a new transport address translation occurs by looking at the original mapping performed forwarding an uplink packet. This forwarding back process can occur due to the hole punching mechanism, in which the NAT allows the downlink packet to come in.

The External Participant keeps a mapping between UUIDs and public IP addresses and ports and uses this mapping to determine the public IP address and port to which to send RTPS packets directed to the Internal Participant.

Internal Participants Behind Cone NATs

Figure 13:
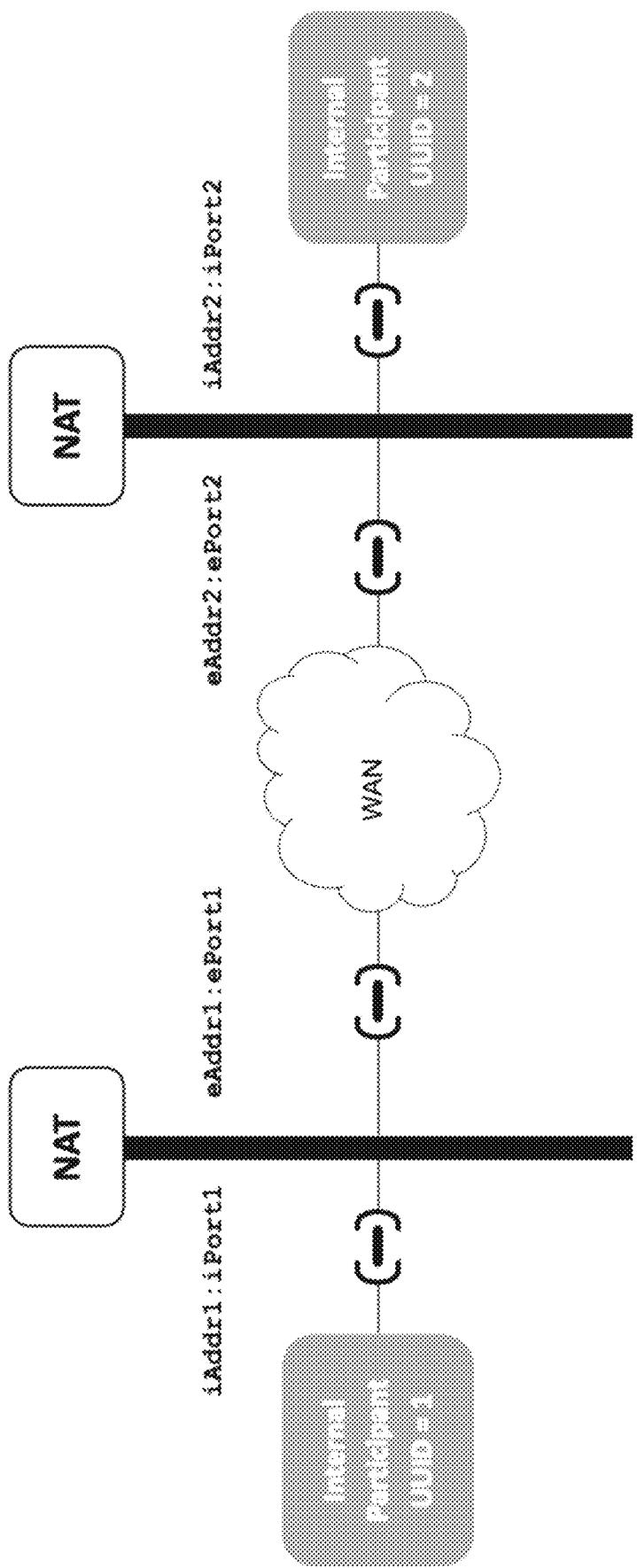
FIG. 13 shows according to an exemplary embodiment of the invention the concept of Communication between Internal Participants.

The UDP Wan Transport can independently work well in a client-server, M-to-1 scenario, independently of the kind of NATs for the internal participants. However, in an M-to-M scenario in which all the participants are internals, the UDP Wan Transport by itself will not allow communication. FIG. 13 illustrates this scenario.

Communication from Participant 1 (UUID=1) to Participant 2 (UUID=2) and vice versa cannot occur at any point because they don't know how to reach each other. Under this situation, the only alternative is considered a third player that can inform the internal participants how they can be reached.

Figure 14:
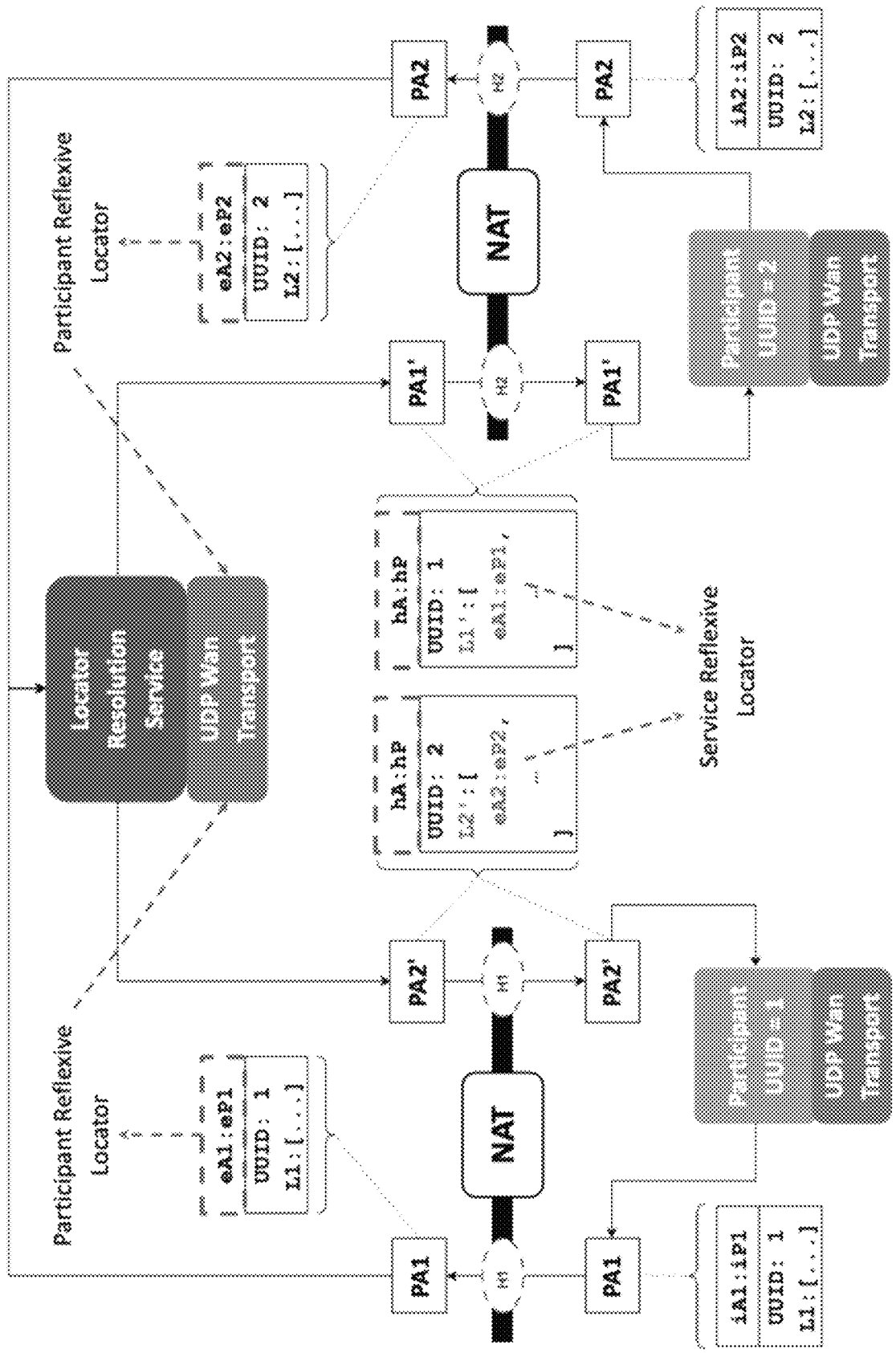
FIG. 14 shows according to an exemplary embodiment of the invention the concept of Solution based on a Locator Resolution Service.

The new third player is a Locator Resolution Service, a publicly reachable application that can obtain participant reflexive locators and provide those to the other participants. These reflexive locators become Service Reflexive Locators from the point of view of the Internal Participant recipients. FIG. 14 shows the solution architecture based on using a Locator Resolution Service application.

Participant 1 sends a discovery Participant Announcement to the LRS. This PA contains information that identifies the participant itself and a list of known locators (typically, host locators). The LRS receives PA1 and it enriches its content by adding the participant reflexive locator to the list of locators (eA1:eP1 in this case).

The enriched PA1' is stored in an internal database and forwarded to the Participant 2. LRS can send the enriched PA1', which contains a service reflexive locator for Participant 1, to Participant 2 using Participant 2 participant reflexive locator. The LRS can send PA1' to Participant 2 because Participant 2 sent PA2 to the LRS first opening a hole in the NAT. The same enrichment procedure is applied for the PA2 announcement sent by Participant 2. Of course, the LRS can forward the enriched PAs to participants that are part of the same domain—and domain tag—.

Figure 15:
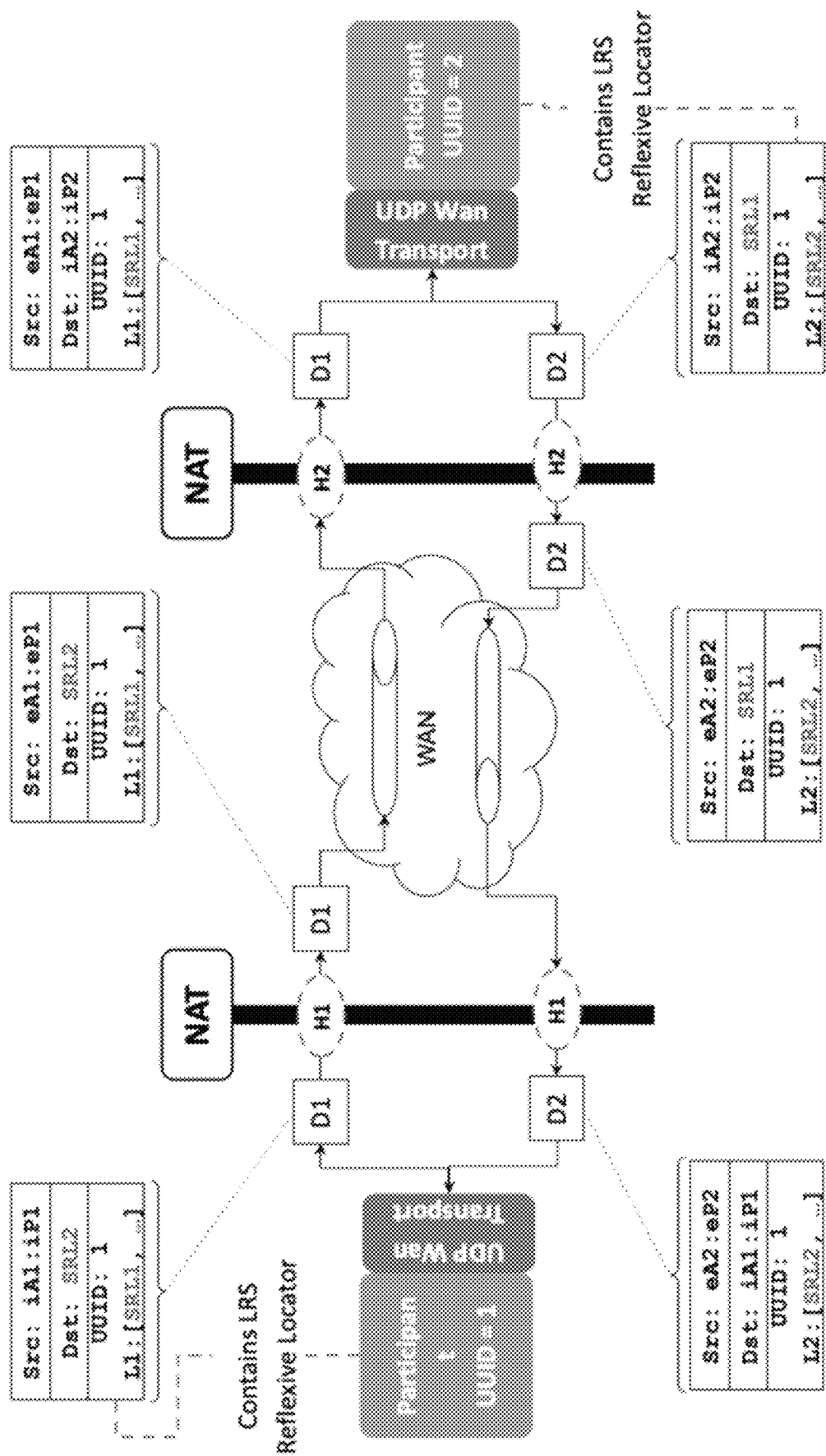
FIG. 15 shows according to an exemplary embodiment of the invention the concept of Communication between internal participants using LRS locators.

FIG. 15 shows that both internal participants have received each other's enriched announcements, enabling them to contact each other using the corresponding service reflexive locator. You can observe that the communication can occur between them only if the NATs are Cone NATs. This is because Participant 1 has to use the LRS reflexive locator for Participant 2 that represents the eA2:eP2 (SRL2 in the diagram). Conversely, Participant 2 has to use the LRS reflexiv locator for Participant 1 that represents the eA1:eP1 (SRL1 in the diagram).

A symmetric NAT changes the public transport address corresponding to an internal transport address based on the destination. Because of that, the service reflexive address for Participant 2 received by Participant 1 from LRS would not be valid to reach Participant 2 because the mapping to communicate with Participant 2 will be different. In other words, the participant reflexive locator for Participant 2 will be different from its service reflexive locator.

Internal Participants Behind Different Symmetric NAT

From the last section we learned that there's a missing piece to support communication when a Participant is behind symmetric NATs. The solution to this problem introduces the concept of a Relay Service (RelS).

Figure 16:
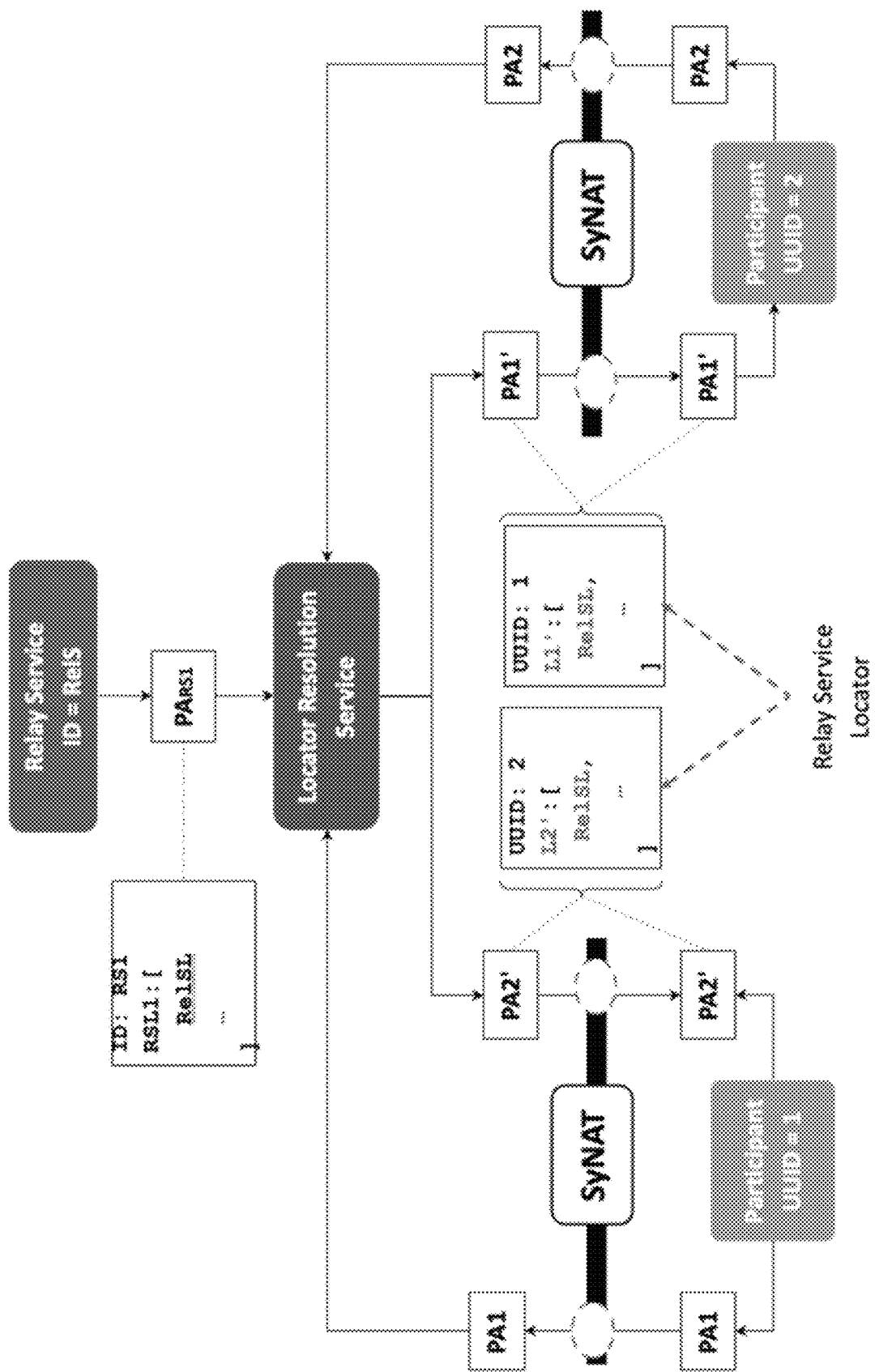
FIG. 16 shows according to an exemplary embodiment of the invention the concept of Solution based on a Relay Service.

FIG. 16 shows the role of the RelS and where it fits in the overall architecture. Essentially, an Internal Participant that is behind a symmetric NAT will communicate with other participants—which can appear behind any kind of NAT—through a RS that is publicly accessible.

The key aspect is that a Participant may not know about the existence of a Relay Service. Only the LRS knows which applications are providing relay offerings, and it enriches all the participant announcements with the Relay Service Locator.

A Participant can then use a RelS locator to communicate with other participants in a transparent way. Effectively, from the Internal Participant point of view, it's talking directly to the peer Internal Participant. Data goes through the RelS invisibly to the internal participants. In other words, while the physical path for the packets follows through the RelS, the logical path is still between the two internal participants.

Figure 17:
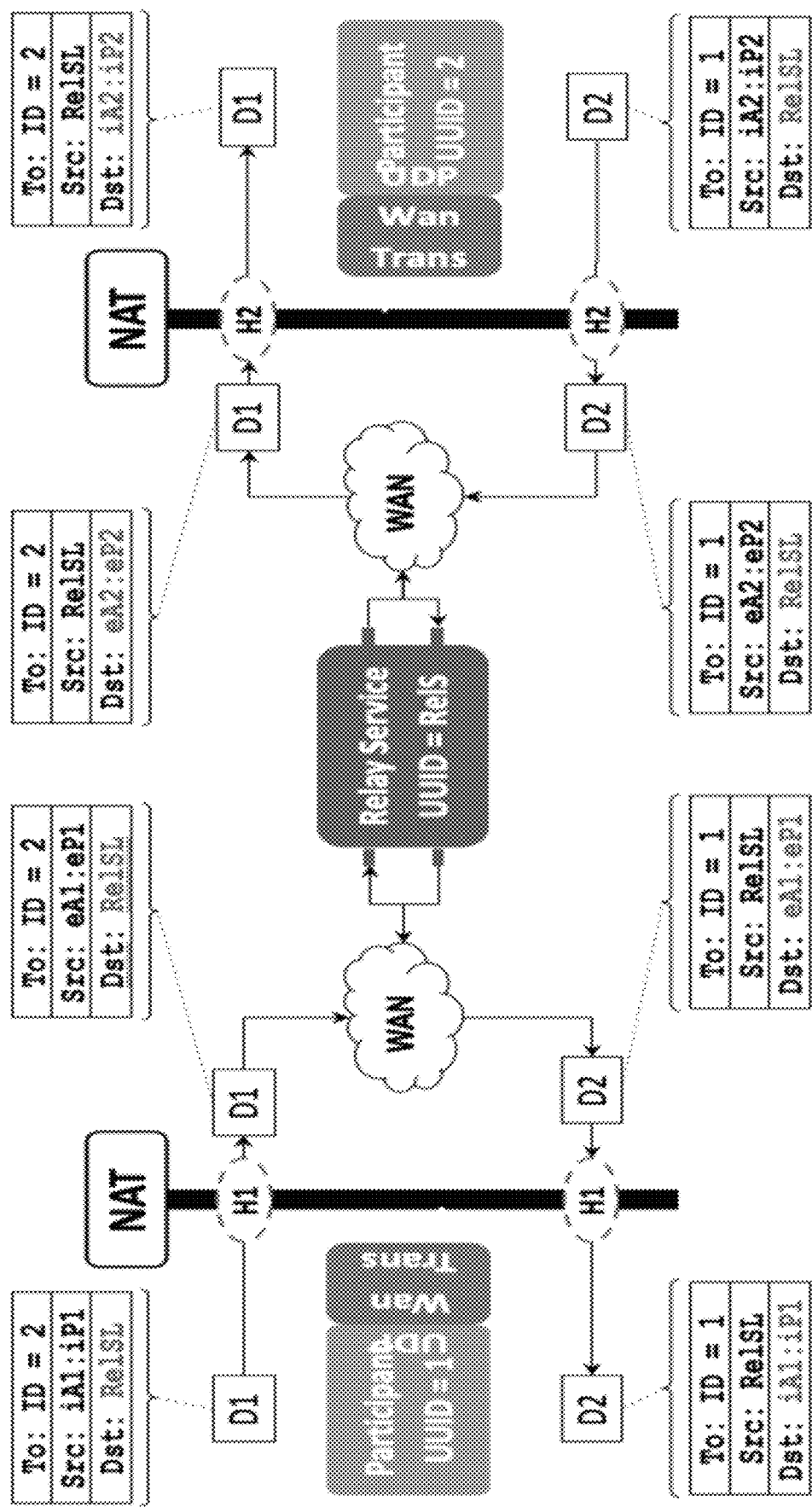
FIG. 17 shows according to an exemplary embodiment of the invention the concept of Communication between internal participants through RelS.

FIG. 17 shows that an Internal Participant 1 can communicate with another Internal Participant 2 by sending data packets to a Relay Service. The RelS forwards the data packet to the proper destination, in this case the mapped public address eA2:eP2 for Participant 2. The data packet will make it through the hole H2, which is created from Participant 2 when it reaches out to the RelS.

Note that a packet from the RelS can reach an Internal Participant through a NAT hole, because the same destination participant also sends packets to the RelS, establishing a fixed mapped address for communication between RelS and Internal Participant.

Internal Participants behind same NAT Communication within a LAN will be done using the existing built-in UDPv4 transport. For additional information see section 'Coexistence with built-in UDPv4 Transport (ULT)'.

NAT Traversal Transport Design

The following section describes the changes required to the built-in UDPv4 transport to support WAN connectivity and NAT traversal.

Although the built-in UDPv4 transport for LAN communication (ULT) and the new built-in UDPv4 transport for WAN communication (UWT) will share source code, they will be separate transports with different class IDs and different instantiations in a DomainParticipant. This is not any different than what we have done for the built-in UDPv6 transport that shares most of its code with the built-in UDPv4 transport.

We decided to keep the ULT transport untouched so that we can interoperate with old versions of the product. ULT destination locators will be prioritized over UWT locators when a transport is reachable using both.

The class ID for the new UWT will be NDDS_TRANSPORT_CLASSID_UDPv4_WAN (0x01000001).

For the sake of simplicity, the transport design described in the following sections assumes that a transport instance can communicate with remote Participants using a single NIC. Therefore, for each host port used for communication (receive port, or send port) there will be a single (<public IP address>:<public port>) in which the host port will be reachable. Section Support For Multihomed Hosts' describes incremental changes to the design presented in the next sections to support different (<public IP address>:<public port>) addresses for a host port.

Configuration

Enabling the Transport

The new UWT transport is built-in into the core libraries but it will not be enabled by default (like UDPv6). To enable it, the user will have to configure the <transport_builtin> mask.

<transport_builtin>
    <mask>UDPv4_WAN</mask>
    </transport_builtin>

Public Address and UDP Ports Configuration

To receive traffic, a DDS endpoint (EP) using the ULT needs the following pieces of information:

The RTPS port in which the endpoint receives data.

The UDP receive port that the ULT instance of the endpoint (one per Participant) uses to receive traffic for the RTPS port. In the RTPS UDP PSM for UDP LAN communications, the UDP receive port is equal to the RTPS port.

The IP address in which the ULT instance receives data.

The ULT locator for EP is (<IP address>:<RTPS port>). It is not necessary to include the UDP receive port because it is equal to the RTPS port.

In addition, to send traffic EP needs the following piece of information:

An ephemeral UDP send port used to send data from the endpoint ULT instance to the ULT instance of a remote endpoint.

Deploying a UDP-based WAN traversal solution introduces a few challenges:

The UWT instance for EP may need to demultiplex all the traffic from a single UDP port to different RTPS ports. Thus, UDP receive ports may be different from RTPS ports.

The UDP receive port where the UWT instance receives traffic is a host port and may not match the port in which the UWT instance is externally reachable (the UDP receive public port).

The IP address in which the UWT instance receives data may not match the address in which the UWT is externally reachable (the IP public address).

The UWT may not be able to use an ephemeral port to send data, it may need to use a well-known UDP send port to send traffic to remote UWT instances that are behind a NAT. The UDP send port may be different from the externally reachable UDP send public port.

What we need to send/receive traffic to/from a DDS Endpoint (EP) using a UWT is the following:

RTPS port: this is the RTPS port where EP receives data.

UDP receive host port: this is the UDP host port that the UWT of EP uses to receive traffic for the RTPS port. The UWT binds a receive socket to this port.

UDP send host port: this is the UDP host port that the UWT of EP uses to send traffic to other endpoints. The UWT binds a send socket to this port.

UDP receive public port: This is the UDP external port in which EP is reachable by other endpoints outside the EP LAN.

This is the port that other endpoints need to know/discover (via discovery announcement, CDS, etc) to send information to EP.

UDP send public port: This is the UDP external port that EP uses to send data to other endpoints outside the EP LAN.

Other endpoints behind NATs will have to know/discover it in order to open (punch) UDP holes between their receive ports and the UDP send public port of EP.

IP public address: This is the external address in which EP is reachable by other endpoints outside the EP LAN.

This is the address that other endpoints need to know/discover (via discovery announcement, CDS, etc) to send information to EP.

The UWT public locator for EP is (<IP public address>:<UDP receive public port>:<RTPS port>). It is not necessary to include the <UDP receive host port> because it is equal to the <RTPS port>.

The new transport design has to be flexible when supporting different port mapping configurations. In particular, we need to meet the following requirements:

The transport shall support multiplexing traffic to multiple destination <RTPS ports> through a single <UDP receive host port>.

The transport shall support scenarios in which the <UDP receive host ports> are different from the <UDP receive public ports>.

The transport shall support scenarios in which a UWT does not need to know its <IP public address>.

Port Mapping Configuration

To make the configuration easier, we will not expose the concept of UDP 'send' versus 'receive' ports to the users. The mapping between <RTPS ports>, <UDP receive host ports>, and <UDP receive public ports> will be optionally configured using a new transport property:

dds.transport.UDPv4_WAN.builtin.comm_ports with the following JSON format:

JSON Configuration
  dds.transport.UDPv4_WAN.builtin.comm_ports:
  {
  "default": {"host": <UDP host port>, "public": <UDP public port>}, "mappings": [
    {"rtps": <RTPS port1>, "host": <UDP host port1>, "public": <UDP public port1>},
    {"rtps": <RTPS port2>, "host": <UDP host port2>, "public": <UDP public port2>},
    . . .
  ]
  }

The attribute "public" is optional. When not specified:

If the dds.transport.UDPv4_WAN.builtin.public_address property is configured, its value is equal to "host".

Otherwise, its value is unknown and it will be determined by the NAT after opening NAT bindings from the host port to remote destinations.

The attribute "public" is only needed when manually configuring port forwarding on the NAT device to use a different value for the forwarded port than the host port. As such, the attribute "public" only has effect when you configure a dds.transport.UDPV4_WAN.builtin.public_address or else it is silently ignored.

For ease of use, the dds.transport.UDPv4_WAN.builtin.comm_ports property can take a single number as value. For example:
  dds.transport.UDPv4_WAN.builtin.comm_ports: 8192
This is equivalent to:
Communication over a Single UDP Port (host=public)
  dds.transport.UDPv4_WAN.builtin.comm_ports:
  {
  "default": {"host": 8192, "public": 8192}
  } which indicates that all communication (send and receive) goes through a single UDP port 8192

The send port will always be the port specified in the default mapping.

Other examples:
Default Configuration
Property not Specified
  receive public port=receive host port=(RTPS port+port_offset)
  For information on port_offset see section 'Coexistence with built-in UDPv4 Transport (ULT)'.
  send public port=send host port="receive host port" associated with the oldest Receive Resource at the moment the first Send Resource is created. In our implementation, this will usually be the discovery receive public port, and once selected it will not change.
  Note: See section 'Usage of Ephemeral Ports for Sending Data' to see why the send host port cannot be ephemeral.

Communication Over a Single UDP Port (Host !=Public)
  dds.transport.UDPv4_WAN.builtin.comm_ports:
  {
  "default": {"host": 8192, "public": 9678}
  }
  send host port=receive host port=8912
  send public port=receive public port=9678
    The receive public port will have to be configured manually by adjusting the NAT device configuration
  All RTPS ports are mapped to 8192 host port Segregating RTPS Traffic in Different UDP Ports
  dds.transport.UDPv4_WAN.builtin.comm_ports:
  {
  "default": {"host": 8900, "public": 9678}, "mappings": [{"rtps": 1234, "host": 3123, "public": 2134}]
  }
  send host port=8900
  send public port=9678
  RTPS port 1234 mapped to receive host port 3123
  receive host port 3123 mapped to receive public port 2134
  Any other RTPS port mapped to receive host port 8900
  receive host port 8900 mapped to receive public port 9678
  XML Configuration for comm_ports
  Example XML using one port with different HOST/PUBLIC mapping:
    <udpv4_wan>
      <comm_ports>
        <default>
          <host>8192</host>
          <public>9678</public>
        </default>
      </comm_ports>
    </udpv4_wan>

Example XML using a specific port to map RTPS port 1234:

```
<udpv4_wan>
  <comm_ports>
    <default>
      <host>8192</host>
      <public>9678</public>
    </default>
    <mappings>
      <element>
        <rtps>1234</rtps>
        <host>9999</host>
        <public>5678</public>
      </element>
    </mappings>
  </comm_ports>
</udpv4_wan>
```

When to Use the Comm_Ports Property

The usage of the comms_port property is optional and only needed when:

For Internal Participant with External Participant communication scenarios.

When the user wants to use a single UDP port for communications.

Public Address Configuration

The public IP addresses in which a UWT is reachable can be optionally configured using the property:

dds.transport.UDPv4_WAN.builtin.public_address.

This property already exists in other transports such as ULT and the TCP transport. The property in UWT has the same meaning. It provides the public address(es) for the transport.

When used, the UWT generates locators containing both a (public_address:public_port) and a UUID. Otherwise, the UWT generates UUID locators. See section 'Locators' for additional information.

This property is only needed for the external Participant in section 'Internal Participant with External Participant' communication scenario if there is no service (Locator Resolution Service) that can do the public address resolution and distribute this public address to internal DomainParticipants (see section 'Locator Resolution Service Design').

XML Configuration for public_address

```
<udpv4_wan>
  <public_address>192.168.1.1</public_address>
</udpv4_wan>
```

The public address can be an actual IP address or a hostname. If the address is a hostname, to support changes to the public IP address of the hostname, the transport will have to be notified of DNS changes. We can do that by registering hostnames with the built-in Netio RTINetioDnsTracker that we are creating for a Participant.

Initial Peers Configuration

The initial peers for the UWT have the following format:

udpv4_wan://<public_ip_address>:<public_udp_port>

Where public_ip_address is the external IP address in which the UWT is reachable and public_udp_port is the external port.

For information about the initial peer format when using the Locator Resolution Service see section 'Locator Resolution Service Design'.

Other Configuration Parameters dds.transport.UDPv4_WAN.builtin.binding_ping_period: This property is used to configure the periodicity of the BINDING_PING messages sent by a UWT instance. See section 'NAT Traversal Specific Messages' for additional info.

dds.transport.UDPv4_WAN.builtin.latency_ping_period: This property is used to configure the periodicity of the LATENCY PING messages sent by a UWT instance. See section 'NAT Traversal Specific Messages' for additional info.

dds.transport.UDPv4_WAN.builtin.link_performance_metrics_window: This property configures the time window in number of seconds over which to calculate the metrics that describe the status of a link (average latency, latency jitter, and loss probability). See section 'Interface Bonding' for additional details.

dds.transport.UDPv4_WAN.builtin.bonding_groups: The transport will allow the creation of bonding groups. A bonding group combines multiple physical interfaces into a virtual interface called a bond. See section 'Interface Bonding' for additional details.

Coexistence with Built-in UDPv4 Transport (ULT)

To provide interoperability with old product versions over UDP we decided to keep the ULT transport untouched. Because ULT and UWT are UDP-based, we have to provide a way to run both transports simultaneously without interfering with each other by binding to the same UDP ports. The new UWT transport will provide the following property to achieve this behavior: dds.transport.UDPv4_WAN.builtin.port_offset with default value 125.

When dds.transport.UDPv4_WAN.builtin.comm_ports is not specified or set to 0, then each RTPS port will map to a UDP port with number (RTPS port+port_offset).

125 has been chosen so that we minimize invading the automatic port range for other domain IDs. By default, each domain gets 250 ports (default domain_id_gain). We have divided the range in two parts. The first part corresponds to ports used by ULT and the second part to ports used by UWT.

Note this will effectively reduce by half the maximum participant index (~119). We should add the proper mechanisms to CORE to automatically adjust this limit to avoid colliding with the ports assigned to a different domain.

The following XML snippet shows how to enable both transports simultaneously:

```
<transport_builtin>
  <mask>UDPv4_WAN|UDPv4</mask>
</transport_builtin>
```

When a Participant is configured to use ULT and UWT simultaneously, the middleware will give priority to the ULT locators.

Does the UWT Transport Support Communication in a LAN?

Yes. However, it is recommended to use the ULT because it is more efficient, it supports multicast, and it is backward compatible with previous Connext DDS releases.

Locators and NAT Traversal Specific Messages

Locators

Destinations are defined in terms of transport locators. A transport locator has a Transport Class ID; an address (made up of a network address and a node address, which together total 128 bits); and a logical port called rtps_port (see for an example priority document 63/092,599).

Locators for NDDS_TRANSPORT_CLASSID_UDPv4_WAN will use a mapping for example shown in priority document 63/092,599).

Flags has the following format: x|x|x|x|R|B|P|U

The R flag indicates if the locator is a relay locator provided by a Relay Service. Locators with the R flag set are called RELAY locators.

The B flag indicates if the locator is unidirectional or bidirectional. Bidirectional locators can send/receive RTPS traffic. Unidirectional locators can only receive RTPS traffic. If the B flag is set, the P flag must be set too. Locators with the B flag set are called BIDIRECTIONAL locators.

The P flag indicates that the locator contains a globally public IP address and public port where a transport instance can be reached. public_ip_address contains the public IP address and public_port contains the public UDP port. The port is always used to receive data and if the B flag is set it is also used to send data. Locators with the P flag set are called PUBLIC locators.

The U flag indicates if the locator contains a UUID. While this identifier by itself cannot be directly used to reach the transport instance, the UUID can be mapped to a public IP address by other Connext DDS applications and services. Also, a locator can have both, the U flag, and the P flag, enabled simultaneously. Locators with the U flag set are called UUID locators.

A PUBLIC+UUID locator (or PUBLIC_UUID locator) is a locator in which both the U flag and P flag are set.

Initial peers locators will have the B and P flags set and the U flag unset.

A locator with the B flag set must also have the P flag set.

The U flag will be set for locators generated automatically by a DomainParticipant or by a Locator Resolution Service.

The P flag will be automatically set for locators generated for a transport setting dds.transport.UDPv4_WAN.builtin.public_address. The flag will be set by the Locator Resolution Service when generating locators containing the participant reflexive address for a locator with UUID.

The UUID of a locator is calculated as follows:
md5=MD5(append(Participant GUID Prefix in network byte order, Local Interface IP in network order))
UUID will be the first 9 bytes of md5.

The probability of collision in a domain with 1M DomainParticipants would be around 10^(−10) which is pretty low.

Locator Equivalence

With UWT the same destination (for a given transport, a remote receive resource identified with a combination of locator address and locator RTPS port) can be represented with multiple locators. For example, we could have a UUID locator and a PUBLIC+UUID locator representing the same destination. As we will see in sections ahead, PUBLIC+UUID locators for a UUID locator can be generated by a Locator Resolution Service.

The concept of equivalence is established between UUID locators. Two UUID locators are equivalent if they have the same UUID, independent of the value P flag.

Because of this new concept of equivalence, when a locator is discovered that is equivalent to an existing locator for the destination, the middleware should not assert a new Send Resource (SR) with the transport with the end result of creating two destinations. The new locator should be considered the same as the existing locator and the number of destinations for the remote entity should stay the same.

At the same time, the new locator may have additional information (such as a PUBLIC address) that is key to start sending RTPS data to a destination. Even though the number of destinations does not change, the transport has to be notified of the existence of this new locator so that it can use the information contained in it to start sending RTPS packets to the destination associated with the locator.

The proposal is to incorporate two new transport plugin APIs called: are_addresses_equivalent and update_destination.

```
typedef RTI_INT32
(*NDDS_Transport_Are_Addresses_Equivalent_Fcn)(
    NDDS_Transport_Plugin*self,
    const NDDS_Transport_Address_t*address_1,
    const NDDS_Transport_Address_t*address_2);
typedef RTI_INT32 (*NDDS_Transport_Update_Destination_Fcn)(
    NDDS_Transport_Plugin*self,
    const NDDS_Transport_Address_t*dest_address_in,
    const NDDS_Transport_Port_t dest_rtps_port_in);
struct NDDS_Transport_PluginImpl {
    NDDS_Transport_Are_Addresses_Equivalent_Fcn are_addresses_equivalent;
    NDDS_Transport_Update_Destination_Fcn update_destination;
};
``` are_addresses_equivalent returns TRUE if two transport addresses are equivalent. If a transport does not set are_addresses_equivalent, the concept of equivalence is based on having the same content.

update_destination allows you to update a destination with the transport. The UWT uses this API to extract the PUBLIC address contained in dest_address for PUBLIC+UUID locators.

Let's assume that a SR is created in a transport for a destination with a UUID locator (UUID_A, rtps_port_A). The SR cannot be used yet to send information to the remote transport associated with the locator. Then, later on, a new PUBLIC+UUID locator is discovered for the same destination (UUID_A, rtps_port_A, public_ip_A, public_port_A). The new locator has enough information to start sending RTPS data to the destination. This information is notified to the transport by calling update_destination after checking for locator equivalence.

Restricting an RTPS Port to a Locator Address

The way that CORE generates locators for a given RTPS port is as follows:
1. Call get_receive_interfaces_cEA( ) Transport API for every available transport to retrieve a list of interfaces.
2. Check if the interface address is routable. This is done by evaluating the interface address against the network address filter we have configured in the DomainParticipant.
3. Return a locator per retrieved interface address. The locator is the combination of the interface address with the provided RTPS port.

As a result, CORE generates locators for all the possible combinations of RTPS ports and interface addresses.

This current behavior is not friendly to UWT locators. This is because these locators contain the public UDP port as part of the locator address and, as described in section 'Port Mapping Configuration', there is mapping between a UDP public port and a set of RTPS ports. As a result, generating all the combinations of PUBLIC addresses with RTPS ports will result in combinations that do not make sense, and it will potentially result in an explosion of locators when adding multiple RTPS port mappings to the comm_ports property.

To address this issue, we will add a new API to the Transport plugin called is_valid_entry_port( ). This API will receive an interface address as returned by get_receive_interfaces_cEA and a receive RTPS port to evaluate if the RTPS port can be served by that interface address.

```
typedef    RTI_INT32    (*NDDS_Transport_Is_Valid_Entry_Port_Fcn)(
    NDDS_Transport_Plugin*self,
    const NDDS_Transport_Address_t*local_address_in,
```

```
const NDDS_Transport_Port_t local_rtps_port_in);
struct NDDS_Transport_PluginImpl {
    NDDS_Transport_Is_Valid_Entry_Port_Fcn is_valid_en-
       try_port;
};
```

This approach will allow us to discard locators that do not make sense, saving both memory and network resources.

Additionally, this API can be used in the future to provide other interesting features, like the ability to bind interfaces to specific RTPS ports. This can be used to support new features like binding specific RTPS ports to specific VLANs (a VLAN will be associated to an interface).

Usage of Ephemeral Ports for Sending Data

The send host port cannot be an ephemeral port because this will not work for use cases in which we try to communicate two internal DomainParticipants behind NATs using a Locator Resolution Service. Each internal Participant will have to create NAT bindings between its RRs and the send public port of the other Participant. However, the only way to know the send public port for the other Participant is by discovering a bidirectional PUBLIC locator for the remote. If the send host port was ephemeral a Participant with this configuration would not generate a bidirectional locator.

NAT Traversal RTPS Messages

The UWT defines three new messages to facilitate the NAT traversal process:

Binding PING Indication (BINDING_PING):

It is an RTPS message containing a BINDING_PING submessage.

BINDING_PING has a format for example shown in priority document 63/092,599).

Binding PING indications are periodically sent from each one of the receive ports of a transport instance 'A' to the public port of a bidirectional PUBLIC locator associated with a transport instance 'B'. It does not require (nor expects) a response. Sent in reverse direction to the regular RTPS traffic. Used for three main purposes:

Create a NAT binding between a receive host port in 'A' (which can be running behind a NAT) and 'B' sending public address (public_ip_address:public_port). Informally we call the creation of a NAT binding "opening a hole".

Keep a NAT binding alive.

Create a mapping between the UUID:rtps_port contained in the PING indication sent by 'A' and a mapped public address (public_ip_address:public_port) associated with the NAT binding.

The EndiannessFlag (E), is present and located in the same position in all Submessages and represents the endianness used to encode the information in the Submessage. The literal 'E' is often used to refer to the EndiannessFlag.

If the EndiannessFlag is set to FALSE, the Submessage is encoded in big-endian format, EndiannessFlag set to TRUE means little-endian.

The LongAddressFlag (L), is used to indicate if the address is 12 or 16 bytes. For the UWT this flag will not be set. However, in the future, other transports may take advantage of this message by setting LongAddressFlag.

PING indications are not sent for locators where the B flag is not set.

The transport property dds.transport.UDPv4_WAN.builtin.binding_ping_period can be used to configure how often the BINDING_PING are sent.

See section 'Communication Flow' to get more information on how the message is used.

Latency PING (LATENCY_PING) and Latency PONG (LATENCY_PONG):

They are RTPS messages containing an INFO_TIME submessage.

The F flag in LATENCY_PING is set to 0 indicating that it expects a LATENCY_PONG response.

The F flag in LATENCY_PONG is set to 1.

The INFO_TIME submessage has the following a format as for example shown in priority document 63/092,599).

The FinalFlag is represented with the literal 'F'. F=1 means that the message does not require a response. LATENCY_PING set F to 0 and LATENCY_PONG set it to 1.

The count is a 64-bit monotonic increasing counter identifying the LATENCY PING message. The transport receiving a LATENCY PING copies the count received in the INFO_TIME submessage of the LATENCY PING into the count in the INFO_TIME submessage of the LATENCY_PONG.

The originate_timestamp is a 64-bit timestamp established by the transport sending the LATENCY_PING and specifying the local time at which the LATENCY_PING departed for the remote transport. The transport receiving a LATENCY_PING copies the originate timestamp received in the INFO_TIME submessage of the LATENCY_PING into the originate timestamp in the INFO_TIME submessage of the LATENCY_PONG.

The ReceiveFlag is represented with the literal 'R'. R=1 means the receive timestamp is included in the message. This is a 64-bit timestamp established by the remote transport specifying the local time at which the LATENCY_PING arrived from the local transport.

Note: The ReceiveFlag is not used as part of the current design but it has been added to INFO_TIME to allow time synchronization in the future. Therefore, it is always set to 0.

The TransmitFlag is represented with the literal 'T'. T=1 means the transmit timestamp is included in the message. This is a 64-bit timestamp established by the remote transport specifying the local time at which the LATENCY_PONG departed for the local transport.

Note: The TransmitFlag is not used as part of the current design but it has been added to INFO_TIME to allow time synchronization in the future. Therefore, it is always set to 0.

The LATENCY_PING and LATENCY_PONG messages are used for interface bonding as described in section 'Interface Bonding'.

The LATENCY_PING messages are periodically sent from a source address (host_ip_source:host_ip_port) to a destination address (public_ip_destination:public_ip_port) and with the LATENCY_PONG messages are used to calculate the network latency and the number of losses in a LINK between a local interface and a specific remote destination.

For every LATENCY_PONG received:
one_way_latency=
(PONG Reception Local Time−LATENCY_PONG.INFO_TIME.originate_timestamp)/2
lost_count+=
(LATENCY_PONG.INFO_TIME.count>last_count)
? LATENCY_PONG.INFO_TIME.count−last_count
: 0

Notice that the one-way latency is including the time elapsed between a LATENCY_PING reception and the sending of the corresponding LATENCY_PONG response (i.e., it is including the LATENCY_PING processing and LATENCY_PONG generation times). This should not be a problem because this time will be the same for a given transport destination independently of the interface from which the RTPS traffic is received. In addition, calculating the LATENCY_PONG generation latency would require extra bandwidth by the sending of the receive_timestamp and the transmit_timestamp.

Also note that this algorithm assumes similar latencies on both directions (PING and PONG), which is not always true. However, we need to make this assumption and use half roundtrip times so the algorithm works on systems where clocks are not in sync.

UUID Locator Mapping Table

The UWT maintains a UUID Locator Mapping table to support UUID locator resolution to public addresses.

Table Description

When a transport instance receives a UUID locator without a public IP address and port (P flag is not set), it cannot use the address in this locator to reach the associated remote transport instance. The transport must create a mapping between the UUID:rtps_port contained in the locator and a public_ip_address:public_port before sending information to the UUID locator.

There are two ways to associate a UUID:rtps_port to a (public_ip_address:public_port):

Reception of a PUBLIC+UUID locator for the UUID: rtps_port. PUBLIC+UUID locators can be generated in two different ways:
By a transport where dds.transport.UDPv4_WAN.builtin.public_address is set
By a Locator Resolution Service Reception of a BINDING_PING for UUID:rtps_port. A BINDING_PING received by a transport can be associated with a (public_ip_address:public_port) by looking at the source address (Participant Reflexive Address) of the BINDING_PING message (which will be the public_ip_address:public_port that can be used to send messages to the UUID:rtps_port contained in the BINDING_PING message).

The table that maintains a mapping between a UUID: rtps_port and its public address is called "Public Address Mapping Table" (public_address_mapping_table) and it stores a mapping from a UUID locator to a public IP address and port. Following there is an example of this table:

| UUID (primary key) | rtps_port (primary key) | public_address | public_port | PING binding entry |
| --- | --- | --- | --- | --- |
| 0102030405060 70809111213 | 7400 | 10.10.1.45 | 6789 | YES |
| 0102030405060 70809111213 | 7400 | 10.10.1.45 | 6789 | NO |
| 0304030405060 70109111213 | 7400 | 10.10.1.46 | 6790 | NO |

The table is indexed by UUID:rtps_port which uniquely identifies a UUID locator.

The "Ping Binding Entry" column indicates if an entry was updated by the reception of BINDING_PING (YES) or by the reception of a PUBLIC+UUID locator (NO) (typically, via a Data(p)). Updates coming from BINDING_PING take precedence over updates coming from a PUBLIC+UUID locator. Still, we keep both for debugging purposes, and also because in the future, we may want to associate an expiration time to the PING BINDING entries.

The reason for this precedence is that the public address obtained from the BINDING_PING message is valid for both symmetric and asymmetric NATs. However, the public address obtained by the reception of a PUBLIC+UUID locator is guaranteed to be valid only for asymmetric NATs as this PUBLIC+UUID locator may have been built by a Locator Resolution Service.

In addition, if the NAT supports hairpinning and the two transports are within the same network, the mappings generated from BINDING_PING will resolve to the local network address (so no need to go through the NAT).

The public_address_mapping_table will be used to associate reachable public IP addresses and ports to SRs.

Table Modification

The public_address_mapping_table and the association of a public IP address and port to a UUID SR is updated as follows:

1. When a new SR is created for the UUID locator without the P flag set (UUID_A, rtps_port_A)
   a. The transport will look for an entry in the public_address_mapping_table
   b. If the entry exists, the transport will associate the SR to the public_addres:public_port in the entry and it will be able to send information on the SR.
   c. Otherwise, the transport will mark the SR as pending.
2. When a new PING indication is received for UUID_A: rtps_port_A:
   a. The transport will look for an entry in the public_address_mapping_table
   b. If a PING entry exists, the transport will replace the entry because the new PING indication message provides the most up-to-date information.
   c. The transport will add the following entry to the public_address_mapping_table (UUID_A, rtps_port_A, public IP from which PING indication was received, public port from which PING indication was received, YES).
   d. The transport will associate the SR for UUID_A: rtps_port_A to the public address in the new entry and it will be able to send information on the SR.
3. When a UUID+PUBLIC locator is received for (UUID_A:rtps_port_A):
   a. The transport will look for an entry in the public_address_mapping_table for UUID_A:rtps_port_A.
      i. If the entry exists and is marked as updated by the reception of a BINDING_PING, the transport will not do anything.
      ii. If the entry does not exist the transport will add a new row to the public_address_mapping_table
   b. If there was a change in the public_address_mapping_table, the transport will associate the SR for (UUID_A:rtps_port_A) to the new public_addres: public_port and it will be able to send information on the SR.

Communication Flow

The following sections show the message exchange between two transports 'A' and 'B' to establish communication in the presence of NATs under different scenarios. For the sake of simplicity, the sections assume that there is a single interface in each transport for communications. For details on multihome configurations see section 'Support For Multihomed Hosts'.

External Transport Using a Single Port for Sending and Receiving

In the following scenario Transport 'A' is behind a NAT and Transport 'B' is external. The user configures the property dds.transport.UDPv4.builtin.public_address in Transport 'B' and there is no Locator Resolution Service.

The DomainParticipant and Endpoint discovery traffic for Transport 'A' contains UUID locators. The DomainParticipant and Endpoint discovery traffic for Transport 'B' contains PUBLIC+UUID locators because dds.transport.UDPv4.builtin.public_address is configured.

Figure 18:
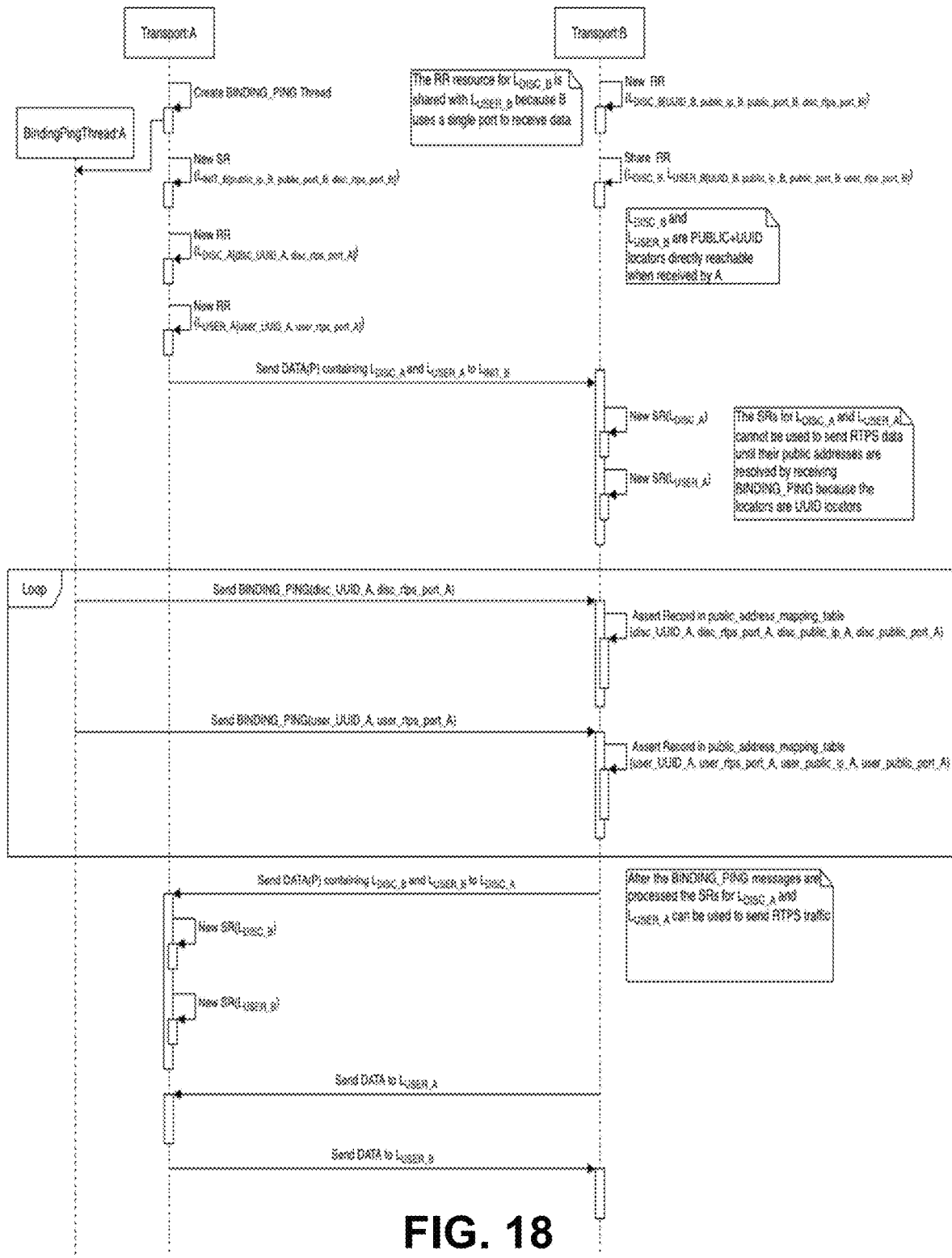
FIG. 18 shows according to an exemplary embodiment of the invention the concept of External Transport Using the Same Receive and Send Port.

Transport 'A' Configuration
   Initial peers:
      0@udpv4_wan://public_ip_B:public_port_B
   Configuration:
      <mask>UDPv4_WAN<mask>
Transport 'B' Configuration
   Initial peers: <EMPTY>
   Configuration:
      <mask>UDPv4_WAN<mask>
      dds.transport.UDPv4.builtin.comm_ports: public_port_B (in this case we are assuming that the NAT device has been configured such as public_port_B is equal to host_port_B). This port is used to receive and send RTPS traffic.
      dds.transport.UDPv4.builtin.public_address: public_ip_B FIG. 18 shows how communication is established between an internal DomainParticipant and an external DomainParticipant using a single UDP port.

Threading Model

Transport A, that is behind a NAT, and does not configure a port mapping has the following threads:
   One external receive thread for RR for $L_{DISC\_A}$
   One external receive thread for RR for $L_{USER\_A}$
   One transport thread to send BINDING_PING messages to Transport B. BINDING_PING messages are only sent to bidirectional PUBLIC locators.
      Not every transport has to create the BINDING_PING thread. To optimize to resource consumption the creation of the thread can be delayed until the first bidirectional SR is asserted.

Transport B, that is external, and configures the port mapping and a public address, has the following threads:
   One external receive thread for shared RR for $L_{DISC\_B}$ and $L_{USER\_B}$ Socket Model Transport A creates two sockets:
   One bidirectional socket bound to (host_ip_A, disc rtps_port_A) that is used to receive discovery RTPS traffic and to send all RTPS traffic to other transports.
   One unidirectional socket bound to (host_ip_A, user rtps_port_A) that is used to receive user data RTPS traffic.

Transport B creates one socket:
   One bidirectional socket bound to (host_ip_B, host_port_B) that is used to send and receive all RTPS traffic.

General Comments

In all scenarios, data reception in all sockets is done by the middleware receiving threads. The received data is provided to the middleware except for BINDING_PING messages that are processed by the transport.

External Transport Using a Separate Port to Receive Traffic on a Topic

This scenario builds on top of the previous scenario and it shows how to separate the traffic from different Topics into different UDP ports.

For example, in an autonomous driving use case, the user may want to separate the ALARM Topic from the rest of the Topics (e.g, VIDEO) to make sure that ALARM data is not replaced or rejected in the receive socket buffers by VIDEO data that is coming at a higher frequency.

Transport 'A' Configuration
   Initial peers:
      0@builtin.udpv4_wan://public_ip_B:public_port_B
   Configuration:
      <mask>UDPv4_WAN<mask>
Transport 'B' Configuration
   Initial peers: <EMPTY>
   Configuration:
      <mask>UDPv4_WAN<mask>
      dds.transport.UDPv4.builtin.comm_ports:
      {
      "default": {"host": host_port_B},
      "mapping": [{"rtps": alarm_rtps_port_B, "host": alarm_host_port_B}]
      }
      dds.transport.UDPv4.builtin.public_address: public_ip_B
   Alarm DataReader configuration:
      <datareader_qos>
        <unicast>
          <value>
            <element>
              <transports>
                <element>builtin.udpv4_wan</element>
              </transports>
            <receive_port>$(alarm_rtps_port_B)</receive_port>
            </element>
          </value>
        </unicast>
      </datareader_qos>

Figure 19:
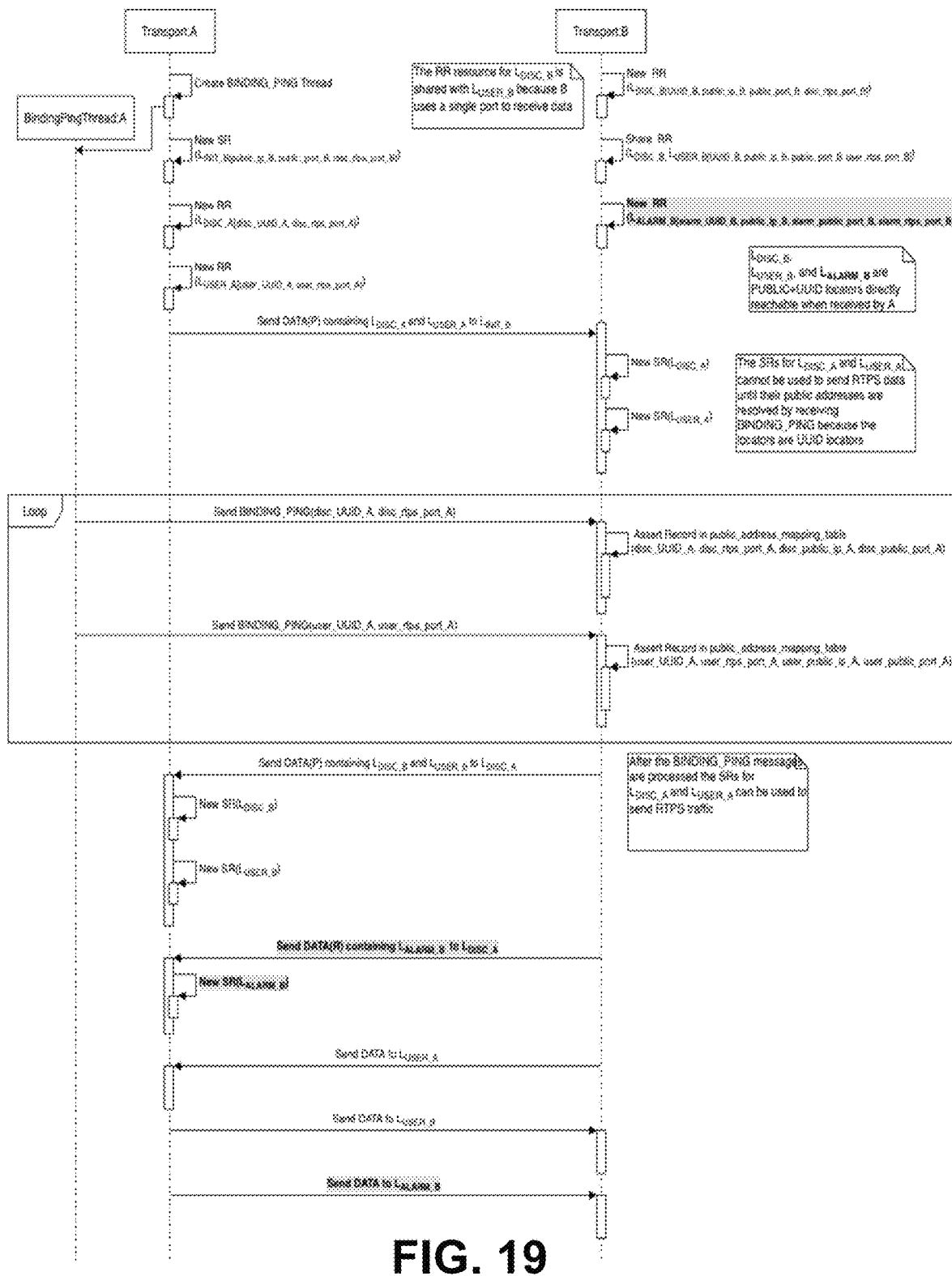
FIG. 19 shows according to an exemplary embodiment of the invention the concept of External Transport Using a Separate Port to Receive Traffic on a Topic.

FIG. 19 shows how communication is established between an internal DomainParticipant and an external DomainParticipant using different UDP ports.

Threading Model

The RR for $L_{ALARM\_B}$ is served by a separate receive thread.

Socket Model

Transport B creates a separate receive socket bound to (host_ip_B, alarm host_port_B) to receive alarm data.

Using a Single Port for Communications in the External and Internal Transport

In the scenario described in section 'External Transport Using a Single Port for Sending and Receiving' only the external transport was using a single UDP port for communication. The following scenario shows how to use a single UDP port for both, the internal, and the external transport.

Figure 20:
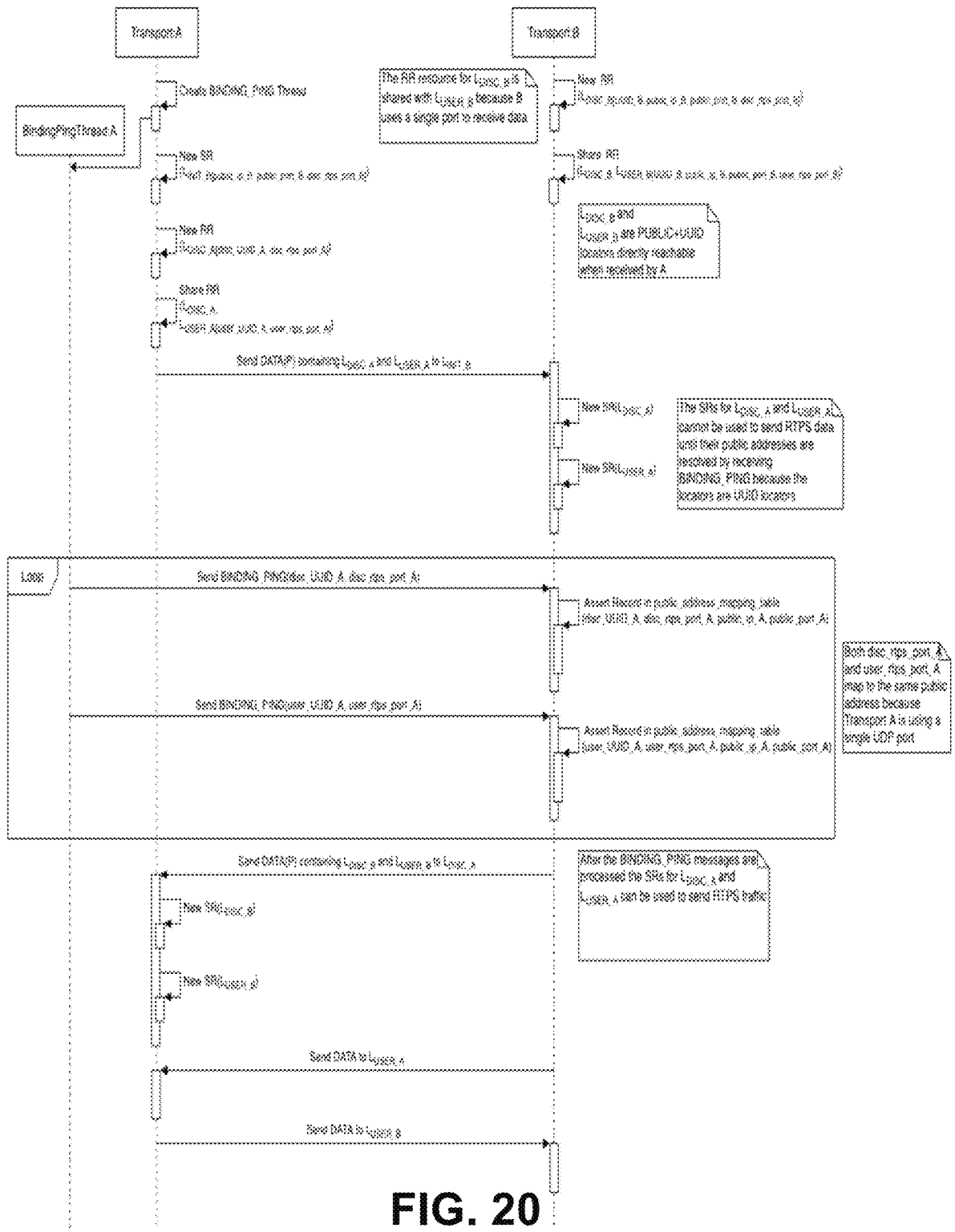
FIG. 20 shows according to an exemplary embodiment of the invention the concept of External and Internal Transport Using a Single Port.

Transport 'A' Configuration
   Initial peers:
      @udpv4_wan://public_ip_B:public_port_B
   Configuration:
      <mask>UDPv4_WAN<mask>
      dds.transport.UDPv4.builtin.comm_ports: host_port_A. This port is used to receive and send RTPS traffic. Note that Transport 'A' does not need to change the NAT to map host_port_A to a public port.
Transport 'B' Configuration
   Initial peers: <EMPTY>
   Configuration:
      <mask>UDPv4_WAN<mask>
      dds.transport.UDPv4.builtin.comm_ports: public_port_B (in this case we are assuming that the NAT device has been configured such as public_port_B is equal to host_port_B). This port is used to receive and send RTPS traffic.
      dds.transport.UDPv4.builtin.public_address: public_ip_B FIG. 20 shows how communication is established between an internal DomainParticipant and an external DomainParticipant using a single UDP port in both, the internal and the external DomainParticipants.

Two Internal Participants Behind Cone NATs Using a Locator Resolution Service and a Single Port for Communication This scenario shows how to establish peer-to-peer connectivity between two DomainParticipants that are behind Cone NATs. None of the Transports configures the dds.transport.UDPv4.builtin.public_address property because they do not know what their public address is.

The Locator Resolution Service (LRS) will be Cloud Discovery Service. This service converts UUID locators into PUBLIC+UUID locators. For additional information of the Locator Resolution Service see section 'Locator Resolution Service Design'.

Transport 'A' Configuration
  Initial peers:
    rtps@udpv4_wan://public_ip_LRS:public_port_LRS
  Configuration:
    <mask>UDPv4_WAN<mask>
    dds.transport.UDPv4.builtin.comm_ports: host_port_A. This port is used to receive and send RTPS traffic. public_port_A is unknown and its value will be established by the NAT once Transport A sends a message from host_port_A to the LRS.

Transport 'B' Configuration
  Initial peers:
    rtps@udpv4_wan://public_ip_LRS:public_port_LRS
  Configuration:
    <mask>UDPv4_WAN<mask>
    dds.transport.UDPv4.builtin.comm_ports: host_port_B. This port is used to receive and send RTPS traffic. public_port_B is unknown and its value will be established by the NAT once Transport B sends a message from host_port_B to the LRS.

Figure 21:
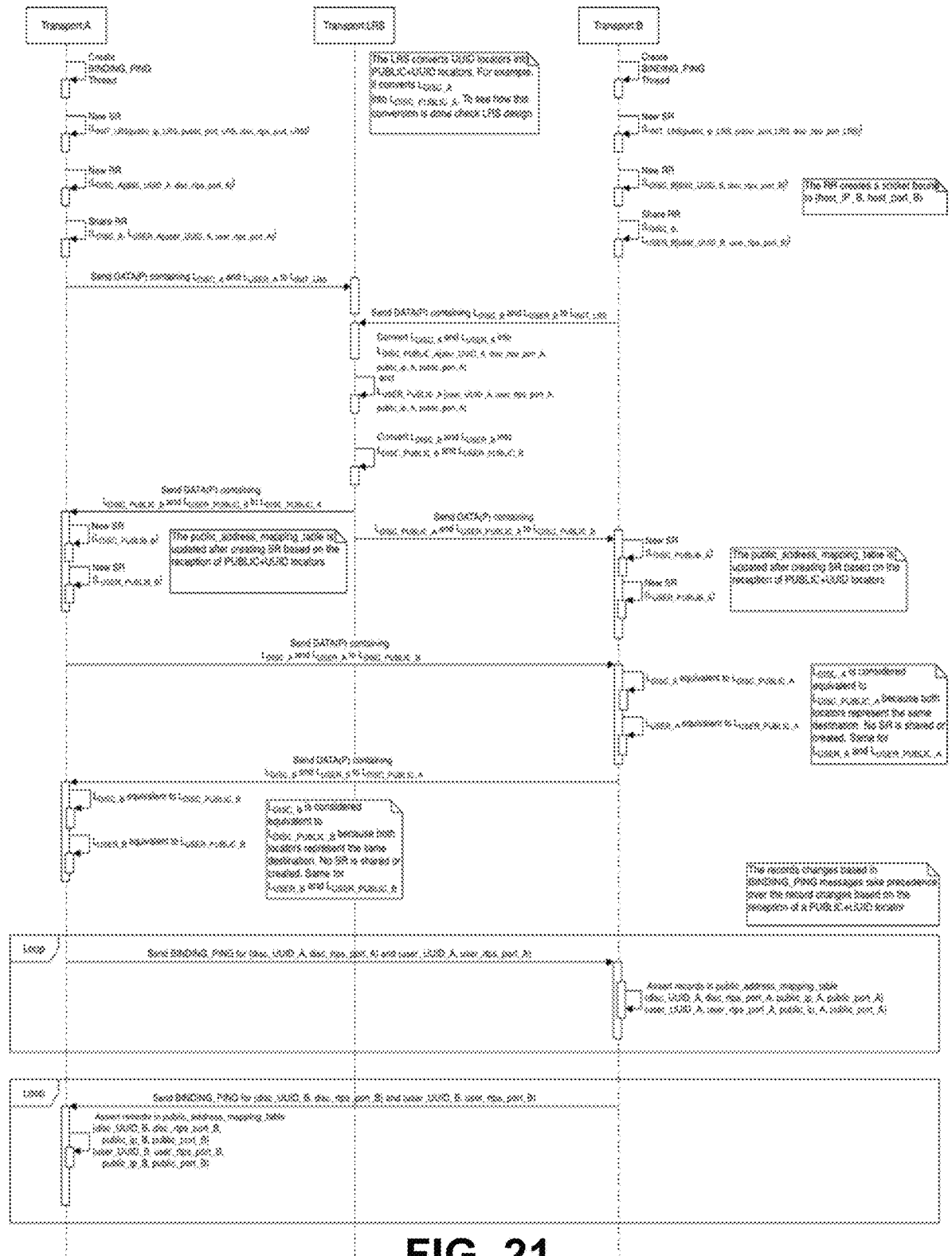
FIG. 21 shows according to an exemplary embodiment of the invention the concept of Two Internal Participants behind Cone NATs using a Locator Resolution Service and a Single Port for Communication.

FIG. 21 shows how communication is established between two internal DomainParticipants using a Locator Resolution Service.

General Comments

The usage of a Locator Resolution Service (LRS) is also compatible with configurations in which a transport is configured to use different UDP ports to receive traffic in different Topics.

The LRS need to bootstrap communication as shown in FIG. 21. From there the exchange of specific UUID Topic locators is done using endpoint discovery traffic as shown in section 'External Transport Using a Separate Port to Receive Traffic on a Topic'.

Handling Transport Priorities

To handle transport priorities, the current built-in UDPv4 transport (ULT) creates a different send socket per (priority, remote locator). Each socket gets its own ephemeral port. The transport then sets the socket option IP_TOS on the socket.

Because with the NAT traversal UDP transport, there are no ephemeral ports, it is not possible to create multiple send sockets bound to the same port unless we use SO_REUSEPORT.

We should explore two options to support transport priority and pick one. The implementation will use only one model:
  Use a single send socket and the priority will be set per message using the msghdr.msg_control while sending a message through sendmsg( ).
  Create one socket per priority using the socket option SO_REUSEPORT.

Support for Multihomed Hosts

The existing built-in UDPv4 (ULT) transport creates send and receive sockets for unicast communications bound to the INADDR_ANY.

A receive socket bound to the INADDR_ANY will receive UDP packets directed to any one of the interfaces in the host where the transport is running.

A send socket bound to the INADDR_ANY will choose the source IP address for the outgoing packets. Generally, when a local interface isn't specified for a socket the one it is assigned is derived from looking up the remote address in the routing table and taking the address of the interface with the most preferred route to the remote address. However, this behavior is not standard across OSs.

Figure 22:
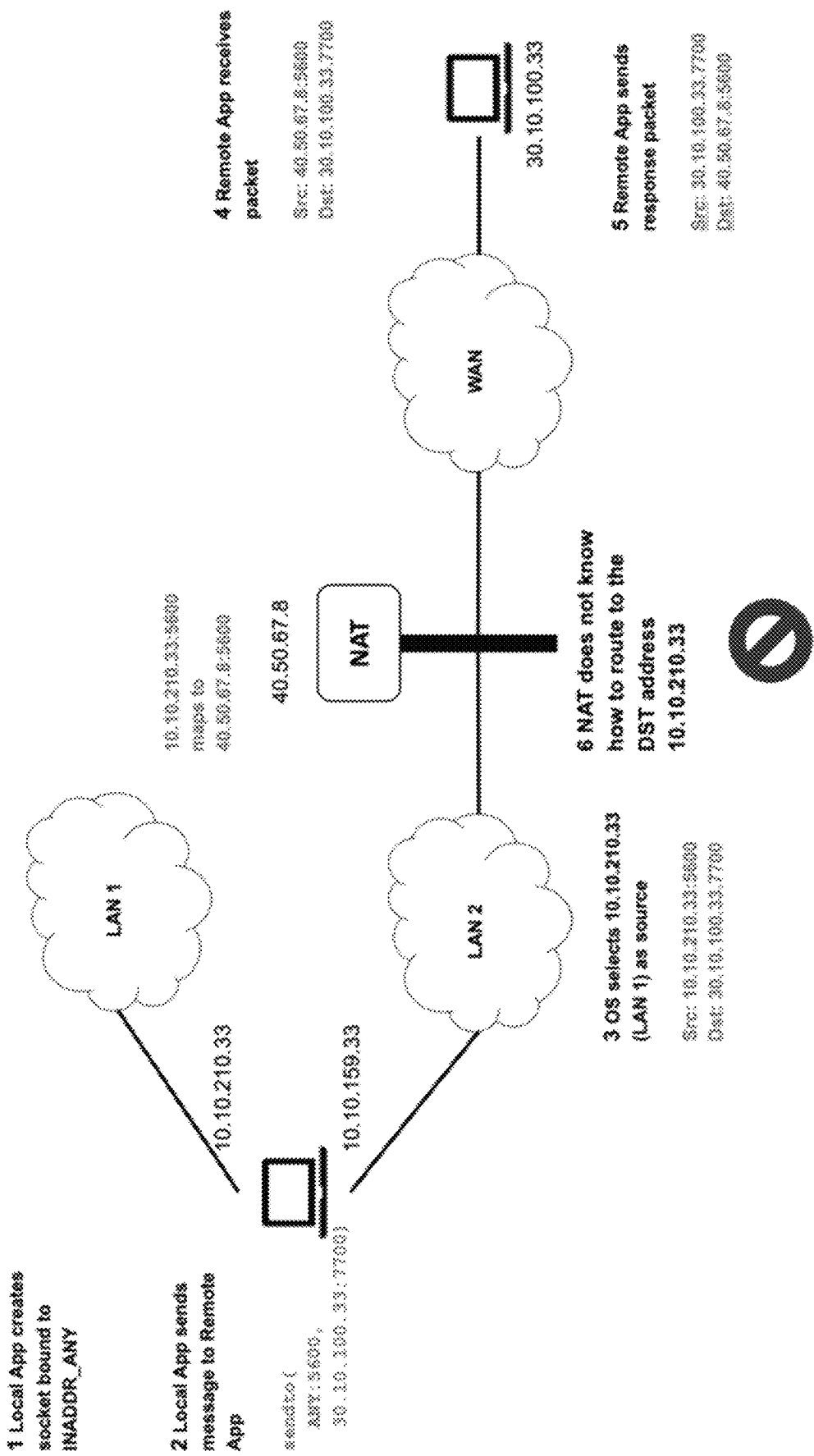
FIG. 22 shows according to an exemplary embodiment of the invention the concept of Multihomed Challenges.

Because of this, using the INADDR_ANY to send packets from multihomed hosts in the presence of NATs can lead to unexpected behaviors as shown in FIG. 22.

In the WAN transport described in this design document, the sockets associated with the receive resources require bidirectional communication and are exposed to the problem described in FIG. 22.

The receive socket in a RR for a transport behind a NAT sends PING messages to open NAT holes and receive RTPS traffic back. The destination transport uses the public IP address and port obtained from the socket when the PING messages are received to reach the RR.

Changes Require to Support Multihomed Hosts

There are multiple reasons why multihomed hosts should be supported including:
  Redundancy. On the receiving end, the user may want to be able to receive packets on different public addresses as a fault tolerance mechanism.
  Bonding. On the sending end, the user may want to be able to use different local interfaces to communicate with a remote Participant in order to improve performance (see section 'WAN Bonding')

To support multihomed hosts that transport will have to be updated as follows:
  For every UDP host port (configured using the property dds.transport.UDPv4.builtin.public_address), a transport instance will create one socket per local interface. Each socket will be bound to a different local interface. The transport will not use INADDR_ANY.
  For every message sent to a SR, the transport will choose the local interface from which to send the message. This process is known as interface bonding.

Interface Bonding

Interface bonding describes the process of selecting one or more interfaces to send packets to a destination locator.

Note that when trying to send data to a remote transport instance there are two independent but related problems:
  The selection of a remote destination to reach an endpoint when several are available. This problem will be resolved using the Locator reachability feature. For more information see section 'Locator Selection'.
  The selection of one or more local interfaces to reach the selected destination. This is what is referred to as bonding.

When a transport instance has more than one interface, the transport must select one or more of these interfaces to send packets to each one of its destination locators.

The selection of the interface in which to send an RTPS packet to a destination is based on three criteria:
  Link status:
    Communication latency between a local interface and a remote destination Latency jitter between a local interface and a remote destination Packet losses between a local interface and a remote destination Transport priority of the RTPS packet being sent Monitoring Latency and Packet Losses To monitor latency and packets losses between a source address (host_ip_source:host_ip_port) and a destination address (public_ip_destination:public_ip_port) the transport sends LATENCY_PING RTPS messages periodically from the source address to the destination address.

The transport maintains a link status table called "Link Status Table" (link_status_table) that stores information including average latency, latency jitter (normalized standard deviation), and packet loss probability (between 0 and 1) for link.

These metrics are calculated over a configurable period of time defined by dds.transport.UDPv4_WAN.builtin.link_performance_metrics_window.

Class Selector PHBs (CS)—which maintain backward compatibility with the IP precedence field of the old TOS field These are commonly used DSCP values (see examples in priority document 63/092,599).

There are four Assured Forwarding classes as shown in FIG. 23, denoted by the letters AF followed by two digits. The first digit denotes the AF class and can range from 1 through 4. The second digit refers to the level of drop preference within each AF class and can range from 1 (lowest drop preference) to 3 (highest drop preference).

Figure 24:
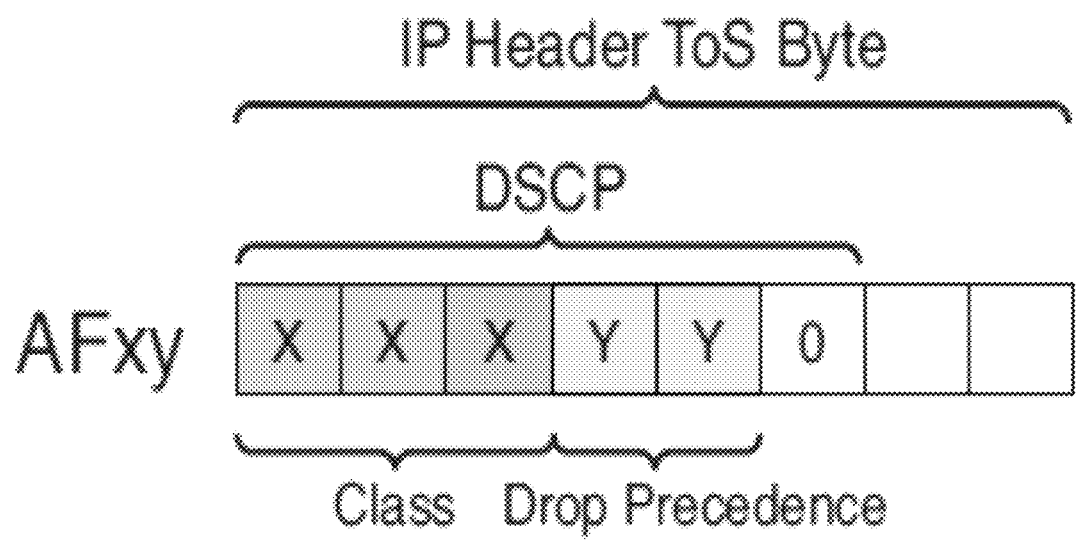
FIG. 24 shows according to an exemplary embodiment of the invention the concept of AF PHB encoding scheme.

For example, during periods of congestion (on an RFC 2597—compliant node), AF33 would statistically be dropped more often than AF32, which in turn would be dropped more often than AF31. FIG. 24 shows in the front shows the AF PHB encoding scheme. RFC 4594—offers detailed and specific recommendations for use and configuration of code points.

| UUID (primary key) | host_ip_source (primary key) | host_ip_port (primary_key) | public_ip_destination | public_ip_port | Avg Latency (usec) | Latency Jitter | Message Loss Probability (MLP) |
|---|---|---|---|---|---|---|---|
| 01020304050607 0809111213 | 192.168.1.1 | 7978 | 10.10.5 .6 | 10987 | 10 usec | 0 | 0.1 |
| 03040304050607 0109111213 | 192.168.2.1 | 7978 | 10.10.5.6 | 10987 | 12 usec | 12 | 0.9 |

Links with 100% packets losses will have a loss probability of 1 and they will never be chosen for communication.

How often the LATENCY_PING are sent can be configured with the property dds.transport.UDPv4_WAN.builtin.latency_ping_period.

Packet Priority

To determine the source interface that will be used to send data to a destination, this solution will take advantage of the transport priority field (TransportPriorityQosPolicy) that can be set per DataWriter. When working with UDP transports this field maps to the Differentiated Services Code Point (DSCP) field in the IP packet.

The idea is to use the transport priority for two purposes:
Setting the DSCP field in the outgoing IP packet containing the RTPS message
Selecting the local interface that will be used to send the RTPS message The selection of the local interface based on a transport priority value 'V' should be compatible with the DSCP QoS selection corresponding to 'V'.

DSCP Interpretation

In theory, a network could have up to 64 different traffic classes using the 64 available DSCP values (6-bit). The DiffServ RFCs recommend, but do not require, certain encodings. This gives a network operator great flexibility in defining traffic classes. In practice, however, most networks use the following commonly defined per-hop behaviors:
Default Forwarding (DF) PHB—which is typically best-effort traffic
Expedited Forwarding (EF) PHB—dedicated to low-loss, low-latency traffic
Assured Forwarding (AF) PHB—gives assurance of delivery under prescribed conditions Service Class Characteristics (see examples in priority document 63/092,599).

DSCP to Service Class Mapping (see examples in priority document 63/092,599).

Selection of Local Interface Based on DSCP Value

Following we describe the algorithm that chooses a source address (host_ip_source:host_ip_port) to send an RTPS message to a destination address (public_ip_destination:public_ip_port).

From the sender point of view each link between a source address and a destination has associated with it:
A "message loss probability" (MLP) that accounts for how likely it is for a LATENCY_PING message sent to that destination to be lost. It is a value between 0 and 1. Think of it as the % of messages sent to the destination locator that are lost by the transport.
A "message average latency" (MAL) that provides the average latency for LATENCY_PING messages sent on the link.
A "message latency jitter" (MLJ) that provides the latency jitter as the normalized standard deviation of the latency.
A "message cost" for sending the message (MC). This value is calculated from the previous three values as follows: (MAL+MLJ)/(1−MPL). Think of it as a dollar cost per message.

We will order the communication links in several lists according to different criteria. The lists are built using the Service Class Name categorization described in FIG. 24.

LinkMC List:
Ordered in ascending order first based on MC
Second based on (MAL+MLJ)
Third based on MPL LinkThroughput List:
    Ordered in ascending order first based on MPL
    Second based on MAL
    Third based on MLJ
LinkLowLatency List:
    Ordered in ascending order first based on MPL
    Second based on MAL
    Third based on MLJ
LinkStreaming List:
    Ordered in ascending order first based on MPL
    Second based on MAL
    Third based on MLJ
LinkConferencing List:
    Ordered in ascending order first based on (MAL+MLJ)
    Second based on MPL Then we will map links to DSCP values as indicated in the following table.

Mapping of Links to DSCP Values (see examples in priority document 63/092,599).

Aggregation Groups

The transport will allow the creation of bonding groups. A bonding group combines multiple physical interfaces into a virtual interface called a bond. Samples are published in a bonding group based on a dispatch policy value (e.g, round robin fashion) with a deactivation threshold to stop using an interface from the group if it is not behaving well.

To configure bonding groups use the new transport property:

dds.transport.UDPv4_WAN.builtin.bonding_groups
dds.transport.UDPv4_WAN.builtin.bonding_groups:
{
"groups": [
    {
        "interfaces": ["eth0", "eth1"],
        "transport_priority": 123
        "interface_deactivation_threshold":
0.5
"distribution_policy": "RR"
},
{
    "interfaces": ["eth2", "192.56.7.8"],
    "interface_deactivation_threshold": 0.25
    "distribution_policy": "HASH"
    "hash fields":
["destination_guid_prefix"]
}
]
}

Any interface not listed in the "groups" is considered a bonding group by itself.

The interfaces is optional. If the field is not provided for a group, the transport assumes all available interfaces. The interfaces can be provided using an IP or an interface name.

The transport_priority is optional. When the field is set for a bonding group 'BGA', all the traffic with the same transport priority (as per TransportPriorityQosPolicy configuration) is sent using the 'BGA'. When this field is set, it overwrites the link automatically selected for the equivalent DSCP value (see section 'Packet Priority').

The interface_deactivation_threshold is optional. The field represents the percentage degradation on the MC value with respect to the interface with the best MC within the group below which an interface within the group is not used to send data. If not set, the value is −1 (INFINITE).

For example, with an interface_activation_threshold of 0.1 the transport will only use interfaces in the group with MC value within 10% of the best value.

The distribution_policy is mandatory. This field configures how to pick the interface in which to send an RTPS packet. There are three possible values: RR (Round-Robin), HASH (interface is chosen based on packet hash calculation), BR (Broadcast). The BR sends a packet on all available interfaces considering the interface_deactivation_threshold.

With the hash_fields the user can configure which fields are used in the hash calculation. Possible values are:
    destination_guid_prefix: it will allow us to group traffic based on the destination Participant. All traffic for the same Participant will go over a single physical interface in a bonding group.
    destination_rtps_port: it will allow us to group traffic based on the destination rtps port. All traffic for the same destination_rtps_port will go over a single physical interface in a bonding group.
    destination_ip: it will allow us to group traffic using the destination_ip. All traffic for the same destination_ip will go over a single physical interface in a bonding group.

Bonding groups are considered as a single interface when associating them to DSCP values. The performance metric values used for DSCP assignment (MC, MPL, MAL, and MLT) are calculated as an average of the performance metric values of the active members within the group.

Locator Resolution Service Design

In section 'Internal Participants behind Cone NATs', we proposed the existence of a Locator Resolution Service that's in charge of resolving the public locators associated with internal participants. This service would subscribe to participant announcements (PAs or DATA(P)) and resend them with an enriched locator list.

RTI Cloud Discovery Service is currently providing the store & forward of PAs. Namely, CDS for each received PA, it will store it in an internal in-memory DB and immediately forward it to the rest of existing participants in the DB.

Figure 25:
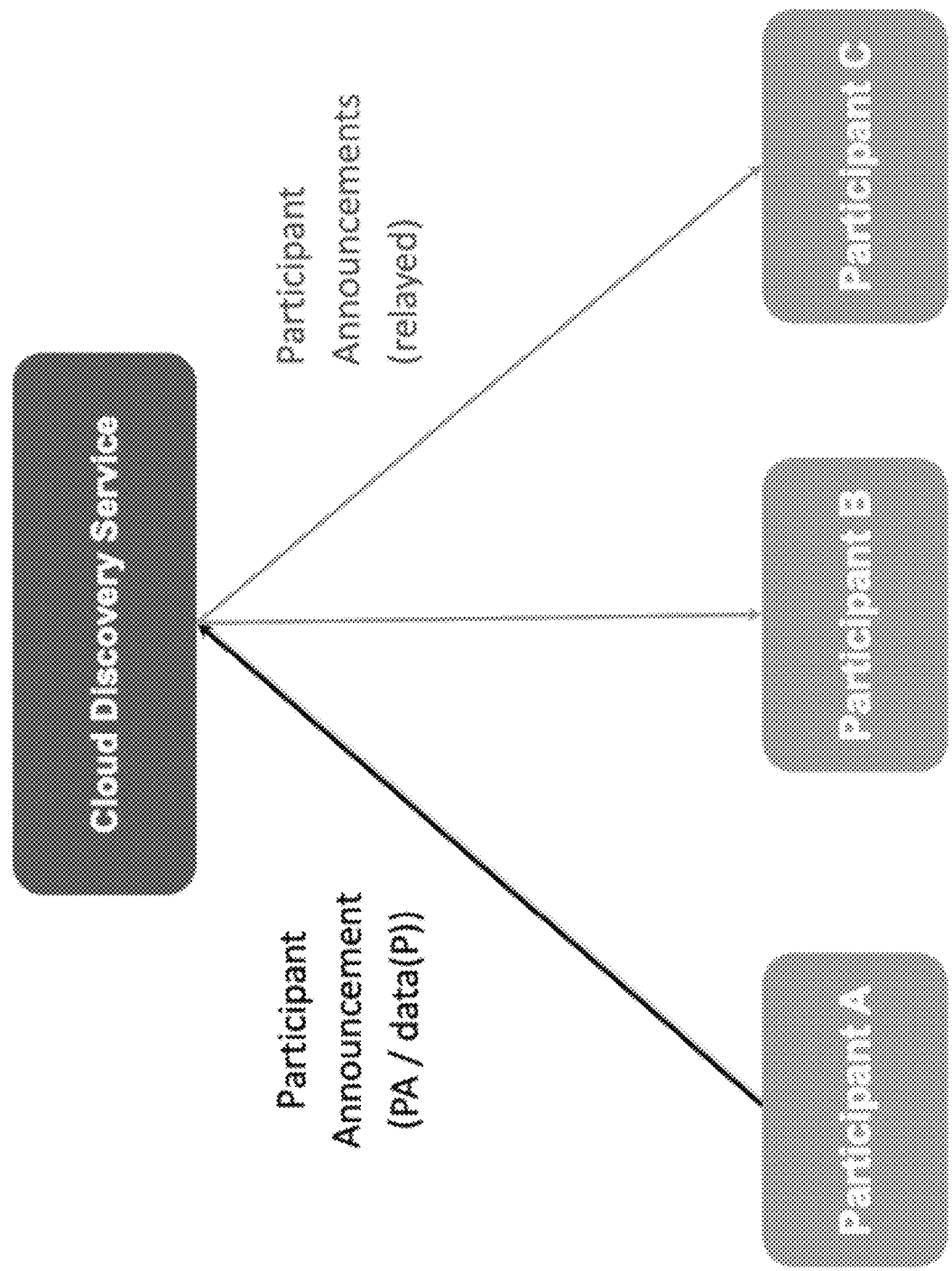
FIG. 25 shows according to an exemplary embodiment of the invention the concept of CDS basic behavior.

FIG. 25 shows the basic behavior CDS performing the PA relay. The announcement for a Participant is relay to all remaining participants that belong to the same domain. Hence, CDS can be easily extended to perform the enrichment process of the PAs. Therefore, the LRS solution will be implemented as an enhancement to the existing CDS.

Solution Based on CDS

Figure 26:
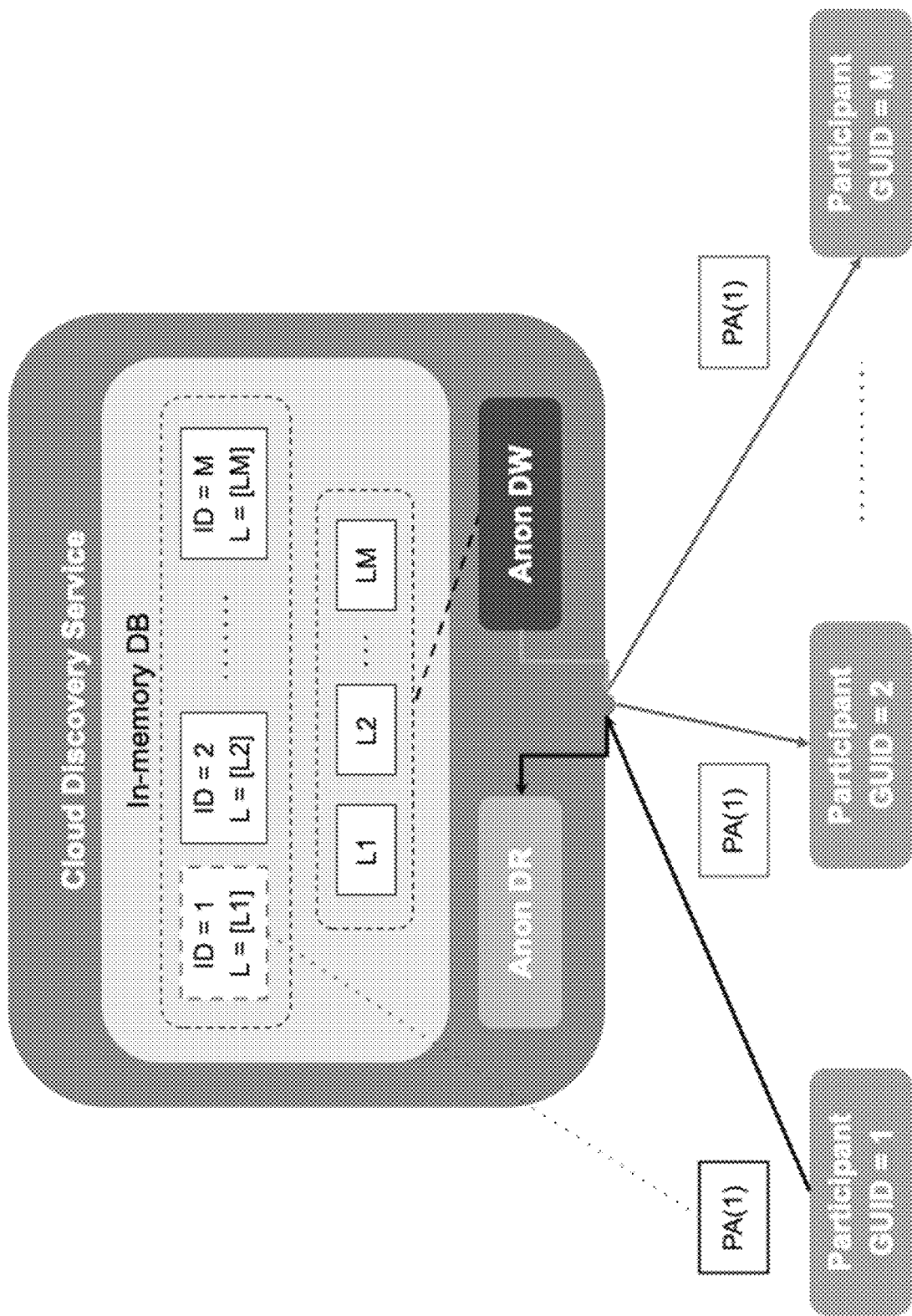
FIG. 26 shows according to an exemplary embodiment of the invention the concept of Implementation details of CDS.

CDS relays PAs based on received locator information as shown in FIG. 26. For each received PA, CDS extracts the list of locators and stores them in a list of locators per domain and domain tag. On the action to relay a PA, CDS uses a custom Anonymous Writer preset with a list of destinations—the cumulative receive locators for all participants in a domain and domain tag—to which the PA will be sent.

The relay of PAs is done blindly in the sense that there's no inspection or verification of the locator list of each received PA. In order to support the LRS functionality, CDS needs to incorporate the enrichment of the PA by inspecting its list of receive locators and resolving to a PUBLIC locator when needed.

The resolution shall occur only for a locator of type TRANSPORT_UPDv4_UUID_ADDRESS (see section 'Locators'). This locator simply indicates that the Internal Participant does not know its public transport address. CDS needs to ask the installed UWT transport instance for the corresponding PUBLIC locator for the Participant with such UUID.

Figure 27:
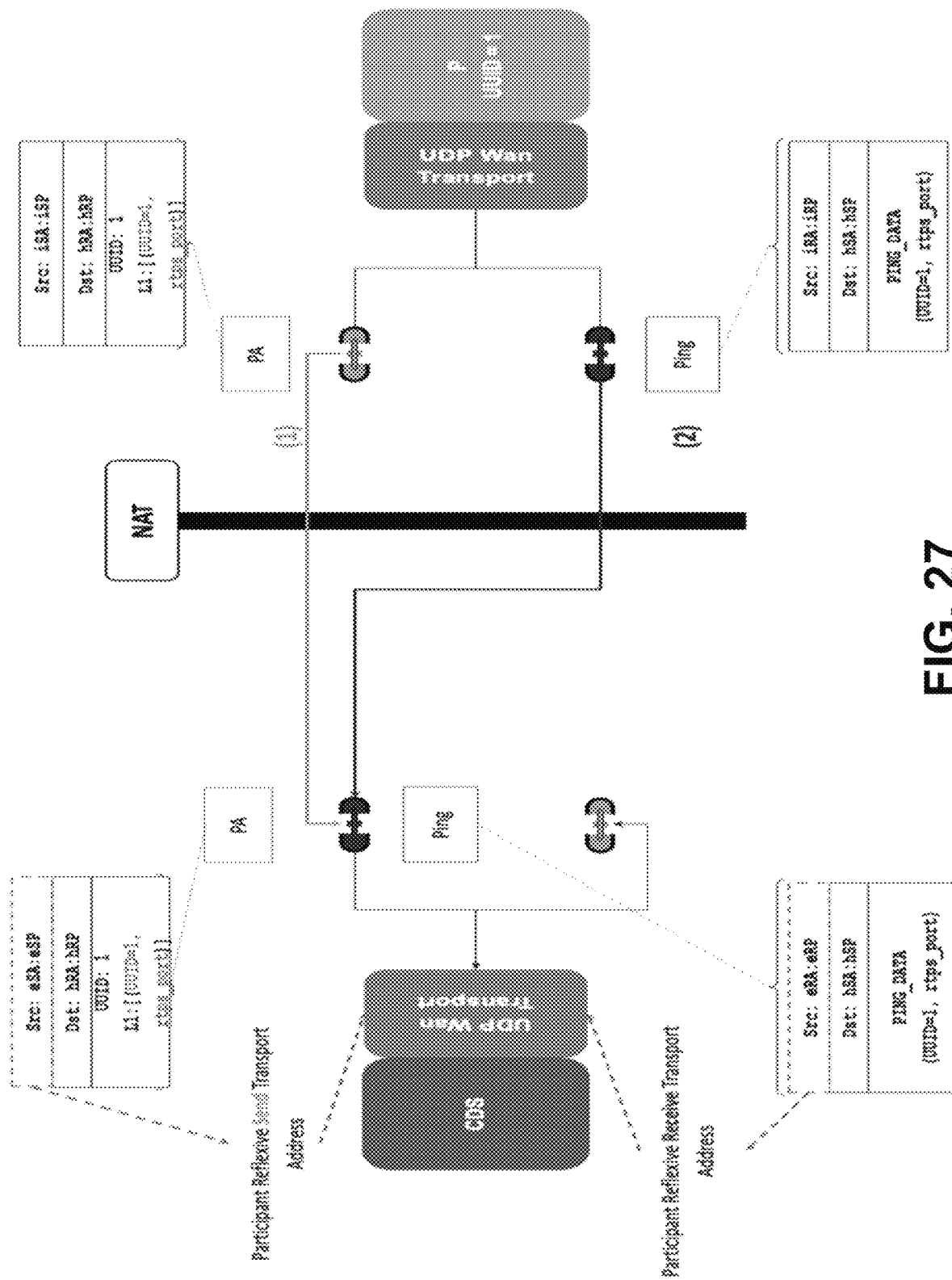
FIG. 27 shows according to an exemplary embodiment of the invention the concept of Event timing of CDS determining participant reflexive locators.

However, by the time CDS receives a PA with a UUID locator, the CDS UWT may have not yet determined the public transport address of the UUID locator for the peer participant. This situation occurs because upon reception of the PA the transport can only obtain the public transport address of the send socket used by the remote participant to send the PA. To obtain the receive public transport address, CDS will need to wait for the ping messages (see section 'NAT Traversal Specific Messages') sent by the receive socket associated with the UUID locator of the peer participant. FIG. 27 illustrates the scenario.

In addition to updating such a table, the UWT shall provide a mechanism to inform upper layers of the resolved locators. To meet this requirement, the UWT will allow installing a callback via configuration properties—expecting a function pointer value—which will notify upon assertion of each public address of each UUID::rtps_port. The notification must also occur each time the public transport address changes for a UUID:rtps_port.

The callback prototype declaration is as follows:

```
/* ================================================================ */
/* UuidLocatorListener Class                                        */
/* ================================================================ */
/**
@brief Prototype of the function for notifications of the
* availability of new or changed public transport addresses for a
* client UUID locator.
* This operation will provide the corresponding peer reflexive
* public addresses for the per UUID locator identified by its UUID
* and rtps port. A notification will occur for each change in the
* public locators.
*/
Public
typedef                                                          void
(*NDDS_Transport_UDP_UuidLocatorListener_OnPublicMappingResolvedFunction)(
void *listener_data,
const NDDS_Transport_Address_t *public_uuid_adress,
NDDS_Transport_Port_t rtps_port);
Public
struct NDDS_Transport_UDP_UuidLocatorListener {
void *listenerData;
NDDS_Transport_UDP_UuidLocatorListener_OnPublicMappingResolvedFunction
onPublicMappingResolved;
};
```

The peer Internal Participant, through the initial peers, knows the public receive address of CDS hRa:hRP and it uses its Send Socket (green interface) to send PAs to CDS. This is the first message the Internal Participant sends. When CDS receives the PA, it can obtain the participant reflexive transport address of PA Send Socket eSa:eSP. At this point CDS has a PA but it doesn't yet know the public receive transport address of the peer participant. For that, it has to wait for the reception of a ping message, sent by the Internal Participant from its Receive Socket (red interface) after the PA is sent. Once it receives the ping, it can then obtain the participant reflexive locator of PA Receive Socket eRa:eRP.

Note that the best-effort nature of the packets makes it impossible to guarantee which packet will arrive first no matter the order in which they are sent. Because CDS has to wait until the receive public address is known by the UWT transport instance, there are two new requirements for CDS in order to forward a PA:
1. Obtain a notification from the UWT transport instance of the availability of public transport addresses for the peer participant.
2. Put on hold the forwarding of the PA until the public addresses are available.

Discovery of PUBLIC+UUID Locators

CDS may receive PAs that contain one or more UUID locators. The task of CDS is precisely to find the public address associated with those UUIDs. The resolution of the UUID locator occurs at the underlying UWT instance upon reception of PING messages from the remote UWT's receive sockets. The local UWT transport will obtain the Peer Reflexive Address from each PING message and update the public address table as stated in section 'The UWT maintains a UUID Locator Mapping table to support UUID locator resolution to public addresses'.

The public addresses provided through this callback represent the service reflexive locators mentioned earlier and these are the addresses that CDS will use to enrich the PAs.

The UWT is aware of UUID and RTPS ports but has no knowledge of participants. This means that CDS has to be in charge of keeping the mapping between UUID+port and the associated Participant. This requires the addition of a new Locator Resolution (LR) table that contains the following fields:

| Key | RO | RW | |
|---|---|---|---|
| UUID RTPS port | (none) | public_addr | participant_guid |

EAs Assignment

| Table EA | Record EA |
|---|---|
| RP_tableEA | RP_recordEA |

CDS operates on the LR table as follows:
Upon callback notification of a UUID+PUBLIC locator resolution, it asserts an entry for the UUID:rtps_port with the provided public address.
Upon a reception of PA containing UUID locators, it performs a search for the UUID:rtps_port in the table, updates the RW::participant_guid, and reads the RW::public_addr to enrich the PA.
If the enriched PA resulted in locator changes, the DL and DLV tables are updated accordingly.

Note that the participant_guid field is necessary to assist in the cases in which the locator resolution occurs after the reception of the associated PA. In this case CDS has to perform other actions that require the knowledge of the Participant for the resolved UUID locator.

In addition to table updates, CDS performs other actions and generates other events. These are described in the following section.

Event Dispatching

The current behavior of CDS is straightforward: PAs are relayed as soon as they are received. Namely, a Send Job (SJ) is scheduled and added to the event queue that the flow controller access to actually transmits the PAs. The generation of a SJ occurs for each received PA, whether it is a new, a change, or just a liveliness PA.

Scheduling a SJ means creating a SJ entry in the SJ Dispatcher and waking up one of the available Send Routes (there's one Send Route for each Session's thread). Upon Route wakeup notification, the dispatcher returns the next job to relay the associated PA.

Note that scheduling a SJ upon reception of a PA is no longer a constant option. This is due to the existence of UUID locators when the UWT is in use. If a received PA contains one or more UUID locators, CDS has to hold the PA and skip the generation of the SJ until the locator resolution takes place.

Furthermore, there is a new case that requires the generation of SJ even if there's no reception of a PA. This is the case in which the public address for a UUID locator changes (for example, if a remote participant goes through a handoff in a cellular network). In this case, the corresponding PA must be updated a SJ shall be generated.

To deal with all the possible events at which a PA has to be relayed and the coordination with the out of band locator resolution, the CDS event handling and dispatching mechanism requires a new approach. First, CDS will react to the following events:

CDS_PA_NEW: Event generated upon reception of PA for a participant that does not exist yet in the RP table.
Firing: ReceiveProcessor::on_data_available
Handling:
update PA (enrich) if the information in the LR table is available.
Schedule SendJob if the PA has at least one of the UUID locators resolved.

CDS_PA_LOCATOR_CHANGE: Event generated upon:
The reception of a PA that contains a change in locators.
Firing: ReceiveProcessor::on_data_available
A change in a public address for an existing UUID: rtps_port.
Firing: UWT::OnUuidLocatorResolvedCallback
Handling of this event requires updating the PA and scheduling a SJ if the PA has at least one of the UUID locators.

CDS_PA_REFRESH: Event generated by CDS itself right after a PA is relayed.
Firing: SendProcessor::sendJob
Handling: Schedule a SJ if the PA has at least one of the UUID locators.

The following table describes the properties and handling of each event:

| Event | Resch | Overrides | Delay |
|---|---|---|---|
| PA_NEW | False | PA_LOCATOR_CHANGE PA_REFRESH | Configurable $D_N$ |
| PA_LOCATOR_CHANGE | False | PA_REFRESH | Configurable $D_C$ |
| PA_REFRESH | False | — | Configurable $D_R$ |

Figure 28:
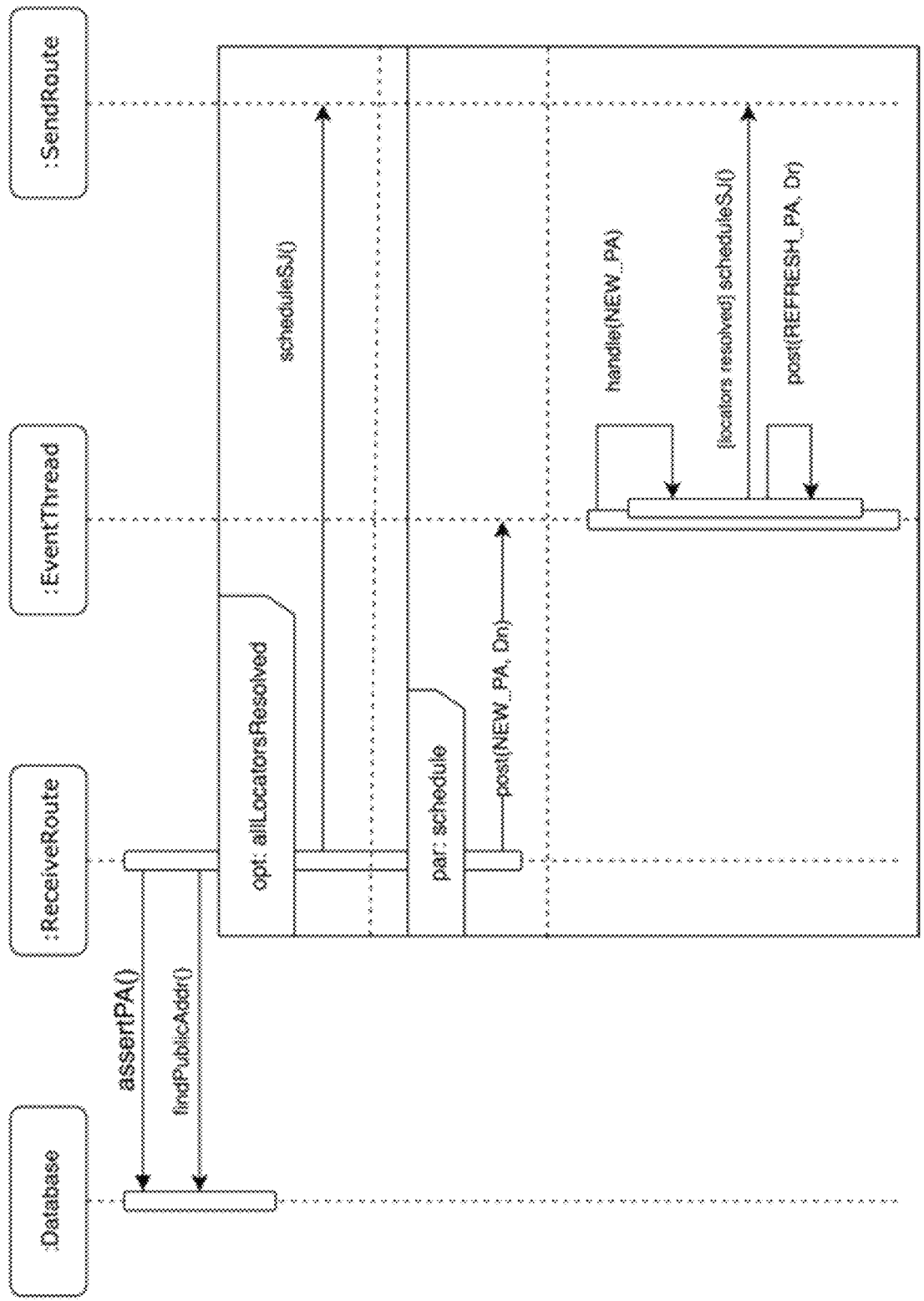
FIG. 28 shows according to an exemplary embodiment of the invention the concept of NEW_PA event.
Figure 29:
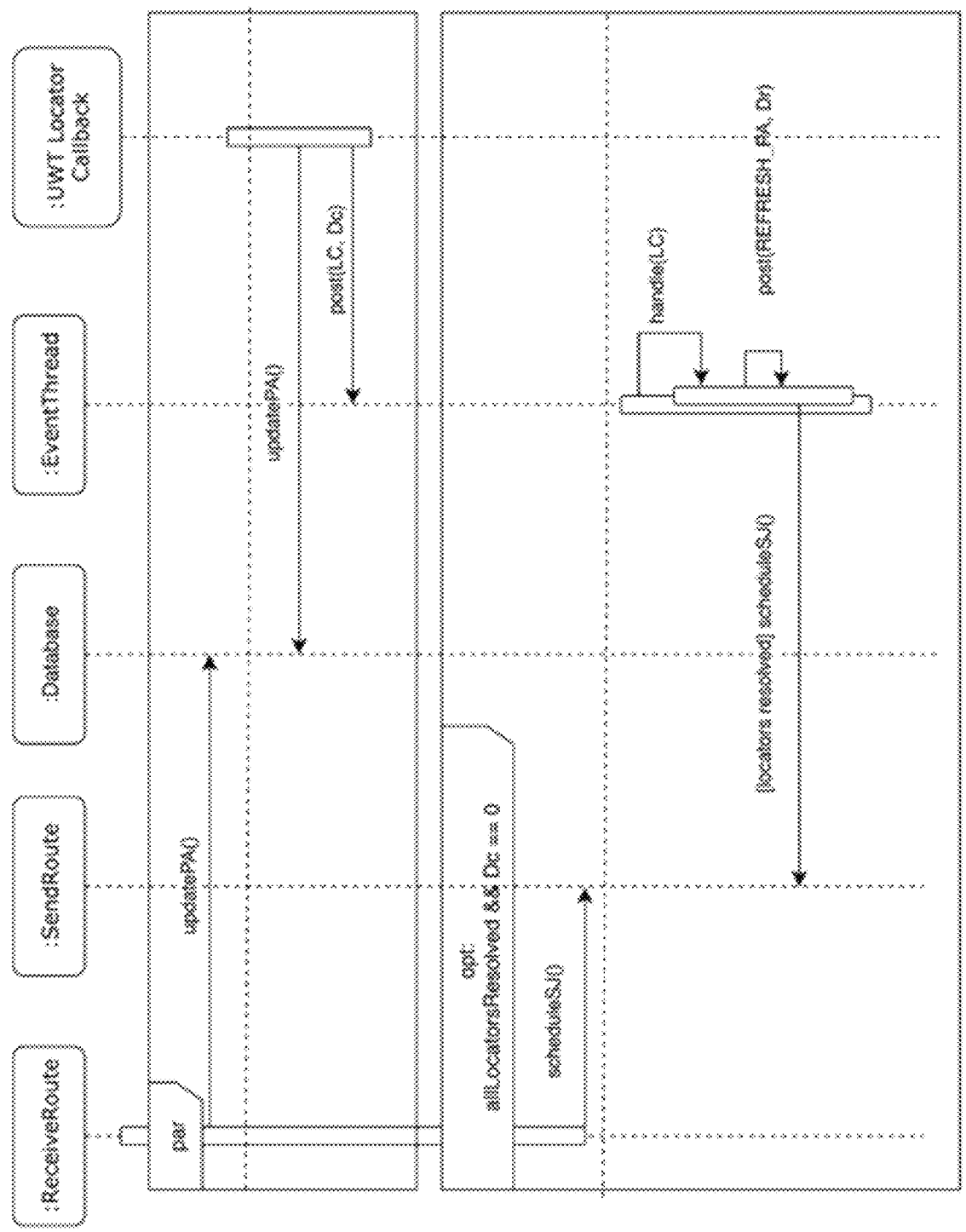
FIG. 29 shows according to an exemplary embodiment of the invention the concept of LOCATOR_CHANGE Event.
Figure 30:
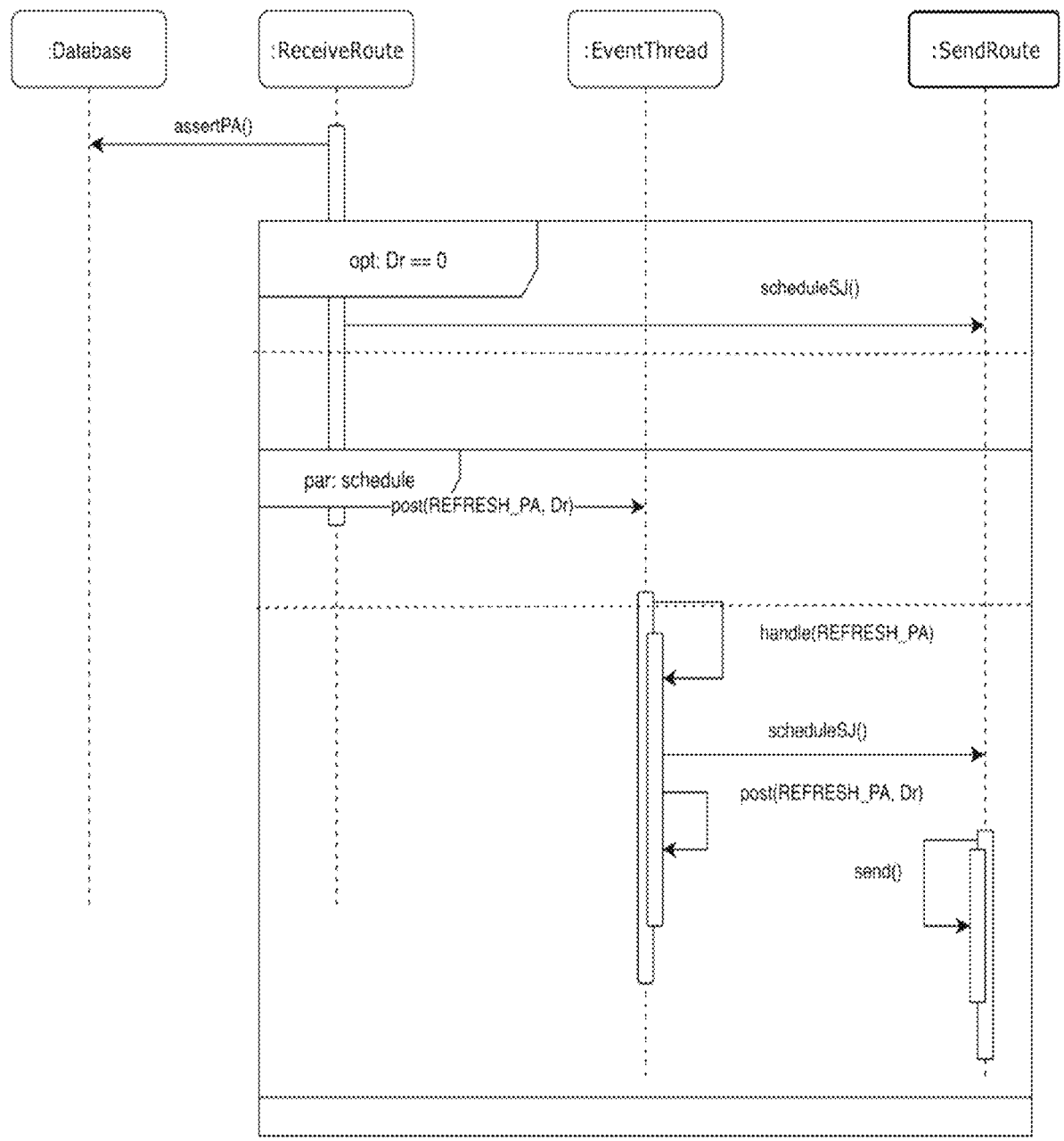
FIG. 30 shows according to an exemplary embodiment of the invention the concept of REFERS_PA Event.

FIG. 28. shows how the PA_NEW event is handled.
FIG. 29. shows how the PA_LOCATOR_CHANGE event is handled.
FIG. 30. shows how the PA_REFRESH event is handled.

The generation of each event occurs individually for each remote participant. All events are handled in the same way: upon dispatch, a SJ for the affected participant shall be generated and added to the SendJobDispatcher.

The event delays can be configured to optimize PA traffic and avoid a storm of unnecessary PAs if many changes occur in a small period of time:

$D_N$: Maximum delay after which CDS attempts to forward a PA. This delay is applied only if the PA cannot be enriched and gives some time to the UWT to receive public addresses.

$D_C$: Minimum amount of time to wait before resending a PA for which a change in the public address occurred. This time helps preventing multiple PAs caused by interface flickering or in multihome scenarios, where resolving multiple locators is needed $D_R$: Maximum delay for a refresh PA (with no changes in locators) is sent. This delay or period shall never be zero nor a small number. In general, it's expected this value to be at least 2× the liveliness assertion period of the remote participants. The purpose of relaying PAs is to assist in the rediscovery of participants in case they lose connectivity between them for any reason.

Note that all event delays can be configured to zero. In such a case, CDS will not schedule the event and instead will schedule the SendJob as soon as possible, that is, if the PA can actually be relayed. Otherwise, the event will be discarded.

CDS can resolve UUID locators only if the UWT is installed and enabled, otherwise it will not be able to resolve the address. In such a case, CDS will need to discard the UUID locators.

The discard step is not mandatory but a desired optimization. Since the internal participants will not be able to reach out to each other using UUID locators, it's useless to provide them with these. Instead, the forwarded PAs will include only potentially reachable locators. These include locators with the flag P or locators from other transports.

Operation and Conditions

The previous two sections established the events under which CDS reacts. In this section we expand on the actions and conditions needed to process those events.

Resolve UUID Locators

This operation takes place only inside the UWT callback upon notification of a public address update (and update could be the first time the locator is resolved). This operation updates the LR table, namely the public address in the RW area.

Update and Enrich PA

This operation can take place on the reception of PA or under a public address change within the UWT callback. This operation performs the enrichment mechanism described earlier.

Dispatch a PA Send Job

This is the existing operation in which CDS processes a send job to forward a PA to the proper domain (Id+tag) locators. A Send Job shall be available for dispatch only if all the UUID locators are present (which will be always true for all the other transports).

Transport Configuration

CDS allows selecting multiple transports at the same time to receive and send PAs. Explicitly, the user can configure the receive port to which CDS listens to—port for the receive resource—. On the other hand, the send port is chosen automatically by the OS (ephemeral port).

While this behavior is fine for existing transports, for the UWT the configuration of the public send port is required. To avoid introducing the unfamiliar concept of send port, CDS will behave as follows when the UWT transport is used:

By default, CDS will configure the UWT to use a single socket and port for sending and receiving data using the same socket and port.

If the user wants to use a different send port, it can do so by explicitly configuring the UWT with its properties. We're proposing this since we expect the single-port configuration to be the most common.

Important Note Regarding Bound Socket Address

The sockets created by the UWT are bound to a host address that is chosen based on the configuration. The bound address for the socket cdsAddr is determined by one of the following choices:

Default: ANY_ADDR: Refer to section 'Support For Multihomed Hosts'.

The address specified by the UWT property bind_interface_address.

For the following sections, we will use cdsAddr to refer to the actual host address the UWT sockets are bound to for CDS.

Configuration of UWT with a Single Port

```
<cloud_discovery_service
name="AllDomainsUDPv4Wan">
  <transport>
    <element>
      <alias>udpv4_wan</alias>
      <receive_port>cdsPort</receive_port>
    </element>
  </transport>
</cloud_discovery_service>
```

This configuration will result in CDS receiving and sending data with a socket bound to a host host address cdsAddr port cdsPort.

How the user connects to CDS depends on whether the CDS host is behind a NAT or not:

If the CDS host is directly accessible externally, then the value in <receive_port>(cdsPort) is the public port value that shall be specified in the initial peers of the applications using CDS:
NDDS_DISCOVERY_PEERS=rtps@udpv4_wan://cdsAddr:cdsPort If the CDS host is behind a NAT/Firewall (not directly accessible externally), then the value in <receive_port> (cdsPort) is a private port, which must be forwarded to a public port in the NAT. Hence the user application will need to specify the initial peers as follows:
NDDS_DISCOVERY_PEERS=rtps@udpv4_wan://<NAT public IP address for cdsAddr>:<NAT public_port for cdsPort>

Example

```
<cloud_discovery_service
name="AllDomainsUDPv4Wan">
  <transport>
    <element>
      <alias>udpv4_wan</alias>
      <receive_port>7400</receive_port>
    </element>
  </transport>
</cloud_discovery_service>
```

Assume cdsAddr=192.168.1.2.

For single receive and send socket bound to 192.168.1.2: 7400:

| CDS Access | NAT Public Addr | NAT Public Port | Initial Peer |
|---|---|---|---|
| Public | N/A | N/A | rtps@udpv4_wan:192.168.1.2:7400 |
| Behind NAT | 10.10.1.60 | 10400 | rtps@udpv4_wan:10.10.1.60:10400 |

Configuration of UWT with Different Send and Receive Ports

```
<cloud_discovery_service_name="AllDomainsUDPv4Wan">
  <transport>
    <element>
      <alias>udpv4_wan</alias>
      <receive_port>cdsRecvPort</receive_port>
      <property>
        <value>
          <element>
<name>dds.transport.udpv4.send_port</name>
            <name>cdsSendPort</name>
          </element>
        <value>
      </property>
    </element>
  </transport>
</cloud_discovery_service>
```

This configuration will result in CDS receiving and sending data with a receive socket bound to a host port cdsRecvPort and a send socket bound to port cdsSendPort, with both sockets bound to the same cdsAddr.

How the user connects to CDS depends on whether the CDS host is behind a NAT or not:

If the CDS host is directly accessible externally, then the value in <receive_port>(cdsRecvPort) and send_port property (cdsSendPort) are the public port values that shall be specified in the initial peers of the applications using CDS:
NDDS_DISCOVERY_PEERS=rtps@udpv4://cdsAddr:cdsSendPort:cdsRecvPort If the CDS host is behind a NAT/Firewall (not directly accessible externally), then the value in <receive_port> (cdsRecvPort) and send_port property (cdsSendPort) are private ports, which must be forwarded to public ports in the NAT. Hence the user application will need to specify the initial peers as follows:
NDDS_DISCOVERY_PEERS=rtps@udpv4_wan://<NAT public IP address for cdsAddr>:<NAT public_port for cdsSendPort>:<NAT public_port for cdsRecvPort>

Example

```
<cloud_discovery_service name="AllDomainsUDPv4Wan">
  <transport>
    <element>
      <alias>udpv4_wan</alias>
```

-continued

```
            <receive_port>7400</receive_port>
            <property>
                <value>
                    <element>
                <name>dds.transport.udpv4.send_port</name>
                        <name>cdsSendPort</name>
                    </element>
                <value>
                </property>
            </element>
        </transport>
    </cloud_discovery_service>
```

Assume cdsAddr=192.168.1.2.

For receive socket bound to 192.168.1.2:7400, and send socket bound to 192.168.1.2:8400:

| Host Access | NAT Public Addr | NAT Public Send Port | NAT Public Recv Port | Initial Peer |
|---|---|---|---|---|
| Public | N/A | N/A | N/A | rtps@udpv4_wan:192.168.1.2: 8400:7400 |
| NAT | 10.10.1.60 | 10400 | 20800 | rtps@udpv4_wan:10.10.1.60: 20800:10400 |

What is claimed is:

1. A method for communicating one or more Object Management Group (OMG) Data Distribution Service (DDS) Participants, wherein the OMG-DDS Participants are behind router-Network Address Translation (NAT) devices with an external OMG-DDS Participant across one or more Wide Area Networks (WANs) using the Real-Time Publish Subscribe (RTPS) protocol, comprising:
 (a) having a first router-NAT device;
 (b) having a first OMG-DDS Participant among the OMG-DDS Participants behind the first router-NAT device;
 (c) having a second router-NAT device different from the first router-NAT device with port forwarding rules configured;
 (d) having a second external OMG-DDS Participant different than the first OMG-DDS participant behind the second router-NAT device reachable at one or more public addresses based on the port forwarding rules;
 (e) the first OMG-DDS Participant sending and receiving RTPS packets to and from the second external OMG-DDS Participant; and
 (f) the second external OMG-DDS Participant sending and receiving RTPS packets to and from the first OMG-DDS Participant.

2. The method as set forth in claim 1, wherein a Participant selected from the first OMG-DDS Participant or the second external OMG-DDS Participant sends and receives RTPS packets using one or more private IP address, private UDP port address pairs and wherein each sending address is also a receiving address.

3. The method as set forth in claim 1, wherein a mapping from an RTPS port to a private UDP port, public UDP port pair is automatic or provided for a Participant selected from the first OMG-DDS Participant or the second external OMG-DDS Participant.

4. The method as set forth in claim 1, wherein the first OMG-DDS Participant is provided with a public IP address, public UDP port address pair in which the second external OMG-DDS Participant can receive RTPS discovery packets and send a Participant announcement periodically containing UUID locators to the second external OMG-DDS Participant address.

5. The method as set forth in claim 4, wherein an UUID locator contains an RTPS port and a universal unique identifier (UUID) that maps to a receiving Participant GUID, private IP address pair of the first OMG-DDS Participant.

6. The method as set forth in claim 1, wherein the first OMG-DDS Participant sends a BINDING_PING message periodically containing a pair UUID, RTPS port from a receiving private IP address, private UDP port address pair associated with the UUID and the RTPS port in the pair to each one of a sending public IP address, public UDP port address pair of the second external OMG-DDS Participant to establish and maintain NAT bindings in the first OMG-DDS Participant's router-NAT device between the receiving private IP address, private UDP port address pair and the sending public IP address, public UDP port address pair.

7. The method as set forth in claim 1, wherein the second external OMG-DDS Participant maps an UUID locator contained in a first OMG-DDS Participant's Participant announcement into a public IP address, public UDP port address pair by looking at a socket address where a BINDING_PING message for the UUID locator is received.

8. The method as set forth in claim 7, wherein the second external OMG-DDS Participant uses the mapped public IP address, public UDP port address pair for a discovery UUID locator of the first OMG-DDS Participant to send a Participant announcement containing PUBLIC_UUID locators for the second external OMG-DDS Participant to the first OMG-DDS Participant.

9. The method as set forth in claim 8, wherein a PUBLIC_UUID locator contains a RTPS port, the UUID of the UUID locator, a receiving public IP address, public UDP port address pair associated with the UUID of the UUID locator, a flag indicating if a receiving address is also a sending address, or a combination thereof.

10. The method as set forth in claim 1, wherein the first OMG-DDS Participant uses a public IP address, public UDP port address pair contained in a PUBLIC_UUID locator of the second external OMG-DDS Participant to send RTPS packets to the second external OMG-DDS Participant on the PUBLIC_UUID locator and to send BINDING_PINGS if the PUBLIC_UUID locator is bidirectional.

11. The method as set forth in claim 1, wherein a Participant selected from the first OMG-DDS Participant or the second external OMG-DDS Participant selects a subset of available public IP address, public UDP port address pairs to send RTPS packets to the other Participant selected from the first OMG-DDS Participant or the second external OMG-DDS Participant.

12. The method as set forth in claim 1, wherein an IP address event in the first OMG-DDS Participant triggers the sending of a Participant announcement to the second external OMG-DDS Participant with a new set of UUID locators and the sending of periodic BINDING_PINGS from the private UDP port, private UDP port address pairs associated with the new set of UUID locators.

13. A method for communicating one or more Object Management Group (OMG) Data Distribution Service (DDS) Participants, wherein the OMG-DDS Participants are behind router-NAT devices across one or more WANs using the Real-Time Publish Subscribe (RTPS) protocol, comprising:
 (a) having a first router-NAT device;
 (b) having a first OMG-DDS Participant among the OMG-DDS Participants behind the first router-NAT device;

(c) having a second router-NAT device;

(d) having a second OMG-DDS Participant among the OMG-DDS Participants behind the second router-NAT;

(e) having a Locator Resolution Service application;

(f) having a Relay Service application;

(g) the first OMG-DDS Participant sending and receiving first peer-to-peer RTPS packets to and from the second OMG-DDS Participant using public addresses provided by the Locator Resolution Service application;

(h) the second OMG-DDS Participant sending and receiving second peer-to-peer RTPS packets to and from the first OMG-DDS Participant using public addresses provided by the Locator Resolution Service application;

(i) the first OMG-DDS Participant sending and receiving first relayed RTPS packets to and from the second OMG-DDS Participant using the Relay Service application to forward the first relayed RTPS packets; and (j) the second OMG-DDS Participant sending and receiving second relayed RTPS packets to and from the first OMG-DDS Participant using the Relay Service application to forward the second relayed RTPS packets.

14. The method as set forth in claim 13, wherein a Participant selected from a first OMG-DDS Participant or a second external OMG-DDS Participant sends and receives RTPS packets using one or more private IP address, private UDP port address pairs and wherein each sending address is also a receiving address.

15. The method as set forth in claim 13, wherein a mapping from a RTPS port to a private UDP port, public UDP port pair is automatic or provided for a Participant selected from the first OMG-DDS Participant or the second OMG-DDS Participant.

16. The method as set forth in claim 13, wherein a Participant selected from the first OMG-DDS Participant or the second OMG-DDS Participant is provided a public IP address, public IP port address pair of the Locator Resolution Service application and sends a Participant announcement periodically containing UUID locators to the Locator Resolution Service application public IP address, public IP port address pair.

17. The method as set forth in claim 16, wherein an UUID locator contains a RTPS port, and a universal unique identifier (UUID) that maps to a receiving Participant GUID, private IP address pair of the Participant selected from the first OMG-DDS Participant or the second OMG-DDS Participant.

18. The method as set forth in claim 13, wherein a Participant selected from the first OMG-DDS Participant or the second OMG-DDS Participant sends a BINDING_PING message periodically containing a pair UUID, RTPS port from a receiving private IP address, private UDP port address pair associated with the UUID and the RTPS port in the pair to a Locator Resolution Service application public IP address, public UDP port address pair to establish and maintain a NAT binding in respectively the first or second router-NAT device from a private IP address, private UDP port address pair to a public IP address, public UDP port address pair.

19. The method as set forth in claim 13, wherein the Locator Resolution Service application maps an UUID locator contained in a Participant announcement into a public IP address, public UDP port address pair by looking at a socket address where a BINDING_PING message for the UUID locator is received.

20. The method as set forth in claim 13, wherein the Locator Resolution Service application replaces an UUID locator in a Participant announcement with a PUBLIC_UUID locator.

21. The method as set forth in claim 20, wherein a PUBLIC_UUID locator contains a RTPS port, the UUID of the UUID locator, a receiving public IP address, public UDP port address pair associated with the UUID of the UUID locator, a flag indicating if a receiving address is also a sending address, or a combination thereof.

22. The method as set forth in claim 13, wherein the Relay Service application is provided a public address of the Locator Resolution Service application and the Relay Service application registers a relay public IP address, relay public UDP port address pair in which it can receive and send RTPS packets with the Locator Resolution Service application.

23. The method as set forth in claim 13, wherein the Locator Resolution Service application replaces an UUID locator in a Participant announcement with a RELAY locator.

24. The method as set forth in claim 23, wherein a RELAY locator contains a RTPS port, a UUID of the UUID locator, and a registered receiving public IP address, public UDP port address pair for the Relay Service application, a flag always set indicating that the receiving address is also a sending address, or a combination thereof.

25. The method as set forth in claim 13, wherein the Locator Resolution Service application sends an updated Participant announcement associated with one Participant selected from the first OMG-DDS Participant or the second OMG-DDS Participant to the other Participant selected from the first OMG-DDS Participant or the second OMG-DDS Participant containing PUBLIC+UUID locators and RELAY locators instead of UUID locators.

26. The method as set forth in claim 13, wherein a Participant selected from the first OMG-DDS Participant or the second OMG-DDS Participant sends a Participant announcement containing UUID locators to another Participant selected from the first OMG-DDS Participant or the second OMG-DDS Participant using the public IP address, public UDP port address pairs contained in PUBLIC_UUID and RELAY locators received from the Locator Resolution Service application for the other Participant selected from the first OMG-DDS Participant or the second OMG-DDS Participant.

27. The method as set forth in claim 13, wherein a Participant selected from the first OMG-DDS Participant or the second OMG-DDS Participant sends a BINDING_PING message periodically containing a pair UUID, RTPS port from a receiving private IP address, private UDP port address pair associated with the UUID of the pair to all public IP address, public UDP port address pairs contained in bidirectional PUBLIC_UUID and RELAY locators received from the Locator Resolution Service application for the other Participant selected from the first OMG-DDS Participant or the second OMG-DDS Participant.

28. The method as set forth in claim 13, wherein a Participant selected from the first OMG-DDS Participant or the second OMG-DDS Participant maps a UUID locator coming from another Participant selected from the first OMG-DDS Participant or the second OMG-DDS Participant into one public IP address, public UDP port address pair where to send RTPS packets to the other Participant selected from the first OMG-DDS Participant or the second OMG-DDS Participant by looking at a socket address where a BINDING_PING message for the UUID locator is received.

29. The method as set forth in claim 13, wherein a Participant selected from the first OMG-DDS Participant or the second OMG-DDS Participant selects a subset of available public IP address, public UDP port address pairs to send RTPS packets to the other Participant selected from the first OMG-DDS Participant or the second OMG-DDS Participant.

30. The method as set forth in claim 13, wherein an IP address event in a Participant selected from the first OMG-DDS Participant or the second OMG-DDS Participant triggers the sending of a Participant announcement with a new set of UUID locators and the sending of periodic BINDING_PINGS from the new UUID locators to the other Participant selected from the first OMG-DDS Participant or the second OMG-DDS Participant and to the Locator Resolution Service application.

* * * * *